(12) United States Patent
Van Dijk et al.

(10) Patent No.: US 12,329,595 B2
(45) Date of Patent: Jun. 17, 2025

(54) DENTAL CLEANING DEVICE

(71) Applicant: Dental Robotics Group B.V., Delft (NL)

(72) Inventors: Joppe Gideon Van Dijk, Rotterdam (NL); Tim Anton Snijder, Rotterdam (NL); Thomas Van De Water, The Hague (NL)

(73) Assignee: Dental Robotics Group B.V. (NL)

( * ) Notice: Subject to any disclaimer, the term of this patent is extended or adjusted under 35 U.S.C. 154(b) by 0 days.

(21) Appl. No.: 18/629,995

(22) Filed: Apr. 9, 2024

(65) Prior Publication Data
US 2024/0252297 A1   Aug. 1, 2024

Related U.S. Application Data

(62) Division of application No. 17/260,945, filed as application No. PCT/NL2019/050452 on Jul. 16, 2019, now Pat. No. 11,986,367.

(30) Foreign Application Priority Data

| Jul. 17, 2018 | (NL) | ...................................... | 2021330 |
| Jul. 17, 2018 | (NL) | ...................................... | 2021331 |
| Jul. 17, 2018 | (NL) | ...................................... | 2021332 |

(51) Int. Cl.
*A61C 17/38* (2006.01)
*A46B 9/04* (2006.01)
(Continued)

(52) U.S. Cl.
CPC ............ *A61C 17/228* (2013.01); *A46B 9/045* (2013.01); *A46D 3/045* (2013.01); *A61C 17/38* (2013.01);
(Continued)

(58) Field of Classification Search
CPC ....... A46B 9/045; A61C 17/34; A61C 17/228; A46D 3/045
See application file for complete search history.

(56) References Cited

U.S. PATENT DOCUMENTS

| 4,164,940 A | 8/1979 | Quinby |
| 4,795,347 A | 1/1989 | Maurer |
(Continued)

FOREIGN PATENT DOCUMENTS

| CN | 104398312 A | 3/2015 |
| CN | 105213054 A | 1/2016 |
(Continued)

OTHER PUBLICATIONS

International Search Report and Written Opinion dated Jan. 22, 2020, corresponding to Application No. PCT/NL2019/050452.
(Continued)

*Primary Examiner* — Michael D Jennings

(57) ABSTRACT

A dental cleaning device for simultaneously brushing at a plurality of dental positions. The dental cleaning device includes: a mouthpiece having a pressure chamber for containing a fluid under pressure; a pump unit arranged in fluid communication with said pressure chamber and configured to reciprocatingly increase and decrease a pressure in the pressure chamber; a pressure sensor configured to measure a pressure in the pressure chamber and to produce a pressure signal; and a controller configured to generate a control signal. The controller is configured to generate the control signal in dependence on the pressure signal and the pump unit is configured to provide a delivery into and/or out of the pressure chamber in response to the control signal. The controller is configured to reduce the delivery of the pump unit when the pressure in the pressure chamber exceeds a predetermined upper threshold.

19 Claims, 24 Drawing Sheets

(51) Int. Cl.
  *A46D 3/04* (2006.01)
  *A61C 17/22* (2006.01)
  *A61C 17/34* (2006.01)

(52) U.S. Cl.
  CPC ....... *A46B 2200/1086* (2013.01); *A61C 17/22* (2013.01); *A61C 17/34* (2013.01)

(56) References Cited

U.S. PATENT DOCUMENTS

| | | | |
|---|---|---|---|
| 8,359,692 | B2 | 1/2013 | Brewer |
| 9,504,542 | B2 | 11/2016 | De Gentile |
| 10,869,541 | B2 * | 12/2020 | Pai ................ A46B 5/0095 |
| 10,888,201 | B2 | 1/2021 | Pai |
| 11,058,523 | B2 * | 7/2021 | Pai ..................... A61C 7/08 |
| 11,439,488 | B2 * | 9/2022 | Kuang ............ A61C 17/3481 |
| 11,583,064 | B1 * | 2/2023 | Baker, II ............ A61C 17/34 |
| 2006/0097084 | A1 | 5/2006 | Gromer et al. |
| 2009/0288660 | A1 | 11/2009 | Chen et al. |
| 2010/0062397 | A1 | 3/2010 | Brewer |
| 2014/0272761 | A1 | 9/2014 | Lowe et al. |
| 2015/0072300 | A1 | 3/2015 | Wolpo |
| 2015/0244340 | A1 | 8/2015 | Lee et al. |
| 2018/0098833 | A1 | 4/2018 | Pierce et al. |
| 2018/0184795 | A1 * | 7/2018 | Pai ................ A46B 15/0038 |
| 2018/0184857 | A1 * | 7/2018 | Pai .................... A46B 3/005 |

FOREIGN PATENT DOCUMENTS

| | | |
|---|---|---|
| CN | 105943175 | 9/2016 |
| CN | 206120478 U | 4/2017 |
| CN | 107645917 | 1/2018 |
| DE | 20309088 | 9/2003 |
| DE | 10259579 | 7/2004 |
| DE | 10303548 | 10/2016 |
| EP | 0173114 | 6/1987 |
| EP | 3326663 A1 | 5/2018 |
| FR | 2987555 | 9/2013 |
| JP | 2010022707 | 2/2010 |
| JP | 2011523879 | 8/2011 |
| JP | 2014-050751 | 3/2014 |
| JP | 2014511199 | 5/2014 |
| JP | 2017-506138 | 3/2017 |
| KR | 1020170062572 | 6/2017 |
| KR | 101781631 | 9/2017 |
| WO | 2000/060980 A2 | 10/2000 |
| WO | 2006/117845 | 11/2006 |
| WO | 2007/121760 | 11/2007 |
| WO | 2009/150559 | 12/2009 |
| WO | 2010/076702 | 7/2010 |
| WO | 2011/034905 | 3/2011 |
| WO | 2015/074993 | 5/2015 |
| WO | 2018/199760 | 11/2018 |
| WO | 2020/017963 | 1/2020 |

OTHER PUBLICATIONS

Netherlands Search Report dated Jan. 10, 2019, corresponding to Application No. 2021331.

Netherlands Search Report dated Jan. 16, 2019, corresponding to Application No. 2021332.

Netherlands Search Report dated Jan. 9, 2019, corresponding to Application No. 2021330.

Li Jing, "Mechanical and Electrical Characteristics of Power Ultrasonic Vibrator Based on PZT-8 Longitudinal Vibration," Chinese Doctoral Dissertations Full-text Database Engineering Science and Technology II, pp. C028-C032.

* cited by examiner

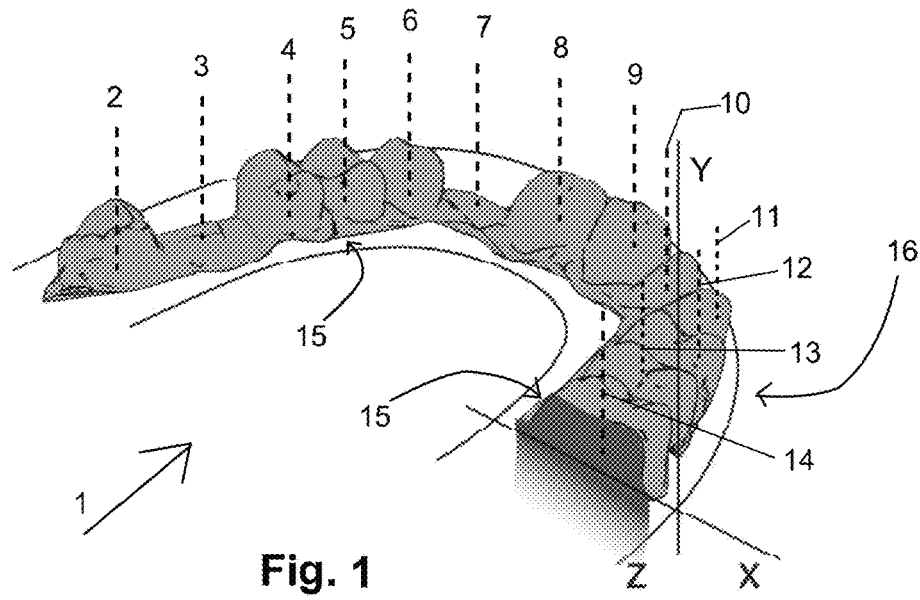
Fig. 1
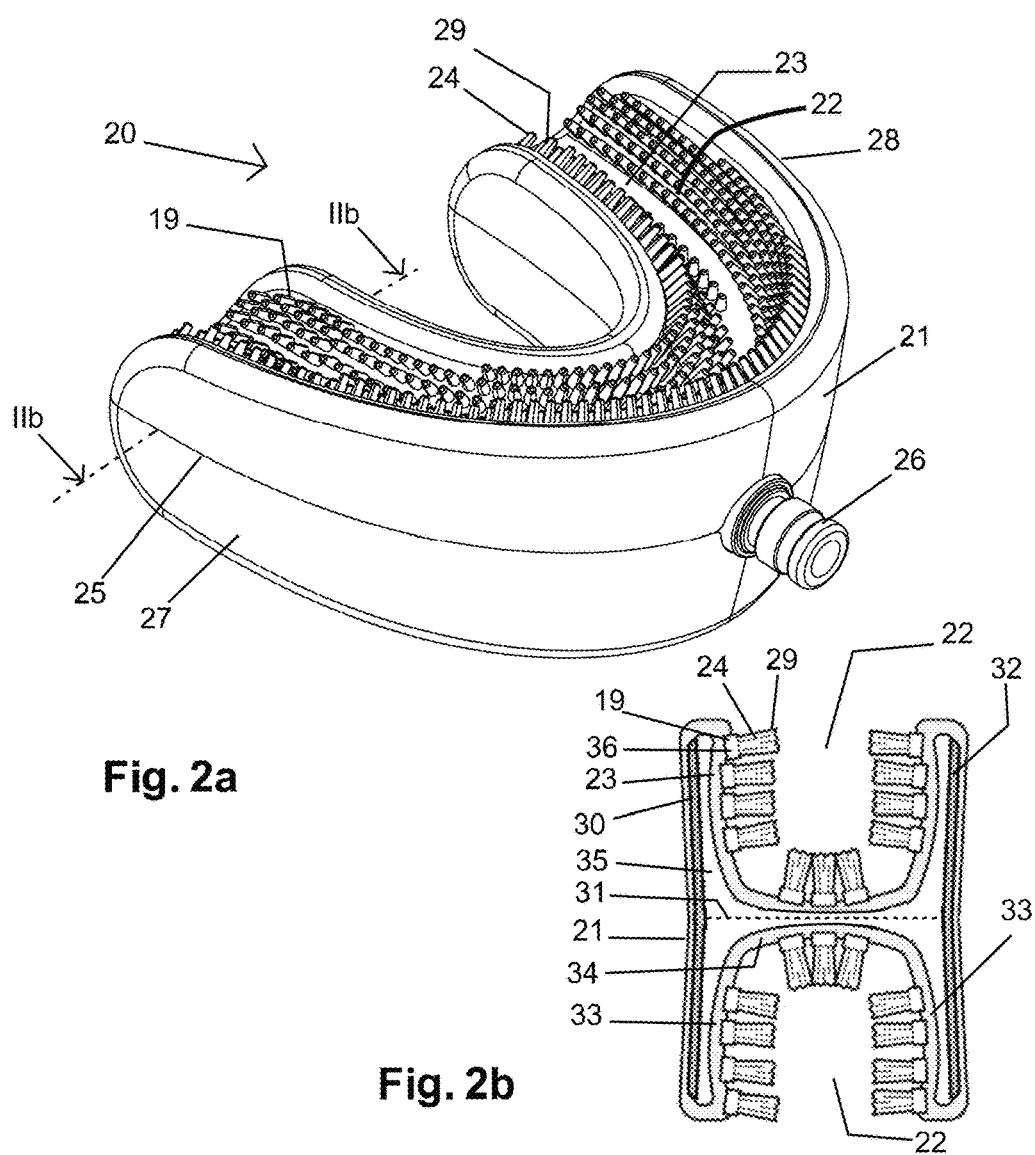
Fig. 2a
Fig. 2b

Fig. 3a
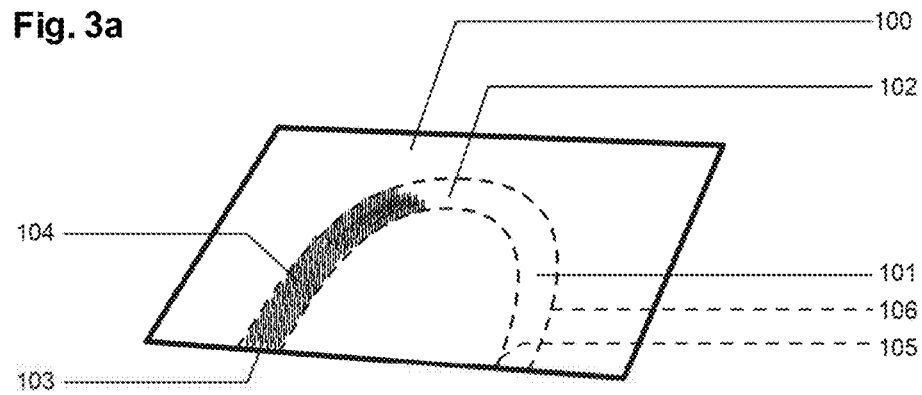
Fig. 3b
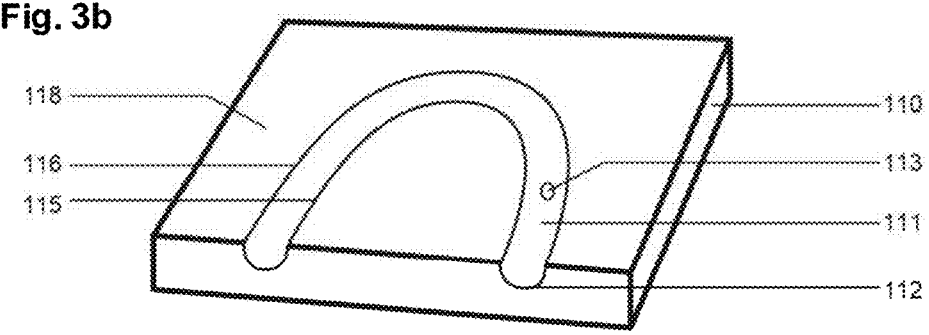
Fig. 3c                    Fig. 3d
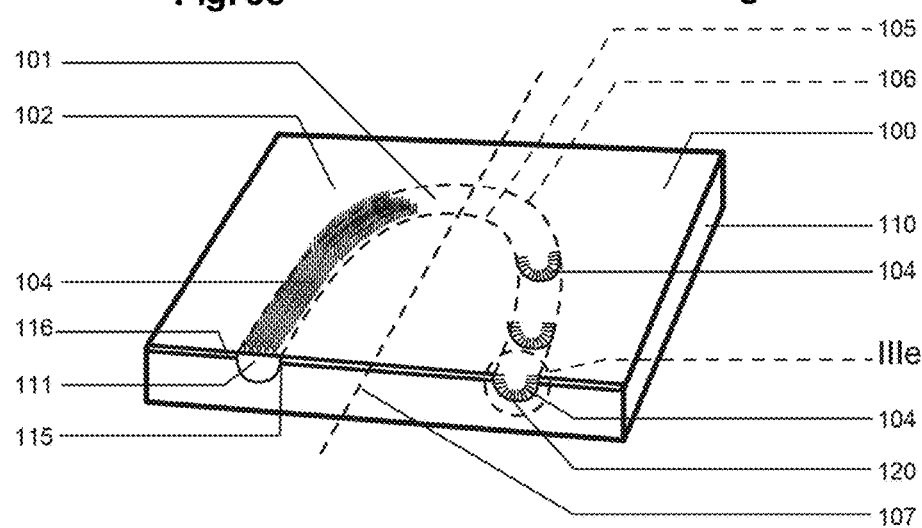
Fig. 3e
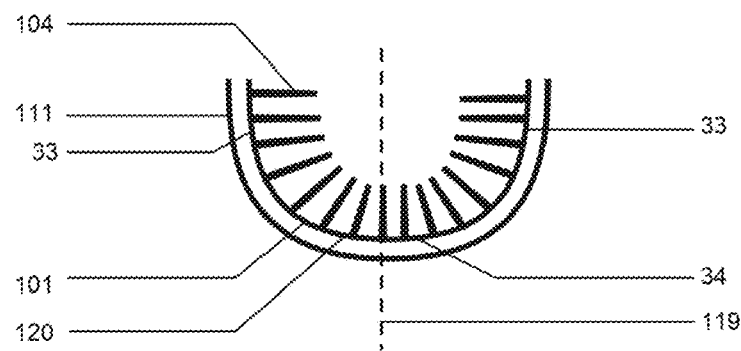

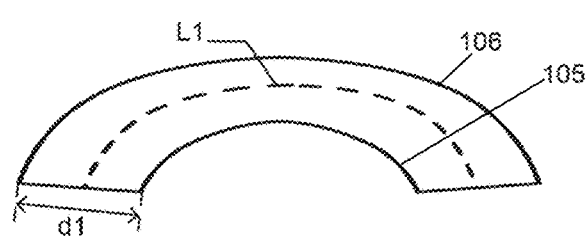
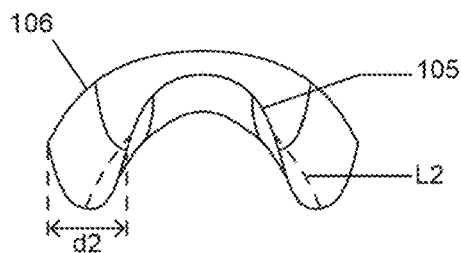
Fig. 8a                     Fig. 8b
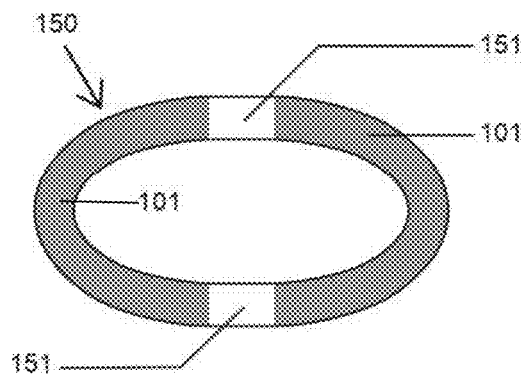
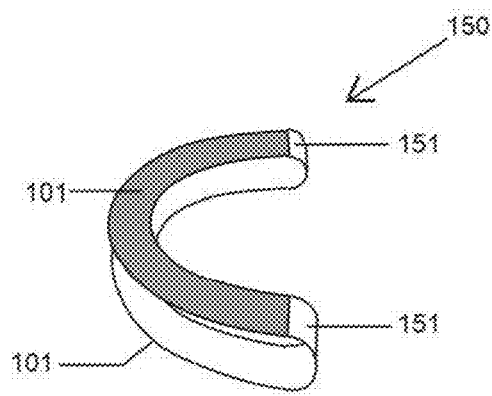
Fig. 9a                     Fig. 9b
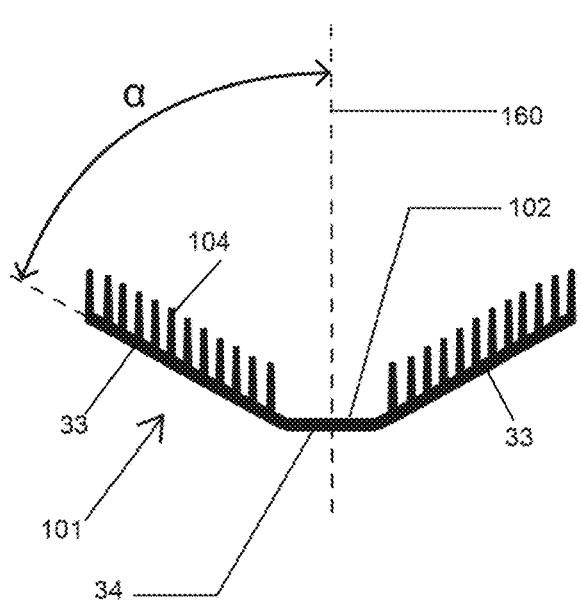
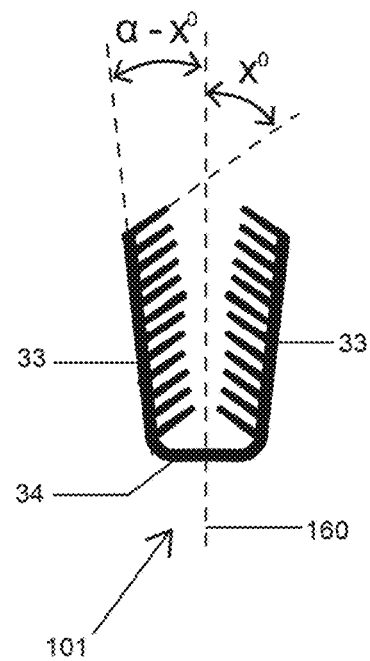
Fig. 10a                    Fig. 10b

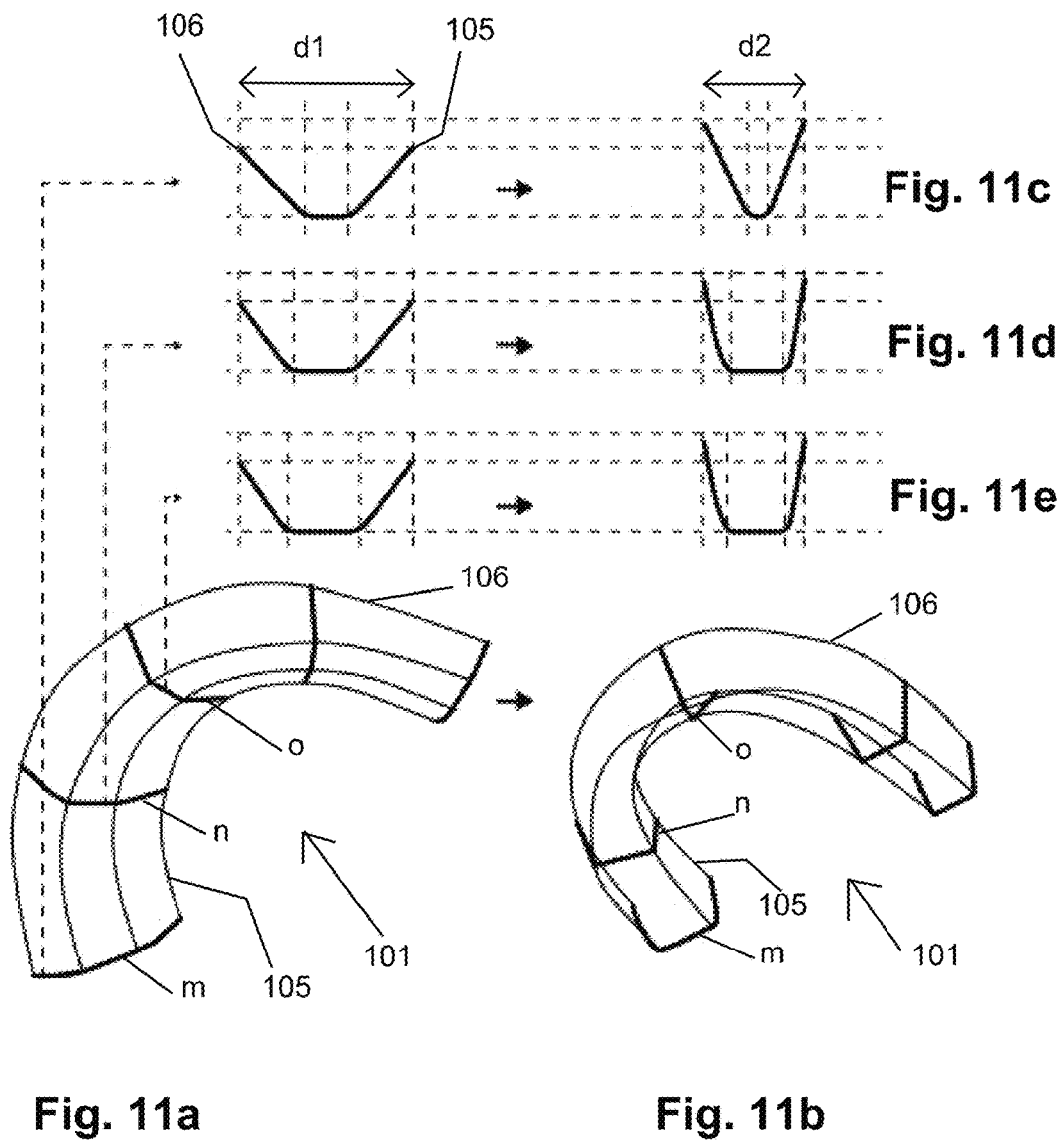
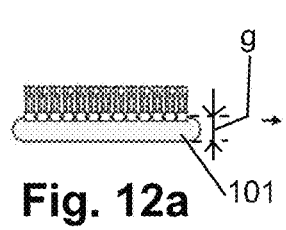
Fig. 12a
Fig. 12b
Fig. 12c
Fig. 12d

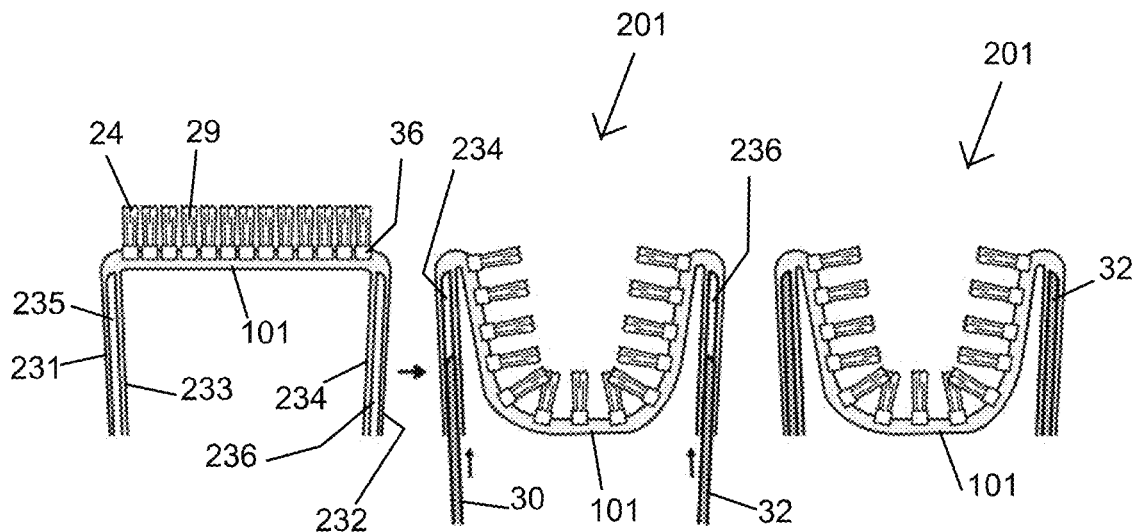
Fig. 15a  Fig. 15b  Fig. 15c
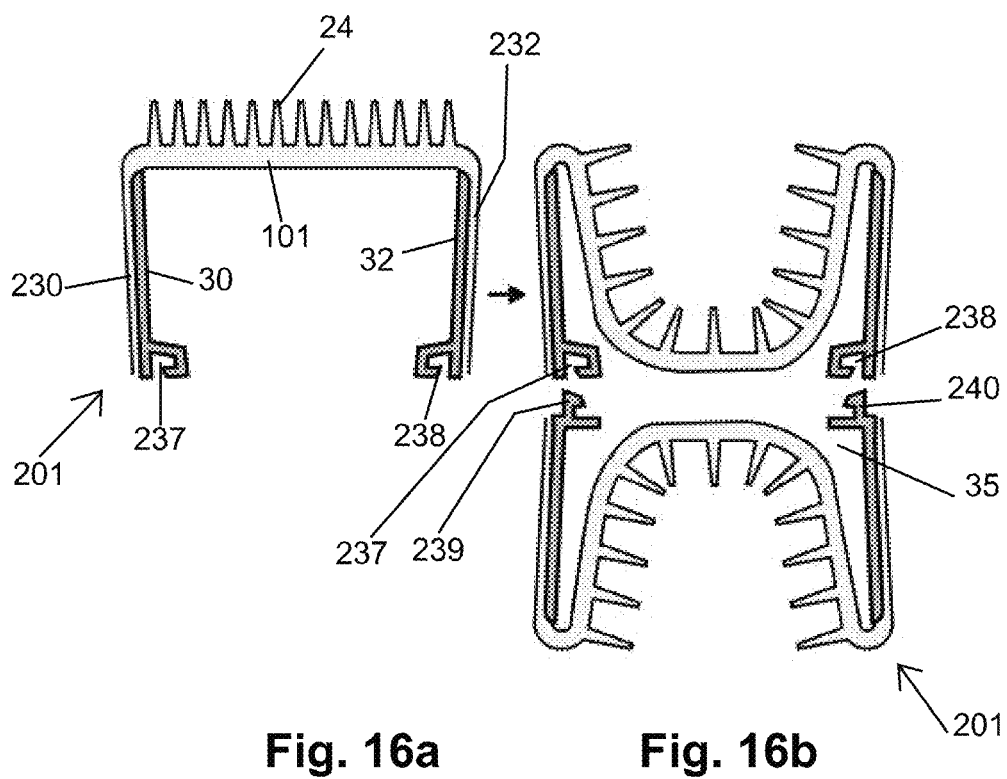
Fig. 16a  Fig. 16b

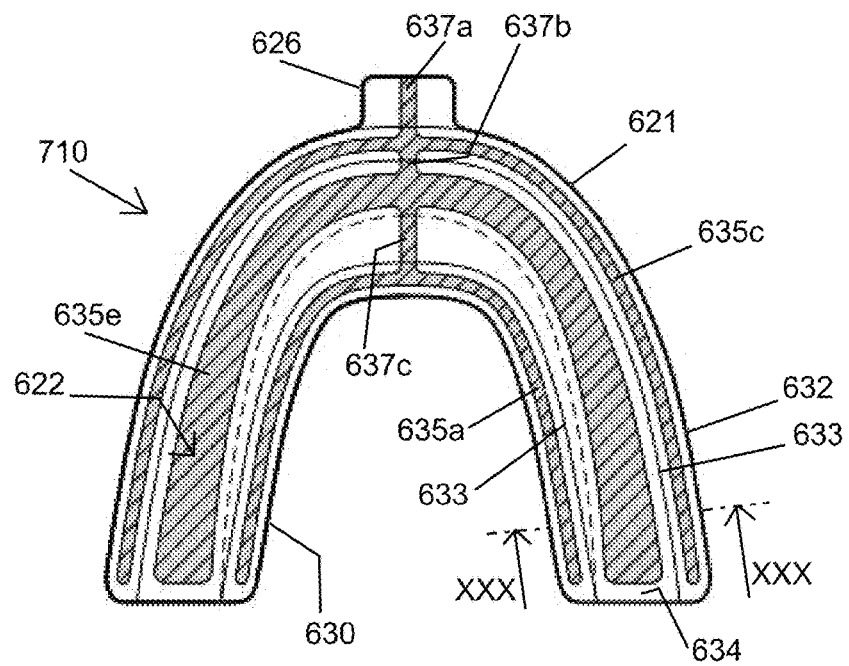
FIG. 30
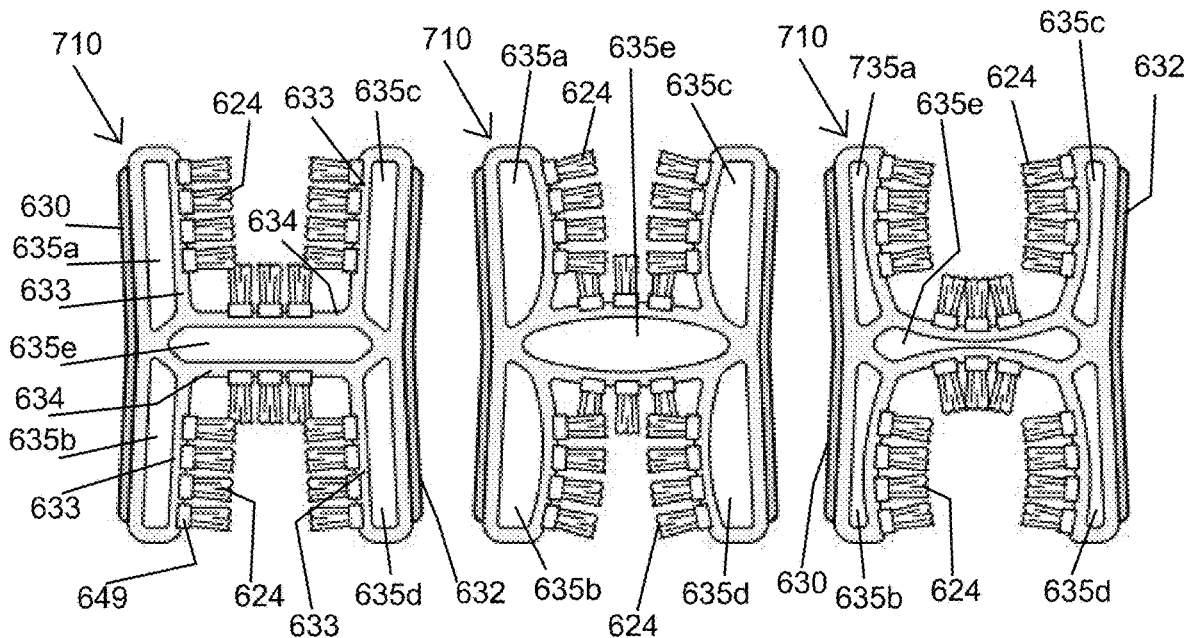
FIG. 31a  FIG. 31b  FIG. 31c

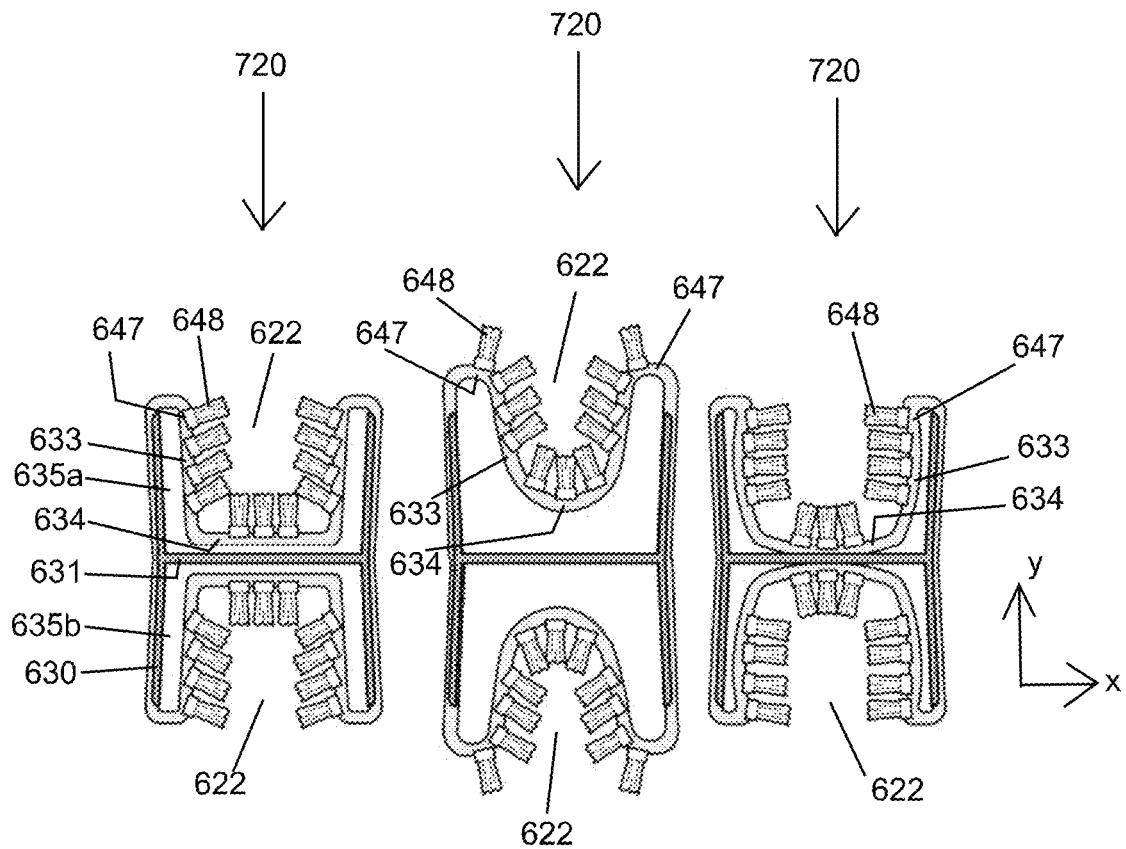
Fig. 36a  Fig. 36b  Fig. 36c
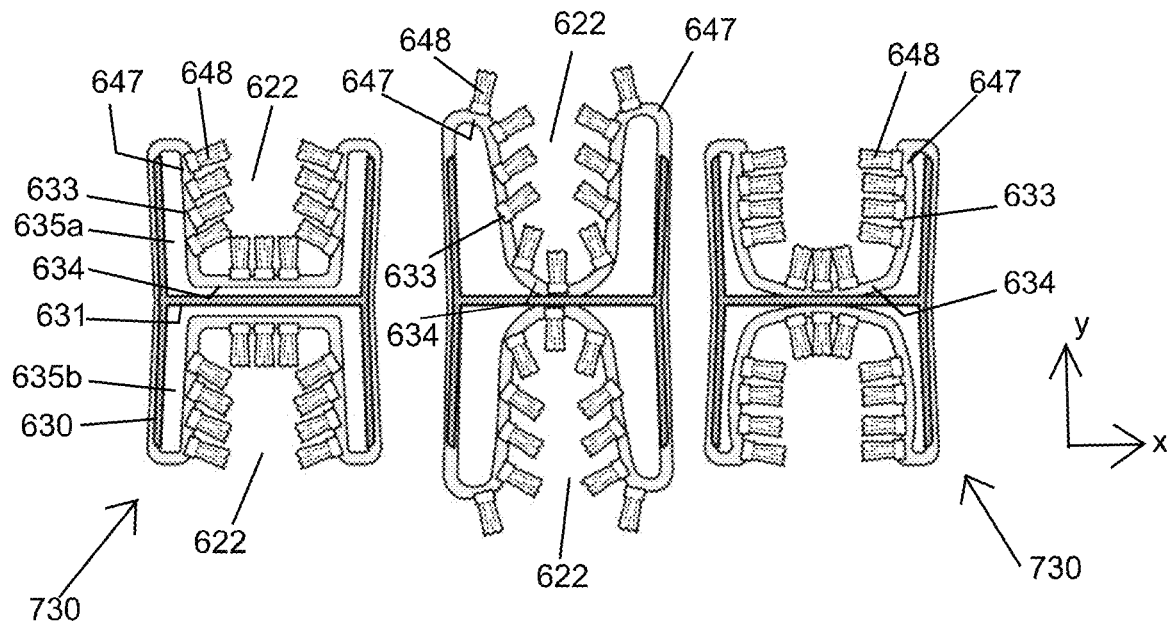
Fig. 37a  Fig. 37b  Fig. 37c

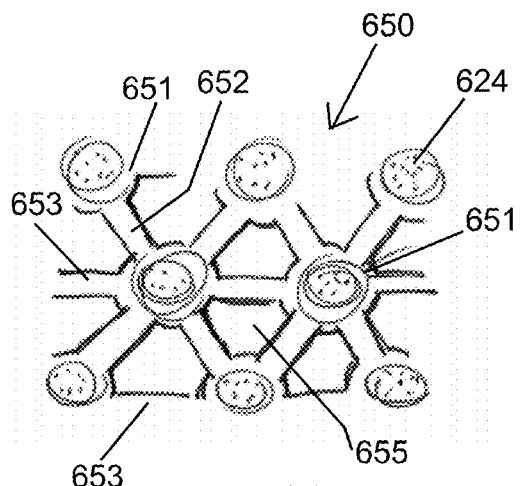
Fig. 38
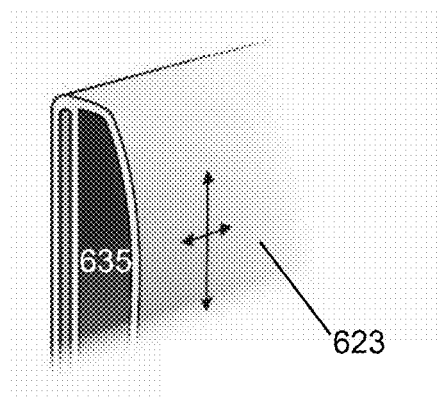
Fig. 44
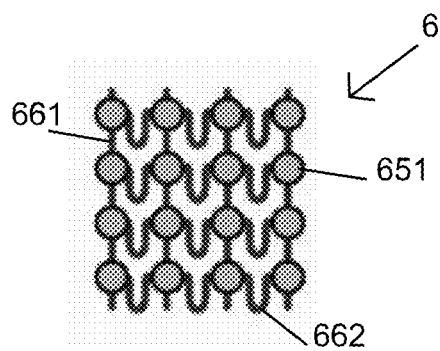
Fig. 39a
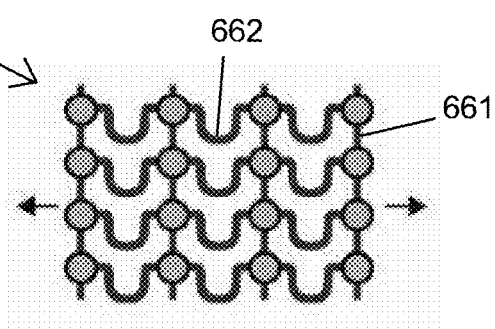
Fig. 39b
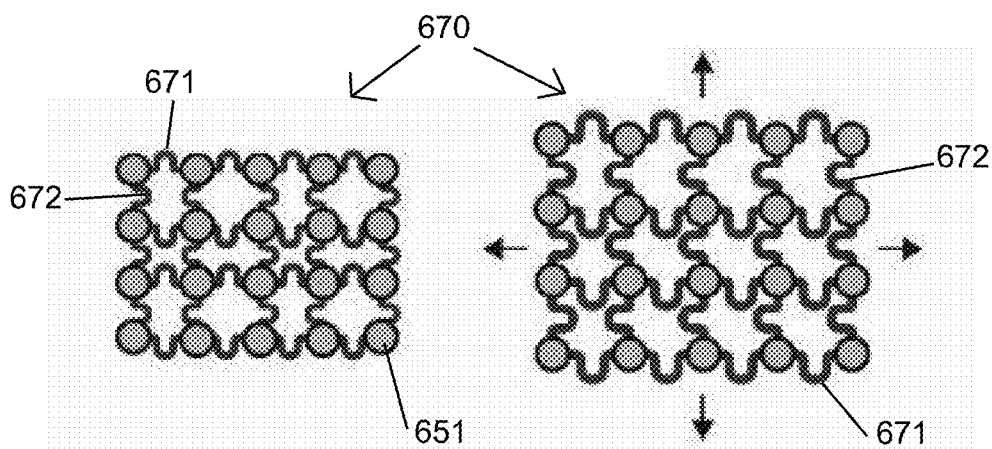
Fig. 40a
Fig. 40b

DENTAL CLEANING DEVICE

CROSS-REFERENCE TO RELATED APPLICATIONS

The present application is a divisional of U.S. patent application Ser. No. 17/260,945, filed Jan. 15, 2021, which is a national stage entry of PCT/NL2019/050452, filed Jul. 16, 2019, which claims the benefit of priority to Netherlands Patent Application Serial Nos. 2021331, 2021330, and 2021332, each filed on Jul. 17, 2018, the entireties of which are incorporated herein by reference.

INTRODUCTION

This application relates to multiple inventions in the field of dental cleaning devices for brushing teeth and/or dental positions. More specifically the multiple inventions relate to the field of dental cleaning devices for simultaneously brushing at a plurality of dental positions.

The multiple inventions of this application are divided into 3 Chapters.

Chapter 1 corresponds to the priority application NL-2021332 filed on 17 Jul. 2018, titled "Method of manufacturing a recess wall lined with bristles for a mouthpiece for simultaneously brushing at a plurality of dental positions, and a recess wall and mouthpiece obtained with the method." As follows from this title, Chapter 1 is directed to especially a method to manufacture a recess wall lined with bristles for a mouthpiece. The present application claims the priority off NL-2021332.

Chapter 2 corresponds to the priority application NL-2021330 filed on 17 Jul. 2018, titled "Dental cleaning device". Chapter 2 is especially directed to operating the mouthpiece so that it performs his brushing action. The present application claims the priority off NL-2021330.

Chapter 3 corresponds to the priority application NL-2021331 filed on 17 Jul. 2018, titled "Mouthpiece for brushing at a plurality of dental positions, brushing device comprising such mouthpiece, and method of operating such a mouthpiece or brushing device". Chapter 3 is especially directed to a specific configuration of the mouthpiece or recess wall. The present application claims the priority off NL-2021331.

The dental cleaning device of Chapter 2 may comprise a recess wall manufactured with a method as described in Chapter 1, but this is not necessarily the case. The recess wall of the cleaning device of Chapter 2 may also have been manufactured in other manner. Further, the dental cleaning device of Chapter 2 may have a mouthpiece or recess wall configured according to one of the embodiments of Chapter 3, but this is not necessarily the case. The mouthpiece or recess wall of Chapter 2 may also be configured differently. The mouthpiece of Chapter 3 may comprise a recess wall manufactured with a method as described in Chapter 1, but this is not necessarily the case. The recess wall of the mouthpiece of Chapter 3 may also have been manufactured in other manner.

Further, the mouthpiece of Chapter 3 may be operated according to Chapter 2, but this is not necessarily the case. The mouthpiece of Chapter 3 may also be operated in different manner.

The description of this application is arranged in accordance with these 3 Chapters, as is also indicated in the description. The claims contain headers indicating to which Chapter the claims belong.

The Chapters use similar features corresponding terminology. In case of discrepancy between terminology used in one Chapter and terminology used in another Chapter, the terminology used in a Chapter prevails in that Chapter above terminology in other Chapters.

FIELD OF THE INVENTION

The invention of Chapter 1 relates to the field of dental cleaning devices having a mouthpiece for simultaneously brushing at a plurality of dental positions, in particular to dental cleaning devices wherein the mouthpiece is of the type comprising a body provided with at least one recess delimited by a recess wall lined with a plurality of bristles extending from the recess wall into the recess, the recess wall defining an arch-shaped length axis and, viewed transverse to the length axis, a U-shaped cross-sectional shape and being configured for encompassing a plurality of dental positions along a dental arch.

The invention of Chapter 2 relates to a dental cleaning device, in particular to a dental cleaning device of the type that comprises a mouthpiece having a recess which is U-shaped in cross section and which may have a curved length direction.

The invention of Chapter 3 relates to the field of dental cleaning devices, in particular to a mouthpiece for simultaneously brushing at a plurality of dental position. The invention of Chapter 3 further relates to a brushing device comprising the mouthpiece according to the invention of Chapter 3. The invention of Chapter 3 furthermore relates to a method of operating such a mouthpiece or brushing device. The mouthpiece is configured to brush at at least 5 dental positions at the same time.

BACKGROUND OF THE INVENTION

Chapter 1

Cleaning of teeth of humans and animals is a prerequisite for oral health, and health of internal organs. Various dental cleaning devices are available, such as manual and powered toothbrushes. With these typical toothbrushes, it is advised to brush the teeth by a prescribed method for at least two minutes per day to effectively remove plaque. Yet, an average person does not spend all of the prescribed time cleaning his or her teeth, and does not always brush according to an effective method. Additionally, for disabled or elderly persons or children it can be difficult to brush the teeth with a toothbrush, since typical toothbrushes require precise positioning of the brush bristles on various surfaces of the teeth.

In case at some or all dental positions teeth are missing as is frequently the case with elderly persons, cleaning of the gum at these dental positions is still a prerequisite for oral health, and health of internal organs.

There is a need to automatically brush the teeth and/or gum at the dental positions for cleaning the teeth and/or gum at these dental positions, whereby the time and effort required for effective brushing is reduced. In addition, there is a need to avoid carefully maneuvering the brush.

Dental cleaning devices are known comprising mouthpieces which cover the maxillary dental arch and/or the mandibular dental arch. These mouthpieces may be of the type comprising a body provided with at least one recess delimited by a recess wall lined with a plurality of bristles extending from the recess wall into the recess, the recess wall defining an arch-shaped length axis and, viewed transverse to the length axis, a U-shaped cross-sectional shape and being configured for encompassing a plurality of dental positions along a dental arch. The dental positions, like teeth and/or gum, to be brushed are inserted in the at least one recess and the recess wall lined with bristles is operated to brush the teeth and/or gum with the bristles on the recess wall. Depending on the length of the recess several or all dental positions of the maxillary dental arch and/or the mandibular dental arch may be brushed simultaneously. An example of such a mouth piece can be found in PCT/NL2018/050276 filed on 27 Apr. 2018 by applicant. This PCT application was not yet been published at the priority dates of the present application.

A part of such a mouthpiece is the recess wall lined with bristles, which is in length direction arch-shaped and transverse to this length direction U-shaped in cross-section, and which has the bristles at the inner side of the U-shape. The small inner space of the U-shaped cross-section and the arch-shaped length make the manufacturing of such a recess wall lined with bristles quite difficult. Of course such a recess wall lined with bristles can be made manually by attaching the bristles or tufts of bristles one by one to the recess wall. This is however labour intensive and not time and cost efficient. Such a recess wall with U-shaped cross-section and bristles on the inner side of the U-shape may further be made by injection moulding the recess wall and bristles simultaneously, but, due to the small inner width of the U-shape, unloading the moulded recess wall and bristles from the mould is hardly possible to deal with without damaging the bristles. Further, tufting the inner wall of a narrow, arch-shaped channel with U-shaped cross section cannot be automated.

Thus there is a need for a method of manufacturing a continuous recess wall lined with bristles for simultaneously brushing at a plurality of dental positions arranged along an arch spanning a distance at least equal to the distance from the left second pre-molar to the right second pre-molar. In which the recess wall is configured for encompassing the dental positions associated with at least the left second pre-molar to at least the right second pre-molar and has a U-shaped cross section and an arch shaped length axis spanning a distance at least equal to the distance from the left second pre-molar to the right second pre-molar.

Chapter 2

Cleaning the teeth of humans and animals is a prerequisite for oral health, and health of internal organs. Various dental cleaning devices are available, such as manual and powered toothbrushes. With these typical toothbrushes, it is advised to brush the teeth by a prescribed method for at least two minutes per day to effectively remove tooth plaque. Yet, an average person does not spend all of the prescribed time cleaning his or her teeth, and/or does not always brush according to an effective method.

Persons may e.g. exert too much pressure on tooth bristles during brushing the teeth, whereby not only the bristles wear rapidly and excessively, but also the brushing process is not effective, teeth may be damaged, and tooth gum may withdraw which has adverse consequences for the dental health.

Hence, there is a need for an improved dental cleaning device. More specifically, there is a need for a dental cleaning device wherein brushing with an excessive pressure is prevented. Further there is a need for a dental cleaning device with a higher degree of control of the brushing action, to make it almost impossible to brush ineffectively.

U.S. Pat. No. 4,795,347 discloses, in one embodiment, a physical stop to limit the movement of a wall to which bristles are attached. The stop prevents excessive pressures to be applied to tooth of the user. In another embodiment, U.S. Pat. No. 4,795,347 discloses the use of an adjustable pressure setting valve. The valve relieves the pressure in a chamber when the maximally allowed pressure is exceeded.

WO2010076702 uses a pair of valves to control the pressure in a chamber. When a first valve is opened, an under-pressure (partial vacuum) is created under a membrane. When a second valve is opened, an over-pressure is created beneath said membrane.

The application PCT/NL2018/050276, by the same applicant, discloses an electronic valve configured to control the pressure in a chamber of a dental cleaning device. This PCT/NL2018/050276 was not yet published at the priority dates of the present application.

A need for more efficient and/or improved dental cleaning devices however remains.

Chapter 3

Cleaning of teeth of humans and animals is a prerequisite for oral health, and health of internal organs. Various dental cleaning devices are available, such as manual and powered toothbrushes. With these typical toothbrushes, it is advised to brush the teeth by a prescribed method for at least two minutes per day to effectively remove plaque. Yet, an average person does not spend all of the prescribed time cleaning his or her teeth, and does not always brush according to an effective method. Additionally, for disabled or elderly persons or children it can be difficult to brush the teeth with a toothbrush, since typical toothbrushes require precise positioning of the brush bristles on various surfaces of the teeth. Additionally, persons may exert too much pressure on brush bristles during brushing the teeth, whereby not only the bristles wear rapidly and excessively, but also the brushing process is not effective, teeth may be damaged, and tooth gum may withdraw which has adverse consequences for the dental health.

In case at some or all dental positions teeth are missing as is frequently the case with elderly persons, cleaning of the gum at these dental positions is still a prerequisite for oral health, and health of internal organs.

There is a need to automatically brush the teeth and/or gum at the dental positions for cleaning the teeth and/or gum at these dental positions, whereby the time and effort required for effective brushing is reduced. In addition, there is a need to avoid carefully maneuvering the brush.

Dental cleaning devices are known comprising mouthpieces which cover both the maxillary dental arch and the mandibular dental arch. Such a mouthpiece comprises brushing surfaces with bristles, which are automatically moved, to clean the complete set of teeth.

The mouthpiece and the brushing surfaces of the known dental cleaning devices require adjustment to fit closely to the shape of a user's dental arch. The mouthpiece should be able to clean every tooth surface. However, dental arches vary greatly among different users due to varying sizes of the dental arch, malocclusion, missing teeth, and the like. So, there is a need for a dental cleaning device with an adjustable mouthpiece.

Reference US 2010/0062397 A1 discloses an electric dental cleaning device with a mouthpiece. This known mouthpiece has an upper part for cleaning the maxillary/upper arch of the teeth and a lower part for cleaning the mandibular/lower arch of the teeth. Both the upper part and the lower part of this know mouthpiece each have a brush pad, which brush pads each have a U-shaped cross section and bristles on the inside of the U-shape. These two brush pads are positioned with the bottoms of the U-shape of the pads facing towards each other and the legs of the U-shape of the upper brush pad pointing in an upward direction opposite to the legs of the U-shape of the lower brush pad, which point in downward direction. The brush-pads comprise rigid brush plates on the outside of the U-shape, a leg plate at each leg and a bottom plate transverse to the leg plates at the bottom of each U-shape. These U-shaped brush pads are driven up and down relative to the free ends/tops of the teeth in the direction of the legs of the U shape. In some embodiments, a bladder may be positioned between the maxillary arch and mandibular arch of the mouthpiece, i.e. between the bottom plates, and alternating or oscillating pneumatic pressure and suction may be applied to this bladder to move the bottom plates relative to each other, which in turn causes an up and down movement of the U-shaped brush pads, thereby brushing the teeth.

In one embodiment of the mouthpiece according to the reference US 2010/0062397 A1, the mouthpiece is adjustable in that the side/leg brush plates are positioned against the lingual and facial side of teeth by the use of flexible fingers and/or bladders which are configured to exert a static pressure to cause the tips of the bristles of the brush plates to engage the lingual and facial side of the teeth whilst moving up and down, transverse to the direction of the static pressure, along the lingual and facial side of the teeth in a direction.

In US 2010/0062397 A1 the brushing movement is only a 1-D-movement (one dimensional movement) as the U-shaped brush pads are only moved towards and away from each other.

The mouthpiece according to US 2010/0062397 A1 has a drawback of a limited brushing action, since the bristles on the brush pads have a limited capability to reach all surfaces of the teeth since they are mounted on rigid plates.

Reference U.S. Pat. No. 4,795,347—which has as corresponding European application, EP-A-0173114—discloses several embodiments of devices for cleaning a tooth, which can be divided in two types of devices each intended for encompassing one tooth at a time for, so to say, cleaning one tooth at a time. The device of the first type ensures a static brushing pressure of the bristles on the tooth whilst the brushing movement of the bristles is caused by hand, i.e. the brush head is mounted on a handgrip which is manipulated to move the brush head like a regular tooth brush along the tooth. In this first type one single pressure chamber or two opposing pressure bubbles may be used to ensure that the cleaning contact pressure between the individual bristle tufts and the tooth is at least approximately equal all over. Whilst in the first type the brushing movement of the tufts is to be caused by hand, the brushing movement of the device according to the second type is automated by a drive. The device of the second type, shown in FIGS. 10-21 of U.S. Pat. No. 4,795,347, is designed so that the tufts are driven to perform a 2-D-movement (two dimensional movement) with respect to the tooth surface. Each tuft is driven to move in a plane perpendicular to the dental arch, i.e. to the tooth cleaned. In a first stage the tufts are moved towards the tooth to press against the tooth, subsequently the tufts are moved along the tooth surface in a direction from the gum in tooth-axial direction towards the top/crown of the tooth, followed by moving the tufts away from the tooth to lower the pressure and moving the tufts back from the top/crown towards the gum of the tooth for starting the next cycle. In this second type pressure bubbles may be used to drive the tufts to perform this 2-D-movement. In these embodiments the tufts are mounted on a rigid cleaning element carriers onto which the pressure bubbles act directly or indirectly via rocker arms.

The automated mouthpiece according to U.S. Pat. No. 4,795,347 A1 has as drawback a limited brushing action, since the tufts have a limited capability to reach all surfaces of the tooth since they are mounted on rigid carriers. A further disadvantage of this mouthpiece is that only one tooth at a time is cleaned in automated manner and that for cleaning all teeth the automated mouthpiece of U.S. Pat. No. 4,795,347 has to be moved manually along all teeth, which is time consuming.

Thus there remains a need for an automatic dental cleaning device which is fast and thorough in cleaning multiple teeth simultaneously. Also, a need remains for an automatic dental cleaning device which requires as little effort from the user as possible. Also, a need remains for an automatic dental cleaning device which effectively reaches substantially all tooth surfaces.

Further reference is made to PCT/NL2018/050276 filed on 27 Apr. 2018 by applicant. This application PCT/NL2018/050276 was not yet published at the priority dates of the present application, i.e. this PCT/NL2018/050276 is not pre-published. The mouthpiece according to this earlier application of applicant is capable of brushing all teeth of the upper and lower dental arch in one go and has at least one pressure chamber comprising a flexible wall part provided with the bristles. The flexible wall part is configured to be deformable by alternatingly increasing pressure and decreasing pressure of a fluid in the pressure chamber.

SUMMARY OF THE INVENTION

Chapter 1

It is an object of the invention of Chapter 1 to provide an alternative method of manufacturing a recess wall for a mouthpiece for simultaneously brushing at a plurality of dental positions, the recess wall defining a narrow arch shaped channel having a U-shaped cross section, having a length at least equal to the distance from the left second pre-molar to the right second pre-molar, and being covered with bristles on the inner side of the channel.

According to a first aspect of the invention of Chapter 1, one or more of the above objects are achieved by providing a method according to claim 1.

According to the invention of Chapter 1 a method of manufacturing a continuous recess wall lined with bristles for a mouthpiece for simultaneously brushing at a plurality of dental positions is provided. In other words the method results in a recess wall which is configured for brushing at a plurality of dental positions at the same time. In case a natural or artificial tooth element is present at the dental position where the bristles on recess wall brush, this tooth element is brushed. In case a tooth element is absent at the dental position where the bristles on the recess wall brush, the gum may be brushed.

The continuous recess wall obtained with the method according to the invention of Chapter 1 has an arch-shaped length axis and, viewed transverse to the length axis, a U-shaped cross-section configured for encompassing said plurality of dental positions. The arch-shaped length axis has a length which spans a distance at least equal to the distance from the left second pre-molar to the right second premolar. Further, the arch shaped length axis may have a shape similar to the shape of a human dental arch.

The method according to the invention of Chapter 1 comprises a providing step. In this providing step, an elongate, continuous, bristled sheet part having a first side lined with a plurality of bristles is provided. This elongate, continuous, bristled sheet part may be provided as a prefab part which has been pre-fabricated elsewhere, or, in the providing step, a said elongate, continuous, bristled sheet part having an arch shaped length axis and a first side lined with bristles may be made, for example by assembling a sheet part and bristles to an integral part, by injection moulding a sheet part and bristles, by injection moulding a sheet part in a mould in which bristles, for example of nylon, have been placed as inserts to become an integral part with the moulded sheet part, or in any other manner suitable to obtain a sheet part having a first side lined with bristles. The elongate, continuous, bristled sheet part obtained in the providing step has an initial condition having an arch-shaped length axis extending parallel to the bristled sheet part and, viewed transverse to the length axis, an initial shape as cross-sectional shape.

The method according to the invention of Chapter 1 further comprises a transforming step. In this transforming step, the bristled sheet part obtained in the providing step is transformed from the initial condition to a final condition, resulting in the recess wall to be manufactured. In the final condition the cross-sectional shape has a final U-shape— which may correspond to the U-shaped cross section of the recess wall to be manufactured —, the length axis is arch shaped, and the first side is a concave inner side of the final U-shape. A further characteristic of the final condition is that, in the final condition, the first side (of the bristled sheet part) which is lined with the bristles is more concave than in the initial condition.

This method allows the bristled sheet part with bristles to be provided in the providing step to be pre-fabricated elsewhere or made in situ in a condition that the first side of the sheet part, i.e. the side to be lined with the bristles, is for example flat or convex or shallow concave, so that it is easy accessible for making the bristled sheet part. In the initial condition, the bristles may extend in essentially the same direction from the sheet part, the bristles may for example extend about parallel to each other. The bristles may also be grouped in one or more groups of parallel bristles, the bristles of different groups extending in different directions with respect to each other. For example a flat or convex first side of the sheet part in the initial condition allows a mould half, in case of injection moulding the sheet part and/or bristles, to be removed easily when unloading the moulded sheet part and bristles, see for example DE 103.03.548 where a sheet part with bristles for a conventional toothbrush is made by injection moulding the sheet part in several steps and inserting tufts of bristles into a mould half. Further a flat or convex first side of the sheet part in the initial condition also allows other techniques to be used for assembling a sheet part with bristles, like options offered by GB Boucherie NV, Belgium like the AFT toothbrush technology or technologies of Zahoransky AG, Germany like anchorless toothbrushes. This pre-assembled bristled sheet part is subsequently subjected to a transforming step, in which the initial condition of the bristled sheet part is transformed to the recess wall to be manufactured, which recess wall to be manufactured has a final condition. In this transforming step, the bristled sheet part obtained in the providing step is brought to its final U-shaped cross section in which the bristles on opposing sides of the U-shaped cross section extend towards each other, and may cross each other.

According to a further embodiment of the invention of Chapter 1, the final U-shape may be defined by two legs and a bottom connecting these legs, and a vertical axis may be defined as extending transverse to the bottom between the legs. According to this embodiment, the bristles on the one leg and the bristles on the other leg may, in the final condition, extend from the respective leg towards each other. Further according to this embodiment, the bristles on the legs may, in addition or alternatively and viewed in the final condition, be provided at an angle with respect to the vertical axis, the angle being in the range of 30° to 90° with respect to the vertical axis.

According to a further embodiment of the invention of Chapter 1, in which two legs and a bottom connecting these legs are defined by the final U-shape, a vertical axis is defined as extending transverse to the bottom, and the legs define, at each root of a said bristle on that leg, a tangent to the first side of the bristled sheet part, which tangent extends in a plane transverse to the length axis; in which the bristles may, in the initial condition, extend parallel to the vertical axis and each said tangent may have a respective initial angle with respect to the vertical axis; the legs are, in the transforming step, bended towards each other rotating each respective tangent through an angle of x° with respect to the vertical axis such that the bristle associated to the respective tangent extends at an angle of x° with respect to the vertical axis in a direction pointing away from the bottom. In case the legs are straight and do not bend when bending the legs towards each other, this further embodiment can also be phrased as an embodiment, in which two legs and a bottom connecting these legs are defined by the final U-shape and a vertical axis is defined as extending transverse to the bottom; the bristles may, in the initial condition, extend parallel to the vertical axis; at least a part of said bristles on the legs may, in the final condition, extend at an angle of x degrees with respect to the vertical axis in a direction pointing away from the bottom; the legs may, in the initial condition, have an initial angle with respect to the vertical axis; and the legs may, in the final condition, have a final angle with respect to the vertical axis, which is said x degrees larger than the initial angle.

Doing so, i) the pre-fabricated part, i.e. the bristled sheet part, is provided, in the providing step, with all bristles parallel to each other and to the vertical axis which simplifies the making of the pre-fabricated part considerable. Next in the transforming step, the legs are rotated through an angle of x degrees with respect to the vertical and towards each other, so that in the final condition the bristles on the legs extend at an angle of x degrees with respect to the vertical. The value for x may according to the invention of Chapter 1 be in the range of 0°-90°, such as in the range of 30°-60°, for example in the range of 40°-50°. Additionally or alternatively, the final angle of the legs with respect to the vertical axis may according to the invention of Chapter 1 be in the range of 0°-45°, for example in the range of 5°-20°.

According to a further embodiment of the invention of Chapter 1, the elongate, continuous, bristled sheet part having an arch shaped length axis and a first side lined with bristles is made in the providing step. The providing step then may start with an (elongate, continuous) sheet part (still without bristles) as a prefabricated part. This sheet part may for example be made of TPE or any other suitable sheet part material mentioned or not mentioned in this Chapter 1. Then during the providing step, this—not yet bristled sheet part— is provided with bristles or tufts of bristles. These bristles respectively the bristles of the tufts may be made of Nylon or PBT (polybutylene terephthalate) or any other suitable bristle material mentioned or not mentioned in this Chapter 1. The bristles or tufts of bristles will be fixed to the sheet part. This fixing of the bristles to the sheet part may be by tufting, adhering, fusing or any other method described or not described in this Chapter 1. The bristled sheet part thus obtained will subsequently be subjected to the transforming step of the method according to the invention of Chapter 1.

According to a further embodiment of the invention of Chapter 1, the bristles having a root end, a free end and a bristle body extending from the root end to the free end, the bristled sheet part obtained in the providing step is produced—in the providing step or prior to the providing step—by tufting, the tufting comprising

- inserting a plurality of nylon bristles or tufts of nylon bristles through a first sheet part to extend with the bristle body and free end from a front side of the first sheet part, and to project with a root end at a back side of the first sheet part;
- optionally providing a second sheet part against the backside of the first sheet part; and
- fusing the root ends of the bristles with the first sheet part and/or—in case present—the second sheet part.

The tufting may take place during the providing step, but a tufted, bristled sheet part may also be a pre-fabricated part delivered to the providing step. In the latter case the tufting will already have taken place prior to the providing step, for example at a much earlier time and/or at a different location different from the location where the providing step takes place. Providing the optional second sheet part may be by injection moulding the second sheet part against the backside of the first sheet part. Alternatively, the second sheet part may be a pre-fabricated part which is placed against the backside of the first sheet part and heated to get the roots fused to the second sheet part. In absence of the second sheet part, the root ends will be fixed to the first sheet, for example by fusing them to the first sheet. In case the optional second sheet is present, the roots are fixed to the first sheet part and/or second sheet part, for example by fusing the roots to one or both of the sheet parts. As such, the tufting may take place according to a method already known, for example the method described in DE 103.03.548.

According to a further embodiment of the invention of Chapter 1, the bristled sheet part may, in the transforming step, be transformed from the initial condition to the final condition by thermoforming. The thermoforming may for example be done by vacuum forming. The bristled sheet part may be placed in a mould with the second side facing into a U-shaped mould cavity and the first side with bristles facing away from the U-shaped mould cavity, after which the mould cavity may be vacuumed causing the bristled sheet part to be suctioned into the cavity and taking the shape of the U-shaped cavity. When transforming the bristled sheet part from the initial condition to the final condition, the bristled sheet part may according to the invention of Chapter 1 be stretched by the thermoforming. According to a further embodiment the bristles may, in the final condition and viewed in the direction along the contour of the U-shape, be regularly distributed. Further in addition or alternatively, the distribution of the bristles on the bristled sheet part may, in the initial condition, be configured such that, in the final condition and viewed in the direction along the contour of the U-shape, the bristles are regularly distributed or distributed according to a predetermined pattern. In other words, the pattern of the bristles in the initial condition is determined such that, taking into account the stretch of the sheet part occurring during the thermoforming, the predetermined pattern, such as a regular distribution, is obtained in the final condition.

According to a further embodiment of the invention of Chapter 1, the length axis may have a curvature which is in the initial condition the same as in the final condition i.e. in the transforming step the curvature of the length axis is not changed.

According to a further embodiment of the invention of Chapter 1, wherein the length axis of the bristled sheet part may have an initial curvature in the initial condition and a final curvature in the final condition, the initial curvature being curved wider than the final curvature. In the transforming step, the curvature of the length axis of the bristled sheet part will be reduced from the wide initial curvature to the narrow final curvature. Reducing the curvature of the length axis supports or promotes the cross-sectional shape transforming to a more concave shape than it had in the initial condition. In this respect, it may be helpful when the cross-sectional shape of the bristled sheet part has, viewed with respect to the first side of the bristled sheet part, already a concave shape (which is less concave than in the final configuration).

According to a further embodiment of the invention of Chapter 1, in which the bristled sheet part has two boundary edges (delimiting the bristled sheet part and) extending along the length axis, optionally parallel to the length axis, at, viewed in a direction transverse to the length axis, a mutual distance from each other, the bristled sheet part may, in the transforming step, be transformed by reducing the mutual distance between the two boundary edges. Making use of the frame members, the bow curvatures of the frame members may, in the initial condition, either be wider than the final curvature of the bristled sheet part or correspond to the final curvature of the bristled sheet part.

According to a further embodiment of the invention of Chapter 1, the bristled sheet part, obtained in the providing step, may be:

- delimited by an inner boundary edge and an outer boundary edge, extending along the length axis at a distance from the length axis,
- an integral part with a lingual frame member and facial frame member both being bow-shaped along a respective bow curvature, and
- comprises, at the inner boundary edge, an inner attachment member extending along the inner boundary edge, such as along the entire inner boundary edge, and attached to the lingual frame member, and, at the outer boundary edge, an outer attachment member extending along the outer boundary edge, such as along the entire outer boundary edge, and attached to the facial frame member.

According to this further embodiment, the facial frame member and lingual frame member may be provided as one or two parts separate from the bristled sheet part, which are, after having provided in the providing step, assembled together in the providing step. The providing step may then comprise several sub-steps:

- providing the facial frame member and the lingual frame member,
- providing, separate from the facial and lingual frame member, the bristled sheet part integral with the inner and outer attachment member, and
- attaching the inner attachment member and outer attachment member to the lingual frame member respectively facial frame member.

Alternatively, the bristled sheet part, the facial frame member and the lingual frame member may according to this further embodiment also be provided as a prefabricated integral part, which may have been made at a very different location or a very different moment in time. In other words the prefabricated integral part comprising the bristled sheet part, facial frame member and lingual frame member may so to say be the input of the providing step as well as the output (=the bristled sheet part obtained) of the providing step. The lingual and facial frame member may be one integral frame member or two separate frame member parts.

According to a further embodiment of the invention of Chapter 1, the bristled sheet part, the facial frame member and the lingual frame member are made, during the providing step or prior to the providing step, by injection moulding, for example multi material injection moulding. According to a first example, tufts of bristles, for example nylon bristles, may be placed in an injection moulding mould and subsequently the material for forming the sheet part may be injected to over-mould the root parts of the tufts. According to a second example a bristled sheet part—for example prefabricated according to the first example—may be placed in an injection moulding mould and the material for the lingual and facial frame members may be injected into the mould to over-mould with a part of the sheet part, like an attachment member. According to a third example, the frame members—for example prefabricated by injection moulding—are placed in an injection moulding mould and the bristle and sheet material may be injected to over-mould with the frame members or the sheet material may be injected to over-mould with both the tuft inserts (according to the first example) and the frame members. According to a fourth example, which may be in combination with the first example, the frame material for the facial and lingual frame member and the sheet material for the sheet part and—if not provided according to the first example—optionally the bristles may be injected into the mould to form the sheet part, and optionally the bristles, and the lingual and facial frame member by simultaneously or sequentially injecting the frame and sheet material.

According to a further embodiment of the invention of Chapter 1, the inner and outer attachment member may be configured as a side flap extending along the inner boundary edge respectively the outer boundary edge and to be attached, for example adhered, to the lingual respectively facial frame member. Adhering may be by means of an adhesive (or glue), by means of tape, by means of thermal welding or by means of a multi material injection moulding technique causing, at the location where the injected material for the frame members and the injected material for the sheet part come together, a fused interface layer.

According to a further embodiment of the invention of Chapter 1, the inner and outer attachment member may be configured as a double side flap extending along the inner boundary edge respectively the outer boundary edge, wherein the lingual and facial frame part are configured with a plate part, wherein the double side flap comprises a first flap part and a second flap part parallel to the first flap part and at a distance from the first flap part to define, between the first and second flap part, a gap configured to receive the plate part of the lingual respectively facial frame part. The plate parts inserted in the gap between the flaps will be attached to the flaps, for example by adhering. Adhering may be by means of an adhesive (or glue), by means of tape, by means of thermal welding or by means of a multi material injection moulding technique causing, at the location where the injected material for the frame members and the injected material for the sheet part come together, a fused interface layer.

According to a further embodiment of the invention of Chapter 1, two said bristled sheet parts are obtained in the providing step, each bristled sheet parts:

being delimited by a said inner boundary edge and a said outer boundary edge, extending along the length axis at a distance from the length axis, being an integral part with a said lingual frame member and facial frame member both being bow-shaped along a respective bow curvature, and comprising, on the inner boundary edge, a said inner attachment member extending along the inner boundary edge and attached to the lingual frame member, and, on the outer boundary edge, a said outer attachment member extending along the outer boundary edge and attached to the facial frame member, wherein the facial frame member associated to a first of said two bristled sheet parts is provided with a male or female part of a first snap connection and the facial frame member associated to a second of said two bristled sheet parts is provided with a mating female respectively male part of said first snap connection, and wherein the lingual frame member associated to the first of said two bristled sheet parts is provided with a male or female part of a second snap connection and the facial frame member associated to the second of said two bristled sheet parts is provided with a mating female respectively male part of said second snap connection. Both the female parts of the two snap connections may be provided on the lingual and facial frame member of one said set, whilst the mating male parts of the two snap connections are provided on the lingual and facial frame member of the other said set. Alternatively, the lingual frame member of the one set may be provided with a female part of the first snap connection and the facial frame member of the one set with a male part of the second snap connection, whilst the lingual frame member of the other set may be provided with a male part of the first snap connection and the facial frame member of the other set with a female part of the second snap connection.

According to a further embodiment of the invention of Chapter 1, the bow curvatures of the lingual and facial frame members as obtained with the bristled sheet part in the providing step may, be wider than the final curvature; and the bow curvatures are, in the transforming step, reduced to correspondence with the narrower final curvature. Reducing the bow curvatures of the frame members, after having attached the inner and outer edge of the bristled sheet part to a respective frame member is a simple action which is easy to automate. Reducing these bow curvatures, results in simultaneously reducing the curvature of the length axis of the bristled sheet part, which in turn results in increase of the concavity of the first side of the bristled sheet part.

According to a further embodiment of the invention of Chapter 1, the lingual and facial frame members may be resilient and may have a relieved condition in which the frame members are stress-less and have a bow curvature corresponding to the final curvature of the recess wall; the method may further comprise a pre-biasing step which takes place before or during the providing step; wherein, in the pre-biasing step, the frame members are pre-tensioned from the relieved condition to a pre-tensioned condition in which the bow curvatures of the frame members are widened to correspond to the initial curvature of the bristled sheet part and in which the frame members have a pre-tension acting in a direction to return the frame members to their relived condition; and wherein, in the transforming step, the bow curvatures are reduced (narrowed) by releasing the pre-tension of the frame members. Doing so, the pretension built up in the frame members is used to increase of the concavity of the first side of the bristled sheet part.

According to a further embodiment of the invention of Chapter 1, two said bristled sheet parts may be obtained and the attachment members of a first and second sheet part may be attached to each other, for example by thermal welding. The attachment parts may be attached directly to each other, for example by thermal welding, or indirectly via an intermediate part in which case thermal welding may be used as well.

According to a further embodiment of the invention of Chapter 1, wherein the mouthpiece to be manufactured is of the type having two said recesses each delimited by a said recess wall lined with a said plurality of bristles, wherein the arc shaped length axes of said recesses walls are parallel and the U-shaped cross-sectional shapes are open in opposing directions;

the providing step may provide a first said bristled sheet part and a second said bristled sheet part as one single part having a transition area connecting the first bristled sheet part integrally with the second bristled sheet part, wherein the transition zone is configured to allow the two bristled sheet parts to be folded with respect to each other from a first position in which the two bristled sheet parts are aligned to a second position in which the two bristled sheet parts are folded over each other; and wherein the method further comprises a folding step in which the bristled sheet parts are folded with respect to each other from the first to the second position. This folding step may take place before the transforming step, after the transforming step or during the transforming step.

According to a further embodiment, the length of the length axis spans a distance at least equal to the distance from the left first molar to the right first molar, such as a length spanning a distance at least equal to the distance from the left second molar to the right second molar.

According to a further embodiment, the bristled sheet part obtained in the providing step may be lined with at least 5 bristles per $cm^2$, such as at least 10 bristles per $cm^2$. In case of for example elastomeric bristles injection moulded together with the bristled sheet part, the bristled sheet part may be lined with 40 to 200 bristles per $cm^2$. In case of for example bristles of nylon, the bristled sheet part may be lined with 1000 to 6000 bristles per $cm^2$.

According to a further embodiment of the invention of Chapter 1, the final U-shape may have an internal width in the range of 0 to 10 mm, such as in the range of 2 to 12 mm; and/or the final U-shape has an internal height in the range of 3 to 20 mm, such as in the range of 5 to 10 mm.

According to a further embodiment of the invention of Chapter 1, the bristled sheet part has a thickness of up to 15 mm, such as a thickness in the range of 0.5 to 3 mm, this thickness being defined as the thickness of the sheet part itself, i.e. without (the length of) the bristles.

According to a second aspect of the invention of Chapter 1, the invention relates to a method of manufacturing a mouthpiece of the type comprising a body provided with at least one recess delimited by a recess wall lined with a plurality of bristles extending from the recess wall into the recess, the recess wall defining an arch-shaped length axis and, viewed transverse to the length axis, a U-shaped cross-sectional shape and being configured for encompassing a plurality of dental positions along a dental arch; and wherein the recess wall is manufactured according to the first aspect of the invention of Chapter 1. The bristled sheet part obtained in the providing step may be provided as a part separate from the body Further, the bristled sheet part obtained in the providing step may for example before, during or after the transforming step, be attached to the body to become an integral part of the body.

According to a further embodiment of the invention of Chapter 1, the body may further comprise at least one pressure chamber configured for containing a fluid under pressure and wherein the body is configured to deform the recess wall by reciprocatingly increasing and decreasing a pressure in the at least one pressure chamber. The body is configured to deform the recess wall by reciprocatingly (alternatingly) increasing and decreasing the pressure in the at least one pressure chamber causing a sustained repeating, reciprocating motion of the recess wall and bristles on that recess wall. The mouthpiece may comprise one, two, three, four, five, six, or any other number of pressure chambers which can be filled with a fluid, as explained in PCT/NL2018/050276, which is in the name of the same applicant and was not yet published at the priority dates of the present application. By alternatingly (reciprocatingly) increasing a pressure in the at least one of the pressure chambers from a decreased pressure condition to an increased pressure condition and decreasing the pressure in this pressure chamber(s) from the increased pressure condition to the decreased pressure condition and sustained repeating this reciprocating motion, the recess wall carrying the optional bristles is brought into motion resulting in the recess wall respectively bristles acting at the dental position on the objects—teeth and/or gum present at these dental positions—to clean said objects.

According to a third aspect of the invention of Chapter 1, the invention relates to a mouthpiece obtained with the method according to the second aspect of the invention of Chapter 1.

According to a fourth aspect of the invention of Chapter 1, the invention relates to a recess wall for a mouthpiece for simultaneously brushing at a plurality of dental positions, wherein the recess wall is obtained by a method according to the first aspect of the invention of Chapter 1.

According to a fifth aspect of the invention of Chapter 1, the invention relates to a mouthpiece for simultaneously brushing at a plurality of dental positions; wherein the mouthpiece is of the type comprising a body provided with at least one recess delimited by a recess wall lined with a plurality of bristles extending from the recess wall into the recess, the recess wall defining an arch-shaped length axis and, viewed transverse to the length axis, a U-shaped cross-sectional shape and being configured for encompassing a plurality of dental positions along a dental arch; and wherein the recess wall is manufactured according to the first aspect of the invention of Chapter 1.

According to the invention of Chapter 1, the sheet part—the part of the bristled sheet without the bristles—may be made from a plastic, for example an injection mouldable or extrudable plastic. The plastic may for example be a thermoplastic elastomer.

Chapter 2

According to a first aspect of the invention of Chapter 2, an improved dental cleaning device is provided, comprising:
a mouthpiece having a pressure chamber and a recess which is U-shaped in cross section and delimited by a flexible and deformable recess wall, the pressure chamber being configured for containing a fluid under pressure;
optionally, a plurality of bristles, each attached to the recess wall with one end thereof and extending from said recess wall into the recess;
a pump unit arranged in fluid communication with said pressure chamber, the pump unit being configured to reciprocatingly increase and decrease a pressure in the pressure chamber between an increased pressure condition and a decreased pressure condition by pumping a volume of fluid into, respectively out of, the pressure chamber, thereby deforming the recess wall and moving the recess wall back and forth increasing respectively decreasing the recess;

a pressure sensor configured to measure a pressure representative of the pressure in the pressure chamber and to produce a pressure signal representative of said pressure, and a controller configured to generate a control signal;

wherein the pressure sensor and the controller are connected such that the controller, in use, receives the pressure signal from the pressure sensor and the controller and pump unit are connected such that the pump unit, in use, receives the control signal from the controller; wherein the controller is configured to generate the control signal in dependence on the pressure signal and the pump unit is configured to provide a delivery into and/or out of the pressure chamber in response to the control signal; and wherein the controller is configured to reduce the delivery of the pump unit when the pressure in the pressure chamber exceeds a predetermined upper threshold.

According to the present invention of Chapter 2, the dental cleaning device comprises a pressure sensor and a controller. The pressure sensor is configured to measure a pressure representative of the pressure in the pressure chamber. The pressure sensor may for example be arranged in the pressure chamber, where it measures said pressure directly. Alternatively, the pressure sensor may be arranged in an inlet tube that is arranged between the pump unit and the pressure chamber, e.g. near the pressure chamber, where it measures the pressure of the fluid entering the pressure chamber. From said pressure, the pressure in the pressure chamber may be calculated and/or estimated. Further alternatively, the pressure sensor may be arranged in an inlet tube that is arranged between the pump unit and the pressure chamber, e.g. near the pump, where it measures the pressure of the fluid exiting the pump unit. From said pressure, the pressure in the pressure chamber may be calculated and/or estimated. Yet alternatively, the pressure sensor may be integrated with the pump unit, where it measures the pressure of the fluid exiting the pump unit. From said pressure, the pressure in the pressure chamber may be calculated and/or estimated.

While measuring the pressure in the pressure chamber, said pressure may be compared to a reference pressure, such as the ambient pressure. A relative pressure may then be measured, the measured pressure being relative to the reference pressure (ambient pressure). Alternatively, an absolute pressure measurement may be taken, measuring the absolute value of the pressure in the pressure chamber.

According to the invention of Chapter 2, the pressure sensor and the controller are connected. That is, the pressure sensor and the controller are arranged in communication with each other, and a signal can be send from the pressure sensor to the controller (and/or vice versa). The connection may e.g. be a wired connection, or a wireless connection. The pressure sensor produces a pressure signal that is representative of the pressure (in the pressure chamber) measured by the pressure sensor. This pressure signal is, in use of the dental cleaning device, send to the controller, which controller receives said signal.

According to the invention of Chapter 2, the controller is configured to generate a control signal, in dependence of the pressure signal. For example, the control signal may indicate whether the pressure in the pressure chamber is too high, within pre-defined boundaries, or too low. A control signal may be generated continuously. For example, when the pressure signal indicates that the pressure in the pressure chamber is too high (when the pressure exceeds a pre-set upper threshold), the control signal may change with respect to the control signal that is generated when the pressure in the pressure chamber is within the pre-defined boundaries. Hence, the change in the control signal may indicate that the function of the dental cleaning device is not as desired. When the pressure signal indicates that the pressure in the pressure chamber is below the pre-set upper threshold, the control signal may have other characteristics. For example, the control signal generated when the pressure is below the pre-set upper threshold, may indicate to the pump unit that the dental cleaning device is functioning as desired.

The control signal may alternatively be a switch-type signal, which is only generated when the pressure exceeds the pre-defined threshold, or which is only generated when the pressure is within the desired boundaries. Hence, the control signal may not be continuously generated.

According to the invention of Chapter 2, the controller and the pump unit are connected. That is, the controller and the pump unit are arranged in communication with each other, and a signal can be send from the controller to the pump unit (and/or vice versa). The connection may e.g. be a wired connection, or a wireless connection When the controller produces a control signal said signal is, in use of the dental cleaning device, send to the pump unit, which pump unit receives said signal. In response to said control signal, the pump unit provides a delivery into and/or out of the pressure chamber.

Hence, upon performing its work, the pump unit delivers the fluid into and out of the pressure chamber at a delivery of for example between 0 and 4 litres per minute. The pump unit may be configured to deliver a pre-set delivery (in litres per minute) of fluid into and out of the pressure chamber. When receiving the control signal, the pump unit may then, respectively, continue its work at the present delivery, lower its delivery, or increase its delivery. In the case a too low pressure is measured in the pressure chamber, the delivery may be increased. Generating a control signal in dependence on the pressure signal may ensure that the pressure is kept below a predetermined upper threshold. Alternatively, the control signal may change when said upper threshold is reached, indicating that the delivery of the pump unit is to be altered.

According to the invention of Chapter 2, the controller of the dental cleaning device is configured to reduce the delivery upon exceeding the predetermined upper threshold. That is, the controller may be configured to reduce the amount of air pumped into the pressure chamber by the pump unit when the pressure in the pressure chamber exceeds an upper threshold. As a result of reducing the delivery of the pump, the pressure in the pressure chamber drops, preventing the brushing of a user's teeth or gum with an excessive pressure while operating the dental cleaning device more efficiently—for example less power consumption which may result in less often recharging the battery —, and hence improving its working.

Further, by controlling the delivery of the pump via a control signal based upon a pressure measurement, brushing teeth with an excessive pressure is prevented.

The dental cleaning device according to the invention of Chapter 2 comprises a mouthpiece having at least one recess, which may e.g. be one or two recesses. This at least one recess is U-shaped in cross-section. The mouthpiece comprises, per said recess, a recess wall delimiting the respective recess. The recess wall may be flexible and/or deformable. The recess wall may be formed from a sheet, which may for example be made of a thermoplastic elastomer, a silicone elastomer, or a silicon polymer. The recess wall is optionally lined with a plurality of bristles, each having one end attached to the recess wall and extending from the recess wall into the recess. In other words, the mouthpiece has a recess, the recess wall of which may be covered with bristles distributed over the wall of the recess. At least one dental position, like a tooth element of this position or the gum covering the jawbone at the location of the dental position, can be received in the recess, and, in case present, the bristles in the recess will be able to brush the at least one dental position at both the lingual side (facing the tongue of a user), the facial side (facing the lips/cheeks of a user), and preferably also the free end face of the tooth (chewing surface/cutting edge facing the opposite jawbone). Alternatively formulated, the bristles, if present, in use face towards teeth of a user. The bristles may be made of a nylon, an elastomer, or any other suitable material. In case of a dental arch without teeth, the remaining arch of gum may need treatment as well. In this case the gum may be massaged by a recess wall with or without bristles. For improved cleaning of the gum, a cleaning fluid may be used in such a mouthpiece without bristles.

The mouthpiece according to the invention of Chapter 2 has at least one pressure chamber configured for containing a fluid under pressure, which pressure can be increased and decreased. The body is configured to deform the recess wall by reciprocatingly (alternatingly) increasing and decreasing the pressure in the at least one pressure chamber causing a sustained repeating, reciprocating motion of the recess wall and, if present, bristles on that recess wall. The mouthpiece may comprise one, two, three, four, five, six, or any other number of pressure chambers which can be filled with a fluid, as explained in PCT/NL2018/050276, which is in the name of the same applicant and was not yet published at the priority dates of the present application. By alternatingly (reciprocatingly) increasing a pressure in the at least one of the pressure chambers from a decreased pressure condition to an increased pressure condition and decreasing the pressure in this pressure chamber(s) from the increased pressure condition to the decreased pressure condition and sustained repeating this reciprocating motion, the recess wall carrying the optional bristles is brought into motion resulting in the recess wall respectively bristles acting at the dental position on the objects—teeth and/or gum present at these dental positions—to clean said objects.

The recess is delimited by a recess wall. For example a flexible and deformable recess wall which may delimit a part of the pressure chamber as well, i.e. be also a wall of the pressure chamber. It is alternatively however also possible that the recess wall is formed by one or more stiff pressure plates.

With respect to the terminology 'increased pressure condition' and 'decreased pressure condition', it is noted that these conditions are relative to each other, i.e. in the decreased pressure condition the pressure is decreased (lower) with respect to the increased pressure, and vice versa. In both conditions, the pressure may be lower than the ambient pressure.

The length of the mouthpiece, measured in a direction transverse to the U-shaped cross-section and along a dental arch of a user, may be approximately equal to the width of a human or animal tooth. A user of the dental cleaning device may then move it along the dental arch that is to be brushed, e.g. first along the mandibular dental arch and the along the maxillary dental arch, or vice versa. The length of the mouthpiece may alternatively be at least the length of five teeth, such that at least five dental positions may be brushed at the same time. For example, the length of the mouthpiece may, measured in a direction transverse to the U-shaped cross-section and along a dental arch of a user, measure a length which spans:

- a distance at least equal to the distance from the left second pre-molar to the right second pre-molar of a dental arch of a human, such as an adult human;
- a distance at least equal to the distance from the left first molar to the right first molar of a dental arch of a human, such as an adult human; or
- a distance of substantially the full length of the dental arch of a user (i.e. at least the arch from the left second molar to the right second molar), such that the entire dental arch may be brushed at the same time.

Further in addition, the arch-shaped length axis may have a shape similar to the shape of a human dental arch or similar to at least part of the shape of a human dental arch.

The dental cleaning device according to the invention of Chapter 2 further comprises a pump unit arranged in fluid communication with said pressure chamber, the pump unit being configured to reciprocatingly increase and decrease a pressure in the pressure chamber between an increased pressure condition and a decreased pressure condition by pumping a volume of fluid into, respectively out of, the pressure chamber, thereby deforming the recess wall and moving the recess wall back and forth increasing respectively decreasing the recess. The pump unit thus has a pumping action which sustained repeats increasing and decreasing of the pressure in the pressure chamber. For example, the pump unit may comprise a pumping device configured to pump a fluid in the pressure chamber, and a suction device configured to suck fluid out of the pressure chamber to alternatingly (reciprocatingly) increase and decrease the pressure in the pressure chamber between said increased pressure condition and said decreased pressure condition. By alternatingly moving the recess wall back and forth, increasing respectively decreasing the recess, teeth and/or gum of the user is brushed, to improve the oral health of the user.

In a further embodiment of the first aspect of the invention of Chapter 2, the pump may be configured to operate at a predetermined operating frequency, such as within a narrow frequency range around this predetermined operating frequency. Alternatively, the controller may be configured to operate the pump at a predetermined operating frequency, such as within a narrow frequency range around this predetermined operating frequency. Further alternatively or additionally, the configuring of the controller 'to reduce the delivery of the pump unit when the pressure in the pressure chamber exceeds a predetermined upper threshold' is such that a change of the operating frequency is prevented.

Depending on design parameters such as bristle length, stiffness of the bristle, characteristics of the flexible and deformable recess wall, etc., the brushing/cleaning action of the dental cleaning device may be optimal at a certain operating frequency. Preferably, the dental cleaning device is operated AT that operating frequency (the reciprocating increasing and decreasing of the pressure in the pressure chamber occurs at that operating frequency) when using the dental cleaning device, also after the control signal has indicated that the upper pressure threshold is reached. For example, in case the fluid in the pressure chamber is a gas, the reciprocating increasing and decreasing of the pressure in the pressure chamber might at higher frequencies become ineffective for getting the recess wall into motion and unpleasant for the user. This also applies in case the fluid is a liquid. Further, in case a flexible and deformable recess wall is used the recess wall might not deform in response to reciprocatingly increasing and decreasing of the pressure in the pressure chamber at higher frequencies.

Therefore, when altering the working of the dental cleaning device after said indication, the operating frequency, at which the pump unit operates or is operated, is according to this further embodiment unaltered such that the pump operates at a predetermined operating frequency.

Said predetermined operating frequency may be a fixed value of for example 8 Hz. Although it may according to the invention of Chapter 2 be the intention to control the delivery of the pump without affecting the operating frequency of the pump, as a side effect of control actions ripples in the operating frequency may occur, for example with a fixed predetermined operating frequency of 8 Hz, ripples in the range of ±0.5 to ±1 Hz may occur.

Said predetermined operating frequency may also vary as a function of time. In other words, the pump unit may have an operating frequency which varies according to a predetermined function of the time measured as from switching on the pump. In a formula this reads as $f_f=x(t)$. Every time the pump is switched on, the predetermined function will start again at $t=0$. $x(t)$ is a predetermined continuous or discontinuous function of the time. For example, the operating frequency may start at $t=0$ with a low frequency, then rise to a higher frequency and at the end—for example after 20-30 seconds—slow down to a lower frequency. Starting with a low frequency may prevent the user from giving a startle response when switching on the pump and ending with a low frequency may give the user an indication that the brushing is almost completed, whilst in between the frequency may be optimal for a good brushing result. Also here it is noted that, although it may according to the invention of Chapter 2 be the intention to control the delivery of the pump without affecting the operating frequency of the pump, as a side effect of control actions ripples in the operating frequency may occur, for example ripples in the range of ±0.5 to ±1 Hz may occur.

Said predetermined operating frequency may—both in the case of a fixed operating frequency and in the case of an operating frequency varying with time—be in the range of 0.5 to 20 Hz.

In another further embodiment of the first aspect of the invention of Chapter 2, the upper threshold is at most 2 bar relative to ambient pressure, such as at most 1 bar relative to ambient pressure. A too high pressure in the pressure chamber may result in an uncomfortable user experience for a user of the dental cleaning device, and may easily result in an excessive brushing force. Additionally, a too high pressure may cause rupture of the recess wall, possibly resulting in harming the user and/or economic loss of the dental cleaning device. The mentioned upper threshold of at most 2 bar relative to ambient pressure may be sufficiently low in order to omit these adverse effects. Preferably, the upper threshold is at most 0.3 bar relative to ambient pressure (1.3 times the ambient pressure), such as at most 0.2 bar relative to ambient pressure (1.2 times the ambient pressure). At such pressures, the brushing action of the dental cleaning device is still sufficient, while lowering the risk of injuring gum of the user, and the other adverse effects mentioned.

It is noted that a direct pressure measurement, wherein the absolute pressure is measured, may be difficult to achieve in a dental cleaning device according to the invention of Chapter 2. It is foreseen that instead of measuring the absolute pressure, a comparison with a reference pressure, e.g. the ambient pressure, is made to determine the pressure in the pressure chamber. Hence, the e.g. the wording "0.3 bar relative to ambient pressure" may alternatively mean "approximately 1.3 times ambient pressure", or "an approximate pressure of 1.3 bar", depending on the specific measurement taken. It is commonly known that ambient pressure depends e.g. on geographic location, height, and weather conditions, and is about 1 bar everywhere on the earth.

In still another further embodiment of the first aspect of the invention of Chapter 2, the controller may be further configured to increase the delivery of the pump unit when said pressure in the pressure chamber falls below a predetermined lower threshold, e.g. in the increased pressure condition and/or decreased pressure condition. Similar to the situation in which the pressure in the pressure chamber is too high, also a too low pressure may adversely affect the working of the dental cleaning device. For example, when the pressure is too low, the bristles of the dental cleaning device may not rub against the teeth of the user with a sufficient force, resulting in an insufficient cleaning/brushing of the teeth. Therefore, the delivery, and thus also the pressure in the pressure chamber, is, according to this another further embodiment, increased when the pressure in the pressure chamber falls below said lower threshold.

In an elaboration of this another further embodiment, the value of the lower threshold may be 1 bar or less below the value of the upper threshold. That is, the maximum pressure difference in the pressure chamber, allowed by the controller, may be 1 bar or less. For example, when the upper threshold is 1.3 bar (ambient pressure plus 0.3 bar), the lower threshold may be 0.3 bar (ambient pressure minus 0.7 bar). For example, the difference between the values of the upper threshold and the lower threshold may be 0.4 bar. The nominal pressure difference between the decreased pressure condition and the increased pressure condition may however be less or substantially less than the difference between the values of the upper and lower threshold. That is, the upper and lower threshold may not be reached every pressurization cycle. For example, when the difference between the values of the upper and lower threshold is 0.4 bar, the nominal pressure difference between the increased and decreased pressure condition may be only 0.1 or 0.2 bar.

In another elaboration of this another further embodiment, the lower threshold may be in the range of −0.5 to +0.2 bar relative to ambient pressure (0.5-1.2 times the ambient pressure), such as in the range of −0.5 to 0 bar relative to ambient pressure (0.5-1 times the ambient pressure). Hence, the pressure in the pressure chamber may be below ambient in the decreased pressure condition, while the pressure in the pressure chamber may be above ambient pressure in the decreased pressure condition.

According to a second aspect of the invention of Chapter 2, a dental cleaning device for simultaneously brushing at a plurality of dental positions is provided, which device comprises:

a mouthpiece having a pressure chamber and a recess delimited by a recess wall which may be flexible and deformable, the recess having a curved length direction and a U-shaped cross-section transverse to the length direction, the recess being configured for encompassing, viewed in the curved length direction, that part of the dental arch of a user which extends from at least the left second pre-molar to at least the right second premolar, and the pressure chamber being configured for containing a fluid under pressure;

optionally, a plurality of bristles, each having one end attached to the recess wall and extending away from the recess wall into the recess; and a pump unit arranged in fluid communication with said pressure chamber, the pump unit being configured to reciprocatingly increase and decrease a pressure in the pressure chamber between an increased pressure condition and a decreased pressure condition by pumping a volume of fluid into, respectively out of, the pressure chamber, thereby deforming the recess wall and moving the recess wall back and forth, increasing respectively decreasing the recess, said pump unit, in operation, operating at an operating frequency; wherein the operating frequency is in the range of 0.5 to 20 Hz.

The mouthpiece of the dental cleaning device according to the second aspect of the invention of Chapter 2 is similar to the mouthpiece of the dental cleaning device according to the first aspect of the invention of Chapter 2. Additionally, the recess of said mouthpiece has a curved length direction, and is configured for encompassing, viewed in the curved length direction, a substantial part of the dental arch of a user, such as substantially the entire dental arc. For example, the recess may be configured for encompassing the dental positions in the range from at least the left first molar up to at least the right first molar, or for encompassing the dental positions in the range from at least the left second molar up to at least the right second molar. All teeth or almost all teeth of a dental arch of a user may then be brushed simultaneously with the dental cleaning device.

The dental cleaning device according to the second aspect of the invention of Chapter 2 optionally has a plurality of bristles that are similar to the bristles of the dental cleaning device according to the first aspect of the invention of Chapter 2.

The dental cleaning device according to the second aspect of the invention of Chapter 2 comprises a pump unit, similar to the pump unit of the dental cleaning device according to the first aspect of the invention of Chapter 2.

According to the second aspect of the invention of Chapter 2, said pump unit operates at a operating frequency in the range of 0.5 to 20 Hz.

In contrast to known dental cleaning devices, which operate at a rather high frequency, the dental cleaning device according to the second aspect of the invention of Chapter 2 operates at a relatively low frequency (compared to devices from the prior art). For example, the dental cleaning device of WO2010/076702 operates at a frequency of between 100 and 300 Hz. This high-frequency movement allows the bristles, which in WO2010/076702 are made of nylon and attached to a membrane, to function as a jackhammer which jackhammer functionality is required for removing tooth plaque from teeth of a user of the dental cleaning device. However, to move the bristles with such a high frequency poses difficulties. Indeed WO2010/076702 refers to the difficulty of overcoming the inertial of the total fluid volume, and cavitation effects in the fluid, created by the pump action. WO2010/076702 teaches how to solve these problems. It is commonly known, for a dental cleaning device operating like a jackhammer, that a high frequency is needed (despite these known difficulties) as otherwise cleaning of the teeth takes too long and users of the dental cleaning device may not sufficiently clean their teeth.

The dental cleaning device according to the second aspect of the invention of Chapter 2 takes a radically different approach compared to WO2010/076702. Instead of finding a suitable way to move the bristles with a very high frequency, the dental cleaning device according to the invention of Chapter 2 brushes the teeth with a rather low operating frequency of 0.5 to 20 Hz. It is much more energy-efficient to reciprocatingly increase and decrease the pressure in a pressure chamber with a low operating frequency than with a high operating frequency. As the dental cleaning device according to the second aspect of the invention of Chapter 2 provides a mouthpiece comprising a recess that is configured to encompass substantially the entire dental arch of the user and that has a U-shaped cross section, (almost) all teeth and every side of each tooth may be brushed at the same time with the dental cleaning device according to the second aspect of the invention of Chapter 2. When operating the bristles at a lower frequency, instead of working as a jackhammer, the bristles may work, so to say, as a windscreen wiper, rubbing against teeth of the user as they are moved towards the teeth, and removing tooth plaque with that rubbing action. Said rubbing action can only effectively be performed at relatively low frequencies in the range of 0.5-20 Hz. When the movement frequency of the bristles is too high, there is no rubbing action but a jackhammering (chipping) action, and frequencies much higher than 20 Hz are needed. When the movement frequency is lower than 0.5 Hz, the movement is too slow and while rubbing may satisfactorily be performed, the total brushing time is increased too much.

By rubbing the teeth clean of tooth plaque, at substantially all dental positions of a dental arch at the same time, with the dental cleaning device according to the second aspect of the invention of Chapter 2 a highly efficient alternating movement of the recess wall and bristles results, while cleaning of the dental arch can still be performed in a satisfactory amount of time.

With the proposed dental cleaning device that operates at a relatively low operating frequency, and brushes substantially all teeth of a dental arch of a user at the same time by rubbing the teeth, incorrect use and ineffective brushing of the teeth is made almost impossible.

Further additionally, brushing teeth with a relatively low operating frequency may result in a more pleasant mouth feeling when using the dental cleaning device.

In a further embodiment of the second aspect of invention of Chapter 2, said operating frequency is in the range of 1 to 15 Hz, such as in the range of 3 to 10 Hz. These operating frequency ranges provide an optimal trade-off between on the one hand desired brushing time, and on the other hand achieved brushing result.

In another further embodiment of the second aspect of invention of Chapter 2, said operating frequency may be a predetermined frequency which is fixed or varies as a function of time. Like as explained in relation to the first aspect of the invention of Chapter 2, this predetermined frequency may for example be maintained when responding to a pressure change due to the pump being configured to operate at a predetermined operating frequency or due to a controller being configured to operate the pump at a predetermined operating frequency.

In a further embodiment of the first and/or second aspect of the invention of Chapter 2, the recess wall is made of a material that has a hardness from 20 Shore A to 100 Shore A measured according to ISO 7619-1:2010. For example, the recess wall may be made of an elastomer, like a thermoplastic elastomer or a silicone elastomer A material having a hardness of 20 to 100 Shore A, for example 50 to 80 Shore A, may provide an optimal trade-off between flexibility, deformability, stiffness, and durability upon continuously repeated deformation.

In an elaboration of this further embodiment, at least some of the plurality of bristles may be made of a material that has a hardness of 20 to 100 Shore A. For example, the bristles may be made of an elastomer, like a thermoplastic elastomer or a silicone elastomer, or a silicon polymer. This range may provide the bristles with an optimal trade-off between stiffness, flexibility, and deformability. On the one hand, it is desired that the bristles are relatively stiff, to increase their durability and to rub the teeth with sufficient force to actually clean them. On the other hand, it is desired that the bristles deform easily, to rub teeth of a user of the dental cleaning device and clean said teeth (instead of damaging them), and to reach spots which are difficult to reach with stiffer bristles.

In another embodiment of the first and/or second aspect of the invention of Chapter 2, the recess wall is made of a material that has a hardness from 50 Shore D to 100 Shore A measured according to ISO 7619-1:2010. For example, the recess wall may be made of a thin plastic, like polyethylene, polybutylene terephthalate, polypropylene, polyester or nylon. A material having a hardness of 50 to 100 Shore D, for example 70 to 90 Shore D, used in a thin recess wall may provide an optimal trade-off between flexibility, deformability, stiffness, and durability upon continuously repeated deformation.

In an elaboration of this further embodiment, at least some of the plurality of bristles may be made of a material that has a hardness of 50 to 100 Shore D. For example, the bristles may be made of plastic, like polyethylene, polybutylene terephthalate, polypropylene, polyester or nylon. This range may provide the bristles with an optimal trade-off between thinner bristles with the right stiffness, flexibility, and deformability. On the one hand, it is desired that the bristles are relatively stiff, to increase their durability and to rub the teeth with sufficient force to actually clean them. On the other hand, it is desired that the bristles deform easily, to rub teeth of a user of the dental cleaning device and clean said teeth (instead of damaging them), and to reach spots which are difficult to reach with stiffer bristles.

In another elaboration of this further embodiment, the bristles and the recess wall are made of the same material. Alternatively, the bristles may be made of a nylon material having a hardness significantly higher than 70 Shore D, while the recess wall is made of e.g. thermoplastic elastomer or a silicone elastomer having a hardness in the range of 40 to 100 Shore A.

In another further embodiment of the first and/or second aspect of the invention of Chapter 2, the mouthpiece of the dental cleaning device has two said recesses, which are each U-shaped in cross section and delimited by a said recess wall, the openings of the U-shaped cross sections of the two recesses facing in mutually opposite directions. This allows to simultaneously brush teeth and/or gum of the mandibular dental arch as well as the maxillary dental arch.

In another further embodiment of the first and/or second aspect of the invention of Chapter 2, the one recess has or the two recesses have an elongate, curved shape and is/are configured to encompass at least 5 dental positions of a user, such as the dental positions in the range from the left first molar up to the right first molar. This, advantageously, allows to brush multiple dental positions simultaneously. Satisfactory brushing of teeth can then be achieved in less time compared to a dental cleaning device having a shorter recess. The recess(es) may be configured to encompass the dental positions in the range from the left second molar up to the right second molar. The mouthpiece may span substantially the entire dental arch of a user, including or excluding the third molars (wisdom teeth).

In another further embodiment of the first and/or second aspect of the invention of Chapter 2, in use of the dental cleaning device, upon increasing the pressure in the pressure chamber, the bristles of the dental cleaning device move towards the dental positions of the user whilst end portions of said bristles are deformed (bent) rubbed against said teeth; which rubbing action of said end portions cleans said teeth. Hence, in contrast to known automatic dental cleaning devices, the dental cleaning device according to the present invention of Chapter 2 does not function as a jackhammer, but instead rubs the teeth, using friction between the bristles and the teeth as cleaning mechanism to remove tooth plaque from teeth of the user.

In an embodiment of the first and/or second aspect of the invention of Chapter 2, the fluid may be a gas, preferably air. Air is readily available, and may e.g. be extracted from the environment while operating the dental cleaning device. Using another fluid may require the use of a closed-loop fluid system, which may be more expensive and cumbersome to produce. When using air as fluid, an open-loop or a partial open-loop system may be used, wherein fluid is allowed to exit, e.g. from the pressure chamber, to outside of the dental cleaning device.

In an embodiment of the second aspect of the invention of Chapter 2, the dental cleaning device further comprises: a pressure sensor configured to measure a pressure representative of the pressure in the pressure chamber and to produce a pressure signal representative of the pressure measured, and a controller configured to generate a control signal; wherein the pressure sensor and controller are connected such that the controller in use receives the pressure signal and the controller and pump unit are connected such that the pump unit in use receives the control signal; wherein the controller is configured to generate the control signal in dependence on the pressure signal and the pump unit is configured to reciprocatingly provide a delivery into and/or out of the pressure chamber in response to the control signal; and wherein the controller is configured to reduce the delivery of the pump unit when the pressure in the pressure chamber exceeds a predetermined upper threshold, as explained in accordance with the first aspect of the invention of Chapter 2.

In an embodiment of the first and/or second aspect of the invention of Chapter 2, the recess wall may, viewed in the plane of the U-shaped cross-section transverse to the length axis—have an internal width—between the legs of the U-shape—in the range of 2 to 10 mm, such as in the range of 3 to 7 mm; and/or the U-shape may have an internal height in the range of 5 to 15 mm, such as in the range of 5 to 10 mm. These measures are indicative for an adult human. For a child or for animals these measures might be different.

According to a third aspect of the invention of Chapter 2, there is provided a method of operating a dental cleaning device for simultaneously brushing at a plurality of dental positions, wherein the cleaning device comprises:

a mouthpiece having a pressure chamber and a recess delimited by a recess wall, the recess having a curved length direction and a U-shaped cross-section transverse to the length direction, the recess being configured for encompassing, viewed in the curved length direction, at least a part of the dental arch of a user, and the pressure chamber being configured for containing a fluid under pressure;

optionally, a plurality of bristles, each having one end attached to the recess wall and extending away from the recess wall into the; and a pump unit arranged in fluid communication with said pressure chamber, the pump unit being configured to reciprocatingly increase and decrease a pressure in the pressure chamber between an increased pressure condition and a decreased pressure condition by pumping a volume of fluid into, respectively out of, the pressure chamber, thereby deforming the recess wall and moving the recess wall back and forth, increasing respectively decreasing the recess, wherein
the delivery of the pump unit is reduced when the pressure in the pressure chamber exceeds a predetermined upper threshold;
and/or
the pump is operated at an operating frequency in the range of 0.5 to 20 Hz.

With the method according to the third aspect of the invention of Chapter 2:

the pump may, when the pressure in the pressure chamber exceeds a predetermined upper threshold, be operated such that a change of the operating frequency is prevented;
and/or
the pump may be operated at a fixed operating frequency;
and/or
the pump may be operated at an operating frequency in the range of 1 to 15 Hz, such as in the range of 3 to 10 Hz;
and/or
the upper threshold may be at most 2 bar, such as at most 1 bar, relative to ambient pressure;
and/or
the upper threshold may be at most 0.3 bar, such as at most 0.2 bar, relative to ambient pressure;
and/or
the delivery of the pump unit may be increased when the pressure in the pressure chamber falls below a predetermined lower threshold, wherein:
the lower threshold may be in a range up to 1 bar, such as in a range up to 0.4 bar, below the upper threshold;
and/or
the lower threshold may be in the range of −0.5 to +0.2 bar, such as in the range of −0.5 to 0 bar, relative to ambient pressure;
and/or
the pump is operated at an operating frequency which varies according to a predetermined function of the time measured as from switching on the pump.

Chapter 3

It is an object of the invention of Chapter 3 to provide an alternative mouthpiece for brushing at a plurality of dental positions, in particular an automatic brushing device. A further object of the invention of Chapter 3 is to provide an improved mouthpiece for brushing at a plurality of dental positions and to provide a brushing device provided with the improved mouthpiece. Another further object is providing a mouthpiece for brushing at a plurality of dental positions and a brushing device comprising such a mouthpiece, which overcome one or more of the disadvantages of brushing mouthpieces respectively brushing devices known from the prior art. More specifically, the invention of Chapter 3 has as an object to provide a mouthpiece, like the one of the not pre-published PCT/NL2018/050276 from applicant or US 2010/0062397, with improved brushing action.

According to a first aspect of the invention of Chapter 3, one or more of the above objects are achieved by providing a mouthpiece according to claim 65, having a preamble known from the not pre-published PCT/NL2018/050276.

According to the invention of Chapter 3 a mouthpiece is provided for simultaneously brushing at a plurality of dental positions. In other words a mouthpiece is provided which is configured for brushing at a plurality of dental positions at the same time. In case a natural or artificial tooth element is present at the dental position where the mouthpiece brushes, this tooth element is brushed. In case a tooth element is absent at the dental position where the mouthpiece brushes, the gum may be brushed.

The mouthpieces according to the invention of Chapter 3 comprises a body provided with at least one recess, which may be one or two recesses. This at least one recess has a curved length direction and a U-shaped cross-section transverse to the length direction and is configured for encompassing, viewed in the curved length direction, a plurality of at least 5 dental positions. The body comprises, per said recess, a flexible recess wall delimiting the respective recess. The recess wall may be a sheet, which may for example be made of a plastic, like polyethylene, polypropylene, polyester or nylon, or an elastomer, like a thermoplastic elastomer or a silicone elastomer. The recess wall may be lined with a plurality of bristles, each having one end attached to the recess wall and extending from the recess wall into the recess. In other words, the body has a recess, the wall of which may be covered with bristles distributed over the wall of the recess. At least five dental positions, like the tooth elements of these positions or the gum covering the jawbone at the location of the dental position, can be received in the recess, and, in case present, the bristles in the recess will be able to brush the at least 5 dental positions at the same time. The bristles may be of a nylon, an elastomer or any other suitable material. In case of a dental arch without teeth, the remaining arch of gum may need treatment as well. In this case the gum may be massaged by a recess wall without bristles. For improved cleaning of the gum, a cleaning fluid may be used in such a mouthpiece without bristles.

The body is according to the invention of Chapter 3 provided with at least one pressure chamber configured for containing a fluid under pressure, which pressure can be increased and decreased. The body is configured to deform the recess wall by reciprocatingly increasing and decreasing the pressure in the at least one pressure chamber causing a sustained repeating, reciprocating motion of the recess wall and bristles, optionally provided on that recess wall. The body thus comprises one, two, three, four, five, six or any other number of pressure chambers which can be filled with a fluid, as explained in PCT/NL2018/050276, which is in the name of the same applicant and was not yet published at the priority dates of the present application. By reciprocatingly increasing a pressure in the at least one of the pressure chambers from a decreased pressure condition to an increased pressure condition and decreasing the pressure in this pressure chamber(s) from the increased pressure condition to the decreased pressure condition and sustained repeating this reciprocating motion, the recess wall, optionally carrying bristles, is brought into motion resulting in the recess wall respectively the bristles acting at the dental positions on the objects—teeth and/or gum present at these dental positions—to clean said objects.

With respect to the terminology 'increased pressure condition' and 'decreased pressure condition' it is noted that these conditions are in relation to each other, i.e. in decreased pressure condition the pressure is lower than in increased pressure condition. In both conditions, the pressure may for example be lower than ambient air pressure.

Ambient air pressure is the pressure prevailing in the room where the user of the mouthpiece is when using the mouthpiece. In general ambient air pressure is assumed to be about 1 bar absolute pressure, but the actual value of the ambient air pressure will depend amongst others from the height with respect to sea level and weather conditions.

According to the invention of Chapter 3 the recess wall is configured to be locally deformable such that—or, in other words, to have such a local deformability that—when reciprocatingly increasing and decreasing the pressure in the pressure chambers or one or more one said at least one pressure chamber ('in the pressure chambers or one or more said at least one pressure chamber' will further be named 'in a said at least one pressure chamber'), the shape of the recess wall locally changes, wherein, in the increased pressure condition, the bristles (or—in absence of bristles—the recess wall) are pressed against the dental positions and the shape of the recess wall is locally adjusted to the local shape of the dental positions encompassed by the recess wall whilst, in the decreased pressure condition, the shape of the recess wall is locally less adjusted to the local shape of the dental positions encompassed by the recess wall than in the increased pressure condition. So the recess wall may— thinking away the bristles—initially have a smooth surface, which, when increasing pressure, changes into a bumpy surface due to the locally deformable recess wall being pressed so to say against—again thinking away the bristles which are in between—the irregular contour of the dental positions. The recess wall thus is locally adjusted to the shape of the dental position(s) at that location. This adjusted shape in the increased pressure condition may be a mating adjustment, in which the shape of the recess wall is so to say identical to the contour of the dental positions, but this does not have to be the case and in practise may not be the case. When decreasing pressure, the recess wall will return in the direction of its initial state and assume a shape which is locally less adjusted—relative to the adjusted shape in the increased pressure condition —. This locally less adjusted shape may still be adjusted in some extent to the local shape of the dental contour, but the adjustment will be less pronounced. This change in shape of the recess wall between a locally adjusted shape and a locally less adjusted shape, results in that the bristles can better reach into interdental spaces, and results in an additional movement of the bristles on top of the movement already caused by increasing and decreasing the pressure in the at least one pressure chamber. This additional movement results in additional sweeping effect of the bristles. Summarizing the change in shape of the recess wall between a locally adjusted shape and a locally less adjusted shape results in improved brushing action.

According to a further embodiment of the first aspect of the invention of Chapter 3, the recess wall may, viewed in the length direction along a lingual and facial side of the dental positions encompassed by the recess wall, have in the decreased pressure condition less relief than in the increased pressure condition.

According to a further embodiment of the first aspect of the invention of Chapter 3, the local deformability of the recess wall may be configured such that the local changes in the shape of the recess wall, between the increased pressure and decreased pressure condition, occur at a pressure difference in a range up to 2 bar, such as in a range of up to 0.4 bar, the pressure difference being defined as the pressure in the pressure chamber in the increased pressure condition minus the pressure in the pressure chamber in the decreased pressure condition. With the expression 'a pressure difference in a range up to x bar', is meant a pressure difference as from zero (not including zero) up to x bar (including x bar). Keeping the pressure difference between the increased pressure condition and decreased pressure condition below 2 bar, prevents the user from experiencing an unbearable pressure difference. Keeping the pressure difference below 0.4 bar results in that the pressure difference between increased pressure condition and decreased pressure condition is, in general, experienced by a user as acceptable. The local deformability of the recess wall may be configured such that the local changes in the shape of the recess wall, between the increased pressure and decreased pressure condition, occur at a pressure difference in a range up to 0.2 bar, or even at lower pressure differences.

According to a further embodiment of the first aspect of the invention of Chapter 3, the pressure in a said at least one pressure chamber may, in the decreased pressure condition, be higher than ambient air pressure.

Ambient air pressure is the pressure prevailing in the room where the user of the mouthpiece is when using the mouthpiece. In general ambient air pressure is assumed to be about 1 bar absolute pressure, but the actual value of the ambient air pressure will depend amongst others from the height with respect to sea level and weather conditions.

According to a further embodiment of the first aspect of the invention of Chapter 3, the pressure in a said at least one pressure chamber may, in the increased pressure condition, be at most 2 bar relative to ambient air pressure, such as at most 1 bar relative to ambient air pressure.

According to a further embodiment of the first aspect of the invention of Chapter 3, the pressure in a said at least one pressure chamber may, in the increased pressure condition, be at most 0.3 bar relative to ambient air pressure, such as at most 0.2 bar relative to ambient air pressure. With a pressure of at most 0.3 bar the brushing action is satisfactory, whilst the risk of harm or injury in case the recess might rupture is minimal. With a pressure of at most 0.2 bar the brushing action is still satisfactory.

According to a further embodiment of the first aspect of the invention of Chapter 3, the pressure in a said at least one pressure chamber is, in the decreased pressure condition, lower than ambient air pressure.

According to a further embodiment of the first aspect of the invention of Chapter 3, the pressure in a said at least one pressure chamber may, in the decreased pressure condition, be in the range of −0.5 to +0.2 bar relative to ambient air pressure, such as in the range of −0.5 to 0 bar relative to ambient air pressure. With a decreased pressure of at least −0.5 bar the chance that the recess wall might become damaged is low. The decreased pressure may be in the range of −0.4 to −0.25 relative to ambient air pressure. A decreased pressure in the range of −0.4 to −0.25 bar relative to ambient air pressure can be realized with relatively cheap means. A decreased pressure with a value below zero relative to ambient air pressure, means that, when decreasing pressure to the decreased pressure condition, a vacuum is created in the pressure chamber. Using a pressure below ambient air pressure for the decreased pressure condition means that the chances to damage the gum of the user are reduced considerably.

According to a second aspect of the invention of Chapter 3, which may be separate from or in combination with one/or more other aspects of the invention of Chapter 3, the invention of Chapter 3 provides a mouthpiece for simultaneously brushing at a plurality of dental positions, like as worded in independent claim 73. To define this second aspect, a system of three mutually orthogonal axes is defined, comprising an x-axis, an y-axis, and a z-axis, the z-axis being a curved axis following the contour of a dental arch—for example the dental arch of an adult human —, the x-axis and y-axis being perpendicular to each other and defining an xy-plane which is flat and perpendicular to the curved z-axis. The mouthpiece of this second aspect comprises a body provided with at least one recess. As is also the case with the other aspects of this invention of Chapter 3, in use this mouthpiece will be inserted in the mouth of the user. So the dimensions of the mouthpiece may be configured to allow insertion into the mouth of a user. The at least one recess has a curved length direction extending parallel to the z-axis, an U-shaped cross-section transverse to the length direction, and is configured for encompassing, viewed in the curved length direction, a plurality of at least 5 dental positions. The body comprises, per said recess, a recess wall delimiting the respective recess and provided with a plurality bristles. As also may be the case in the other aspects of this invention of Chapter 3, the bristles may be flexible and/or deformable. Each bristle has a fixed end which is, at the recess wall, attached to the body. The fixed ends of the bristles may for example be attached to the recess wall, but may also be attached to another part of the body. Each bristle extends from the fixed end, into the recess, towards the free end of the bristle, which free end is arranged in the recess. The body is according to this second aspect configured to subject, when a said plurality of dental positions is encompassed in the recess, a multiple of said fixed ends of the bristles—for example each free end of each bristle—reciprocatingly to a first back and forth pivot movement around a first pivot axis, a second back and forth pivot movement around a second pivot axis and a back and forth translation movement along a translation axis, the first pivot axis, the second pivot axis and the translation axis being mutually perpendicular, the first pivot axis being parallel to the z-axis, and the second pivot axis and translation axis extending in the xy-plane. Configuring the body to subject fixed ends of the bristles to these movements, may be accomplished with—see also the next paragraph—a said body comprising a pressure chamber and a recess wall which is locally deformable and carries the fixed ends of the bristles, but may also be accomplished with a different mounting of the fixed ends of the bristles and/or a different drive to subject the fixed ends of the bristles to these movements.

According to a further embodiment of the first and/or second aspect of the invention of Chapter 3, the local deformability of the recess wall may be such that, when reciprocatingly increasing and decreasing the pressure in a said at least one pressure chamber and encompassing said plurality of dental positions in the recess, each location of the recess wall is subjected to a first back and forth pivot movement around a first pivot axis, a second back and forth pivot movement around a second pivot axis and a back and forth translation movement along a translation axis, the first pivot axis, the second pivot axis and the translation axis being mutually perpendicular.

According to a further embodiment of the first and/or second aspect of the invention of Chapter 3, each bristle is at a root of the respective bristle be attached to the recess wall, and the local deformability of the recess wall may be such that, when reciprocatingly increasing and decreasing the pressure in a said at least one pressure chamber and encompassing said plurality of dental positions in the recess, the root of each bristle is subjected to a first back and forth pivot movement around a first pivot axis, a second back and forth pivot movement around a second pivot axis and a third back and forth translation movement along a translation axis, the first pivot axis, the second pivot axis and the translation axis being mutually perpendicular.

According to a further embodiment of the first and/or second aspect of the invention of Chapter 3, each respective bristle may be attached to the recess wall in an attachment point; at each attachment point, a local set of three mutually orthogonal axes may be defined, which local set comprises an x-axis, an y-axis and a z-axis, the z-axis being a curved axis defined by the curved length direction of the recess, the x-axis and y-axis defining an xy-plane perpendicular to the z-axis; and the local deformability of the recess wall may be such that, when reciprocatingly increasing and decreasing the pressure in a said at least one pressure chamber and encompassing a said plurality of dental positions in the recess, the attachment points are subjected to one or more movements from the group of: a first back and forth pivoting movement around a first pivot axis, a second back and forth pivoting movement around a second pivot axis, and a back and forth translating movement along a translation axis; wherein the first pivot axis is parallel to the z-axis and the second pivot axis and translation axis are in the xy-plane and mutually perpendicular. In addition to these first, second and third back and forth movement, it is noted that the recess wall may also allow a fourth, fifth and sixth back and forth movement which may further contribute to the brushing action, wherein, viewed at the location of the root of the bristle, the fourth back and forth movement is a back and forth translation movement in the direction of the z-axis, the fifth back and forth movement is a back and forth translation movement in the direction of the y-axis, and the sixth back and forth movement is a back and forth rotation movement around the x-axis.

According to a further embodiment of the first and/or second aspect of the invention of Chapter 3, the body may be provided with two said recesses, the openings of the U-shaped cross-sections of the two recesses facing in mutually opposite directions. This allows upper dental positions and lower dental positions to be brushed at the same time.

According to a further embodiment of the first and/or second aspect of the invention of Chapter 3, wherein the recess wall is, transverse to the length direction, U-shaped in conformity with the U-shaped cross-section of the recess; wherein the U-shape of each recess wall defines two recess wall legs extending from a recess wall bottom, each leg having a free end; wherein the free ends of the legs are provided with end bristles; and wherein the body is configured
   to shift the upper ends of the legs from inside the recess to outside the recess when increasing the pressure in said at least one pressure chamber, and
   to decrease the vertical distance and to shift the upper ends of the legs from outside the recess to inside the recess when decreasing the pressure in said at least one pressure chamber
such that the end bristles are subjected to a back and forth swivelling movement around an axis parallel to the length direction when reciprocatingly increasing and decreasing the pressure in a said at least one pressure chamber. A 'roller bellow functionality' is introduced. The reciprocating shifting of the ends of the legs from inside the recess to outside the recess causes the end bristles into a back and forth swivelling movement around an axis parallel to the curved length direction. As a result the transitions of the teeth to the gums are subjected to a special brushing action of these end bristles. As is generally known, these transitions need careful cleaning care. According to a third aspect of the invention of Chapter 3, this 'roller bellows functionality' may also be applied separate from the first and/or second aspect of the invention of Chapter 3, as may be worded, like in independent claim 79 (which has been delimitated against the not pre-published PCT/NL2018/050276), as follows: "A mouthpiece for simultaneously brushing at a plurality of dental positions; wherein the mouthpiece comprises a body provided with at least one recess; wherein the said at least one recess has a curved length direction and a U-shaped cross-section transverse to the length direction and is configured for encompassing, viewed in the curved length direction, a plurality of at least 5 dental positions; wherein the body comprises, per recess, a flexible recess wall delimiting the respective recess; wherein the recess wall is lined with a plurality of bristles, each having one end attached to the recess wall and extending from the recess wall into the recess; wherein the body is provided with at least one pressure chamber configured for containing a fluid under pressure; wherein the body is configured to deform the recess wall by reciprocatingly increasing and decreasing a pressure in the at least one pressure chamber between a decreased pressure condition and an increased pressure condition; wherein the recess wall is, transverse to the length direction, U-shaped in conformity with the U-shaped cross-section of the recess; wherein the U-shape of each recess wall defines two recess wall legs extending from a recess wall bottom, each leg having a free end; and wherein the body is configured:

to shift the upper ends of the legs from inside the recess to outside the recess when increasing a pressure in said at least one pressure chamber, and to shift the upper ends of the legs from outside the recess to inside the recess when decreasing the pressure in said at least one pressure chamber such that the end bristles are subjected to a back and forth swivelling movement around an axis parallel to the length direction when reciprocatingly increasing and decreasing the pressure in a said at least one pressure chamber".

According to a further embodiment of the first and/or second and/or third aspect of the invention of Chapter 3, the body may be configured to subject the legs of the recess walls to a reciprocating movement in the vertical direction when reciprocatingly increasing and decreasing pressure in a said at least one at least one pressure chamber.

According to a further embodiment of the first and/or second and/or third aspect of the invention of Chapter 3, the body may be configured to elongate the legs when increasing the pressure in the at least one pressure chamber and to shorten the legs when decreasing the pressure in the at least one pressure chamber. Elongating and shortening of the legs causes the bristles on the legs to move with respect to the dental positions in a length direction of the legs.

According to a further embodiment of the first and/or second and/or third aspect of the invention of Chapter 3, the body defines a reference plane parallel to the curved length direction, the free ends of the legs pointing away from the reference plane and an outer side of the bottom facing the reference plane; wherein a vertical distance is defined as a distance, measured in a direction transverse to the reference plane, from the reference plane to the free ends of the legs; and wherein the body is further configured:

to increase the vertical distance when increasing a pressure in said at least one pressure chamber, and to decrease the vertical distance when decreasing the pressure in said at least one pressure chamber.

Increasing and decreasing the vertical distance causes the bristles on the legs to move with respect to the dental positions in the direction of the vertical distance.

According to a further embodiment of the first and/or second and/or third aspect of the invention of Chapter 3, the mouthpiece may further comprise a meshwork fixed to the recess wall, wherein the meshwork is formed by nodes and mesh members, each said mesh member extending from one said node to another said node, each said node connecting at least three said mesh members to each other, and wherein each node carries one or more of said bristles or a tuft of said bristles. This 'mesh functionality' simplifies production of a mouthpiece according to the invention of Chapter 3. The mesh with bristles on the nodes can be produced as a separate component, separate from and preceding the manufacturing of the mouthpiece. During or after manufacturing of the mouthpiece, the mesh with bristles can be arranged to lie over the recess wall. According to a fourth aspect of the invention of Chapter 3, this 'mesh functionality' may also be applied separate from the first aspect and/or second and/or third aspect of the invention of Chapter 3, as may be worded, like in independent claim 83 (which has been delimitated against the not pre-published PCT/NL2018/050276), as follows: "A mouthpiece for simultaneously brushing at a plurality of dental positions; wherein the mouthpiece comprises a body provided with at least one recess; wherein the at least one recess has a curved length direction and a U-shaped cross-section transverse to the length direction and is configured for encompassing, viewed in the curved length direction, a plurality of at least 5 dental positions; wherein the body comprises, per said recess, a recess wall delimiting the respective recess; wherein the recess wall is lined with a plurality of bristles extending from the recess wall into the recess; wherein the body may optionally be provided with at least one pressure chamber configured for containing a fluid under pressure, the body optionally being configured to deform the recess wall by reciprocatingly increasing the pressure in the at least one pressure chamber from a decreased pressure condition to an increased pressure condition and decreasing pressure in the at least one pressure chamber from an increased pressure condition to a decreased pressure condition; wherein the mouthpiece further comprises a meshwork lying against the recess wall or fixed to the recess wall; and wherein the meshwork is formed by nodes and mesh members, each said mesh member extending from one said node to another said node, each said node connecting at least three said mesh members to each other, and wherein each node carries one or more of said bristles or a tuft of said bristles."

According to a further embodiment of the first and/or second and/or third and/or fourth aspect of the invention of Chapter 3, the meshwork may lie in a cut away of the recess wall, or may embedded in material of the recess wall, or may be adhered or glued to the recess wall, or may be positioned in the pressure chamber and overlapping holes in the recess wall through which the tuft of bristles extend externally from the recess wall.

According to a further embodiment of the first and/or second and/or third and/or fourth aspect of the invention of Chapter 3, wherein each respective mesh member has a length direction defined by an imaginary straight line extending between two said nodes, between which nodes the respective mesh member extends, the mesh members may be stretchable in their length direction or at least a part of the mesh members is stretchable in their length direction. The mesh-members being stretchable allows the mesh to follow deformations of the recess wall, like stretching or like local changes in shape of recess wall during increasing and decreasing pressure. The stretchable mesh members may be elastically stretchable and/or may have, viewed in the length direction of the respective mesh member, a zig-zag structure configured for providing said stretchability.

According to a further embodiment of the first and/or second and/or third and/or fourth aspect of the invention of Chapter 3, the mesh members or at least part of the mesh members may be configured to break when a predetermined force (like a stretching force) acting on the respective mesh members, is exceeded. The mesh-members being breakable allows the mesh to follow deformations of the recess wall, like stretching or like local changes in shape of recess wall during increasing and decreasing pressure. Additionally, the mesh-members being breakable allows the nodes of the mesh being attached to the recess wall, whilst the mesh is still one unit, during manufacturing of the mouthpiece and subsequently breaking these mesh-members, for example by excessively increasing pressure in the pressure chambers during or at the end of the production of the mouthpiece in order to allow, at use, the nodes to move independently from each other together with movement of the recess wall due to increasing and decreasing pressure.

According to a further embodiment of the first and/or second and/or third and/or fourth aspect of the invention of Chapter 3, the at least one recess may be configured for encompassing, viewed in its curved length direction:
  the dental positions in the range from a central incisor up to a first molar; and/or
  the dental positions in the range from a central incisor up to a second molar; and/or
  the dental positions in the range from a right second premolar up to a left second premolar; and/or
  the dental positions in the range from a right first molar up to a left first molar; and/or
  the dental positions in the range from a right second molar up to a left second molar.
The curved length direction of the recess defining a curved length axis, this means that the length of the length axis of the recess (or recess wall) spans a distance:
  at least equal to the distance from a central incisor up to a first molar; and/or
  at least equal to the distance from a central incisor up to a second molar; and/or
  at least equal to the distance from a right second premolar up to a left second premolar; and/or
  at least equal to the distance from a right first molar up to a left first molar; and/or
  at least equal to the distance from a right second molar up to a left second molar.
Further in addition, the curved length axis may have a shape similar to the shape of a human dental arch or similar to at least part of the shape of a human dental arch.

According to a further embodiment of the first and/or second and/or third and/or fourth aspect of the invention of Chapter 3, the bristles may, at their ends attached to the recess wall, be fixed relative to the recess wall.

According to a further embodiment of the first and/or second and/or third and/or fourth aspect of the invention of Chapter 3, the recess wall may be lined with at least 5 bristles per $cm^2$. The recess wall may for example be lined with 40 to 200 bristles per $cm^2$ in case of for example elastomeric bristles or with 1000 to 6000 bristles per $cm^2$ in case of for example bristles of nylon.

According to a further embodiment of the first and/or second and/or third and/or fourth aspect of the invention of Chapter 3, wherein the recess wall is, transverse to the length direction, U-shaped in conformity with the U-shaped cross-section of the respective recess, and wherein a central axis is defined as the mirror axis of the U-shape and the U-shape of the recess defines two legs extending in the direction of the central axis, the legs may be provided or lined with bristles extending at an angle in the range of 0 to 90 degrees, such as in the range of 30 to 60 degrees, with respect to the central axis. When the bristles extend at such an angle, they point so to say, in a neutral position, towards the gum. When increasing pressure the pressure chamber, the recess wall will be pressed towards the dental positions resulting in the bristles tips being be pushed towards the gum, which in turn contributes to the brushing action. For example, the free ends of the legs may be provided with bristles extending at an angle in the range of 45 to 90 degrees, such as in the range of 40 to 70 degrees, with respect to the central axis.

According to a further embodiment of the first and/or second and/or third and/or fourth aspect of the invention of Chapter 3, the recess wall may be elastically deformable.

BRIEF DESCRIPTION OF THE FIGURES

Chapter 1

The invention of Chapter 1 will be explained further with reference to the FIGS. 1-20. In these figures:

FIG. 1 shows a lower dental arch with dental positions and a system of three orthogonal axes defining a dental arch.

FIGS. 2a and 2b show an example of a mouthpiece with a recess wall made with the method according to the invention of Chapter 1, wherein FIG. 2a shows a perspective view and FIG. 2b shows a cross-sectional view according to the arrows IIb in FIG. 2a.

FIG. 3 schematically shows a first method according to the invention of Chapter 1, FIG. 3a showing a bristled sheet part lined with bristles at one side, FIG. 3b showing mould for plastically deforming the bristled sheet part, FIG. 3c showing the bristled sheet part lying on top of the mould before plastically deforming, FIG. 3d showing the bristled sheet part after plastically deforming, and FIG. 3e showing the enlarged detail IIIe as indicated in FIG. 3d.

FIG. 7 shows, like FIG. 6, schematically the recess wall of FIG. 5 mounted in the frame members of FIG. 5, and illustrates a further other manner of doing the transforming step of the method according to the invention of Chapter 1, wherein

FIG. 8 schematically shows the combination of the manner of transforming according to FIG. 6 and the manner of transforming according to FIG. 7, the combination being performed simultaneously, wherein FIG. 8a shows the initial condition and FIG. 8b shows the final condition.

FIG. 9 schematically shows two bristled sheet parts as one single part in a first state (FIG. 9a) and in a second state (FIG. 9b).

FIG. 10 schematically shows a relationship between the angle of the side parts of the U-shape with respect to a vertical and the angle of bristles with respect to the vertical, FIG. 10a showing an initial condition and FIG. 10b showing a final condition.

FIG. 11 schematically illustrates the effects of two manners of mechanically transforming the bristled sheet part from the initial condition to the final condition, FIG. 11a showing, in perspective view, a bristled sheet part in the initial condition, FIG. 11b showing, in perspective view, the same bristled sheet part in the final condition, FIG. 11c showing cross-sectional views of a first location in initial and final condition, FIG. 11d showing cross-sectional views of a second location in initial and final condition, and FIG. 11e showing cross-sectional views of a first location in initial and final condition.

FIG. 12 showing in cross-sectional view a further example of an embodiment according to the invention of Chapter 1, FIG. 12a showing an initial condition, FIG. 12b showing a final condition, FIG. 12c showing two bristled sheet parts to be assembled together, and FIG. 12d showing the two bristled sheet parts of FIG. 12 c in assembled condition.

FIG. 15 showing in cross-sectional view a further example of an embodiment according to the invention of Chapter 1, FIG. 15a showing a final condition, FIG. 15b showing how frame members are attached to the bristled sheet, and FIG. 15c showing that frame members are attached to the bristled sheet.

FIG. 16 showing in cross-sectional view a further example of an embodiment according to the invention of Chapter 1 in final condition, FIG. 16a showing a single sheet part assembly, and FIG. 16b showing how two such single sheet part assemblies may be attached to each other.

Chapter 2

Figure 21:
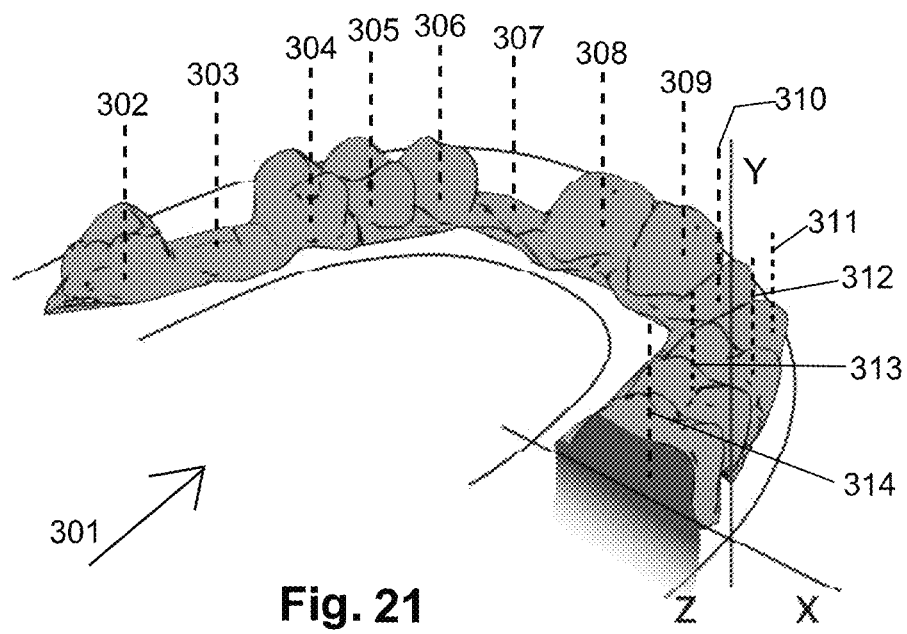
Figure 22:
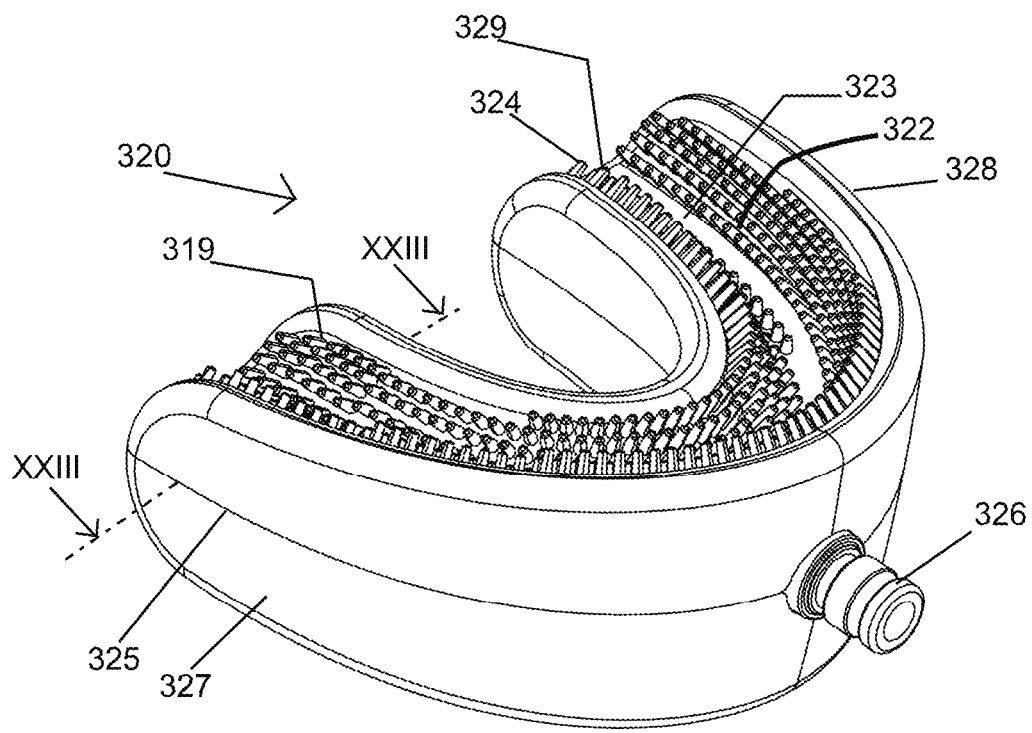
Figure 24:
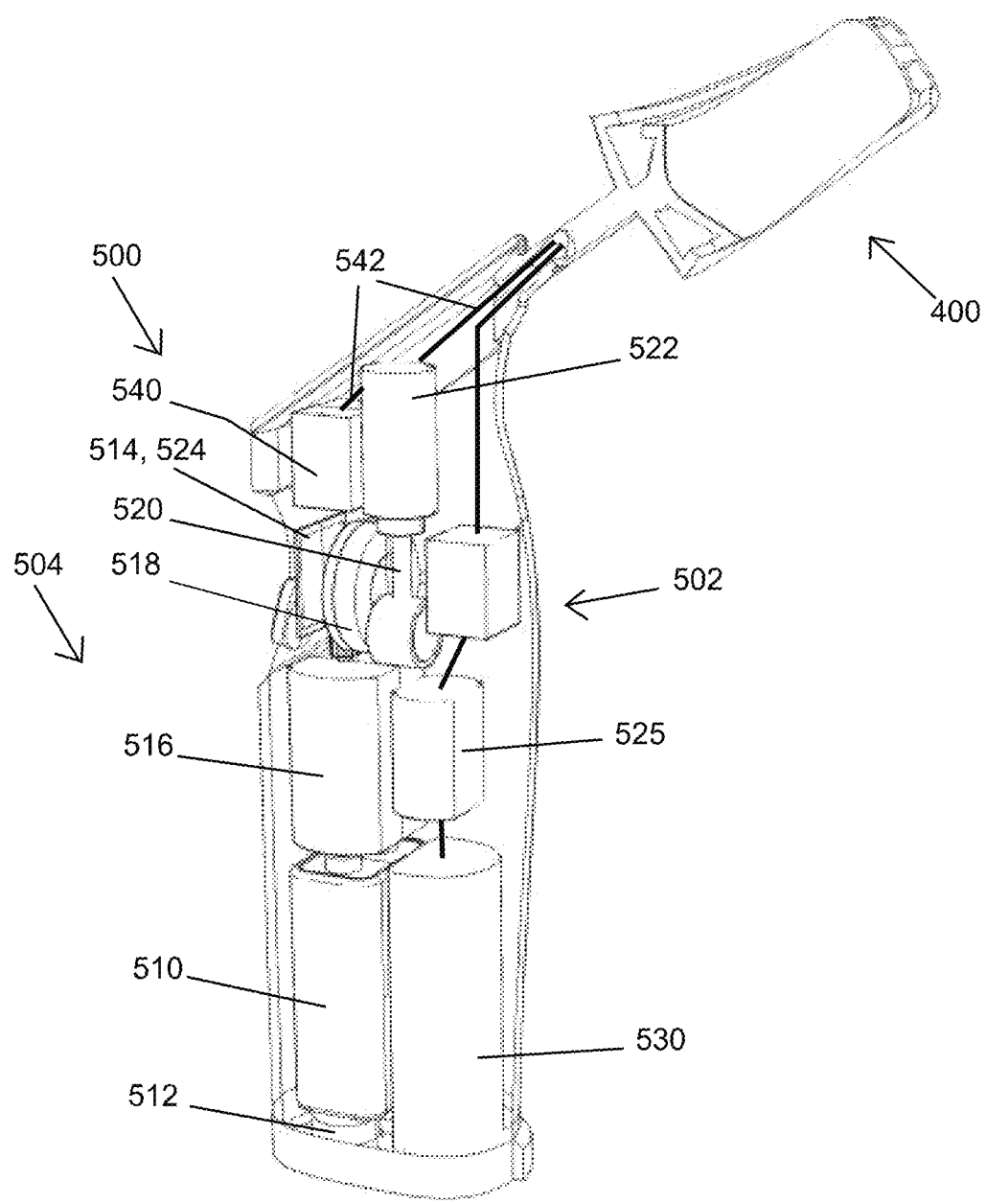
Figure 25:
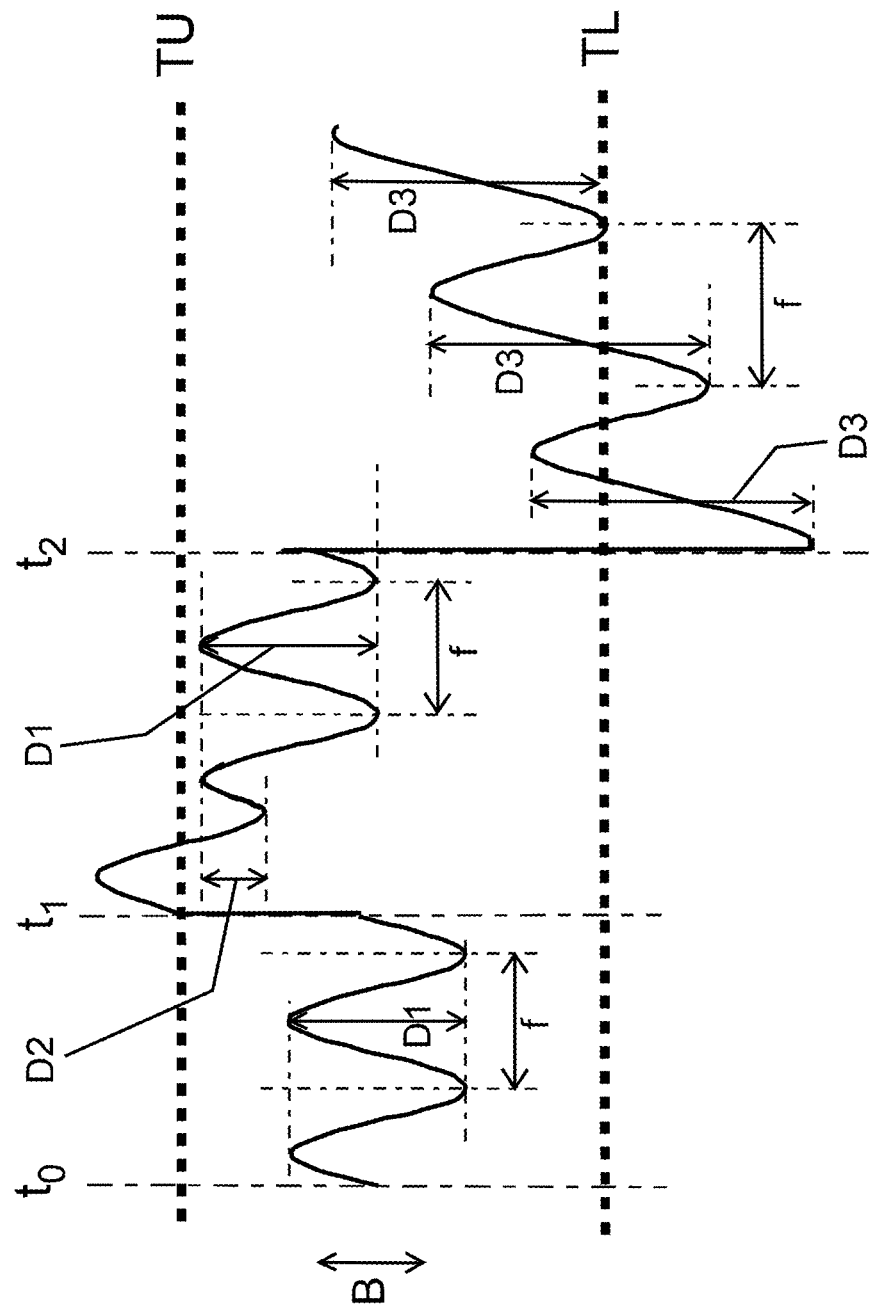
Figure 26:
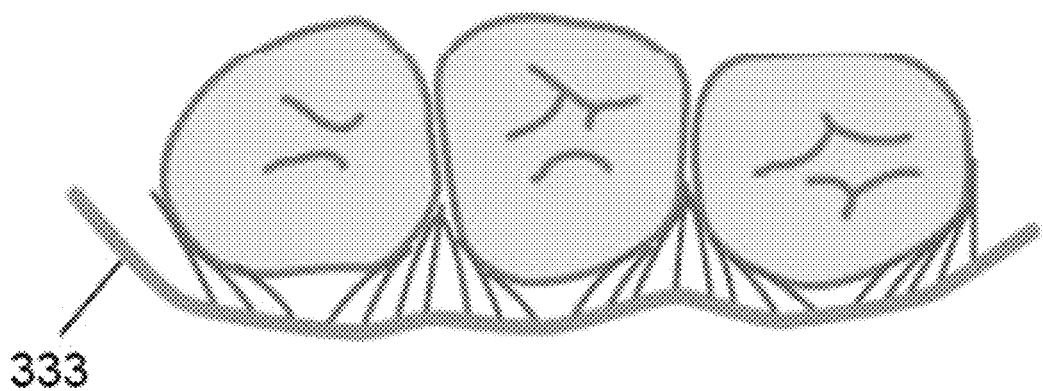

The invention of Chapter 2 will be explained further with reference to the FIGS. 21-26. In these figures:

FIG. 21 schematically shows a part of a dental arch of a person;

FIG. 22 schematically shows an embodiment of a mouthpiece of a dental cleaning device according to the invention of Chapter 2;

FIG. 23a schematically shows a cross-section of the mouthpiece of FIG. 22, in a decreased pressure condition thereof;

FIG. 23b schematically shows a cross-section of the mouthpiece of FIG. 22, in an increased pressure condition thereof;

FIG. 24 schematically shows an embodiment of a dental cleaning device according to the invention of Chapter 2;

FIG. 25 schematically shows a graph of the pressure in the pressure chamber as a function of time; and FIG. 26 schematically shows the rubbing of teeth with bristles of a dental cleaning device according to an embodiment of the invention of Chapter 2.

Chapter 3

Figure 27:
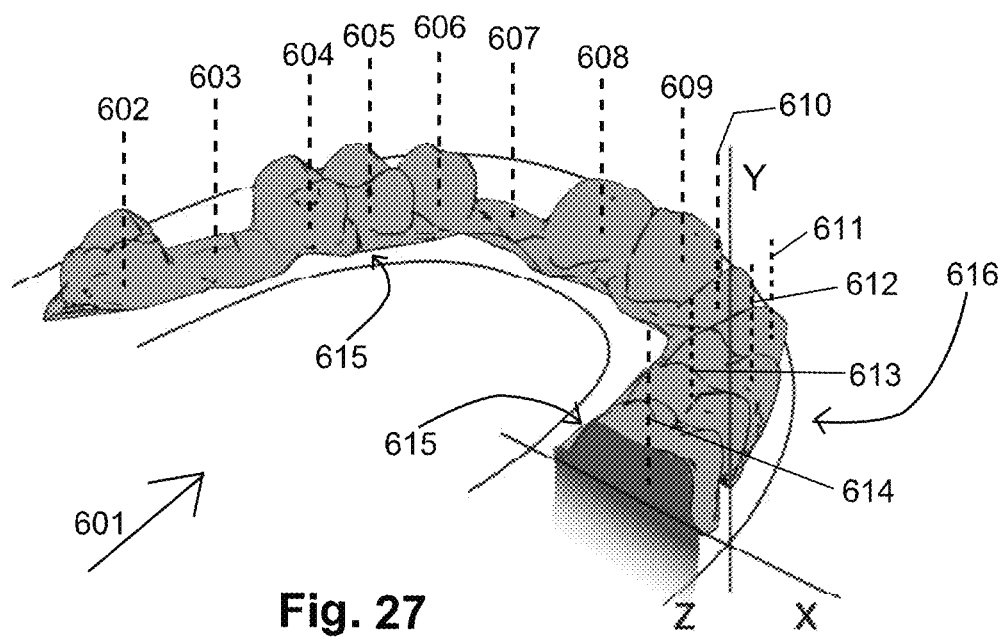

The invention of Chapter 3 will be explained further with reference to the FIGS. 27-45. In these figures:

FIG. 27 shows a lower dental arch with dental positions and a system of three orthogonal axes defining a dental arch.

Figure 28:
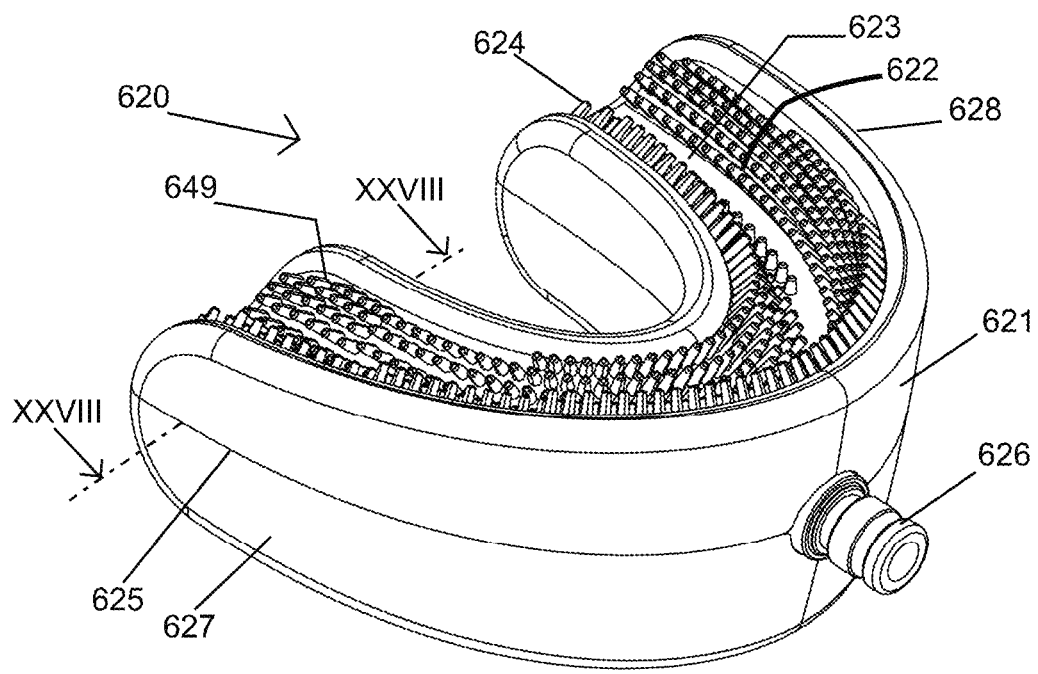

FIG. 28 shows a perspective view of a mouthpiece according to a first embodiment of the first aspect of the invention of Chapter 3.

FIGS. 29a, 29b and 29c schematically show cross-sectional views of a part of second embodiment of a mouthpiece according to the first aspect of the invention of Chapter 3, in different respective operational states thereof, the cross sectional views corresponding with the cross section as indicated with arrows XXVIII-XXVIII in FIG. 28.

FIG. 30 schematically shows a top view of a third embodiment of the mouthpiece according to the first aspect of the invention of Chapter 3.

FIGS. 31a, 31b, 31c schematically show cross-sectional views of a part of the third embodiment of a mouthpiece according to the first aspect of the invention of Chapter 3, in different respective operational states thereof, the cross sectional views corresponding with the cross section as indicated with arrows XXX-XXX in FIG. 30.

FIGS. 32a, 32b, 32c, 32d give an elucidation of the second aspect of the invention of Chapter 3 and of the local deformability of the recess wall of a mouthpiece according to the first aspect of the invention of Chapter 3.

Figure 33A:
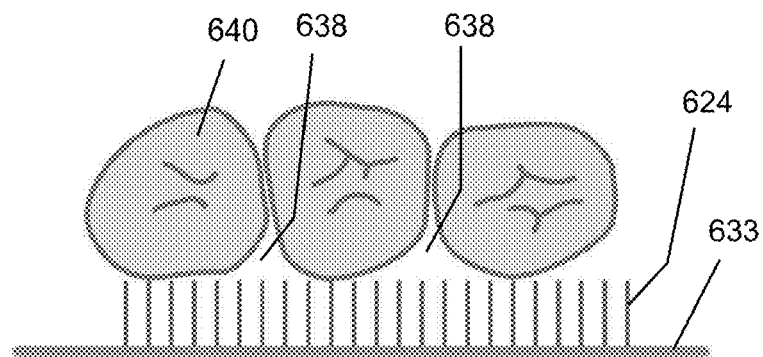
Figure 33B:
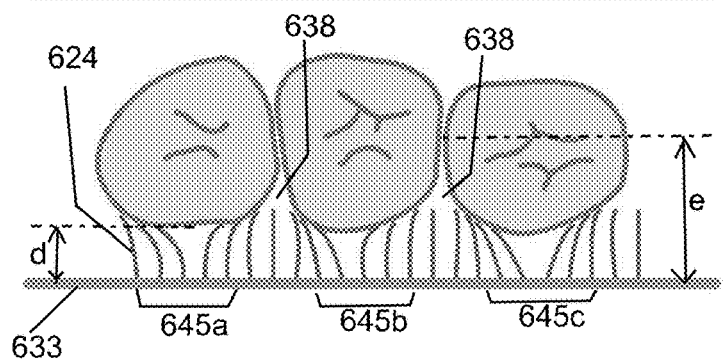

FIGS. 33a and 33b give an elucidation a recess wall which is not locally deformable.

Figure 34A:
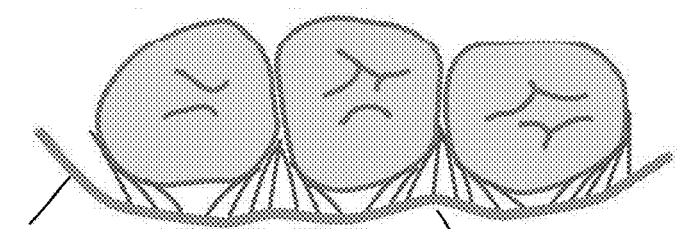
Figure 34B:
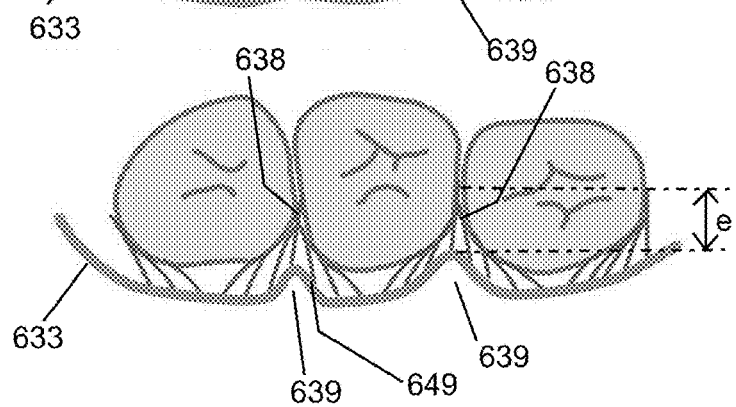

FIGS. 34a and 34b give a further elucidation of the local deformability of the recess wall of a mouthpiece according to the first aspect of the invention of Chapter 3.

Figure 35:
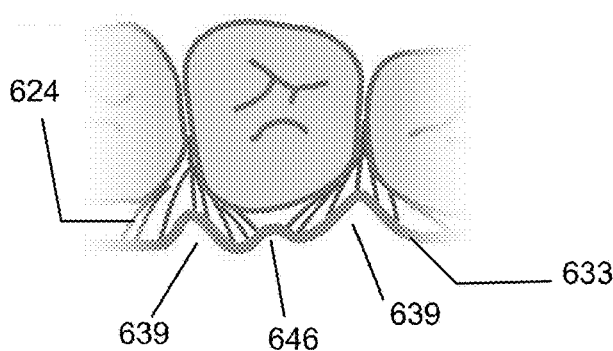

FIG. 35 gives another further elucidation of the local deformability of the recess wall of a mouthpiece according to the first aspect of the invention of Chapter 3.

FIGS. 36a, 36b, 36c schematically show cross-sectional views of a part of a first embodiment of a mouthpiece according to the third aspect of the invention of Chapter 3, in different respective operational states thereof.

FIGS. 37a, 37b, 37c schematically show cross-sectional views of a part of a second embodiment of a mouthpiece according to the third aspect of the invention of Chapter 3, in different respective operational states thereof.

FIG. 38 shows schematically a mesh structure according to a first embodiment of the third aspect of the invention of Chapter 3.

FIGS. 39a and 39b show schematically a mesh structure according to a second embodiment of the fourth aspect of the invention of Chapter 3.

FIGS. 40a and 40b show schematically a mesh structure according to a third embodiment of the fourth aspect of the invention of Chapter 3.

Figures 41A, 41B:
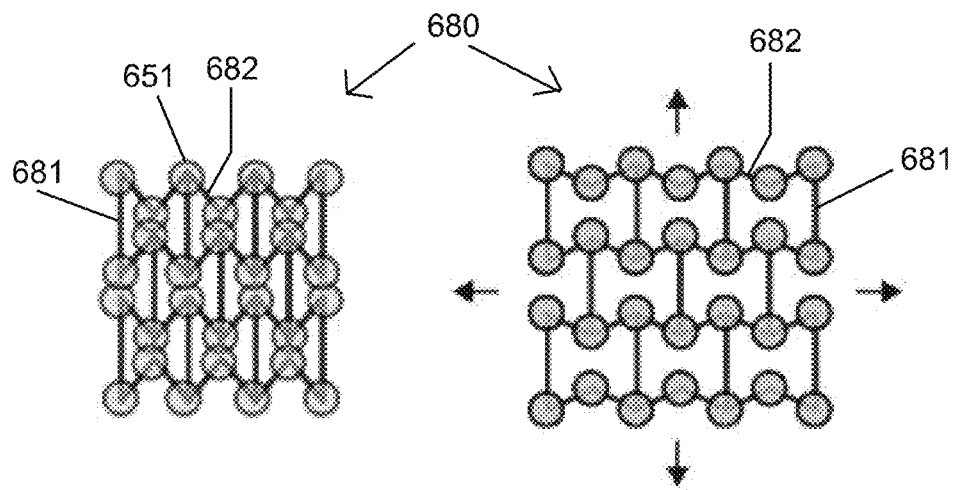

FIGS. 41*a* and 41*b* show schematically a mesh structure according to a fourth embodiment of the fourth aspect of the invention of Chapter 3.

Figures 42A, 42B:
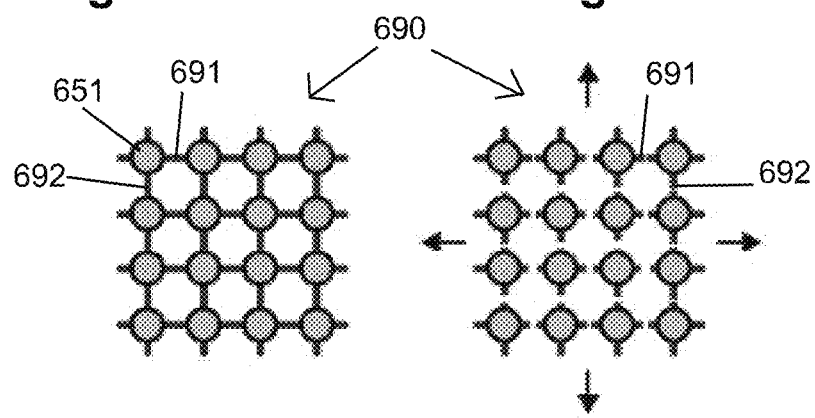

FIGS. 42*a* and 42*b* show schematically a mesh structure according to a fifth embodiment of the fourth aspect of the invention of Chapter 3.

Figures 43A, 43B:
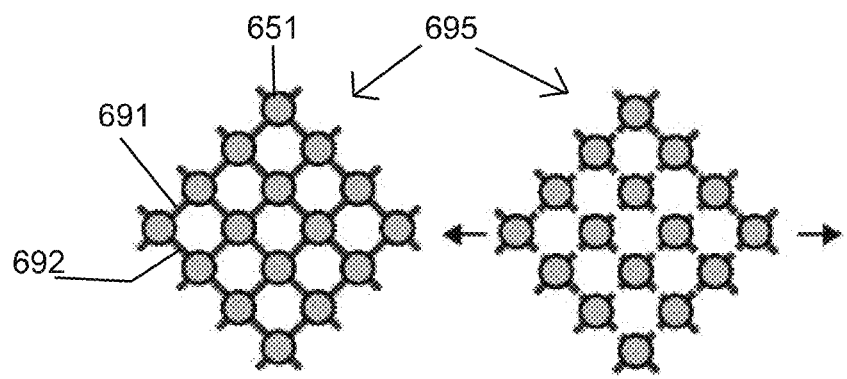

FIGS. 43*a* and 43*b* show schematically a mesh structure according to a sixth embodiment of the fourth aspect of the invention of Chapter 3.

FIG. 44 shows schematically a detail with a flexible recess wall.

Figure 45:
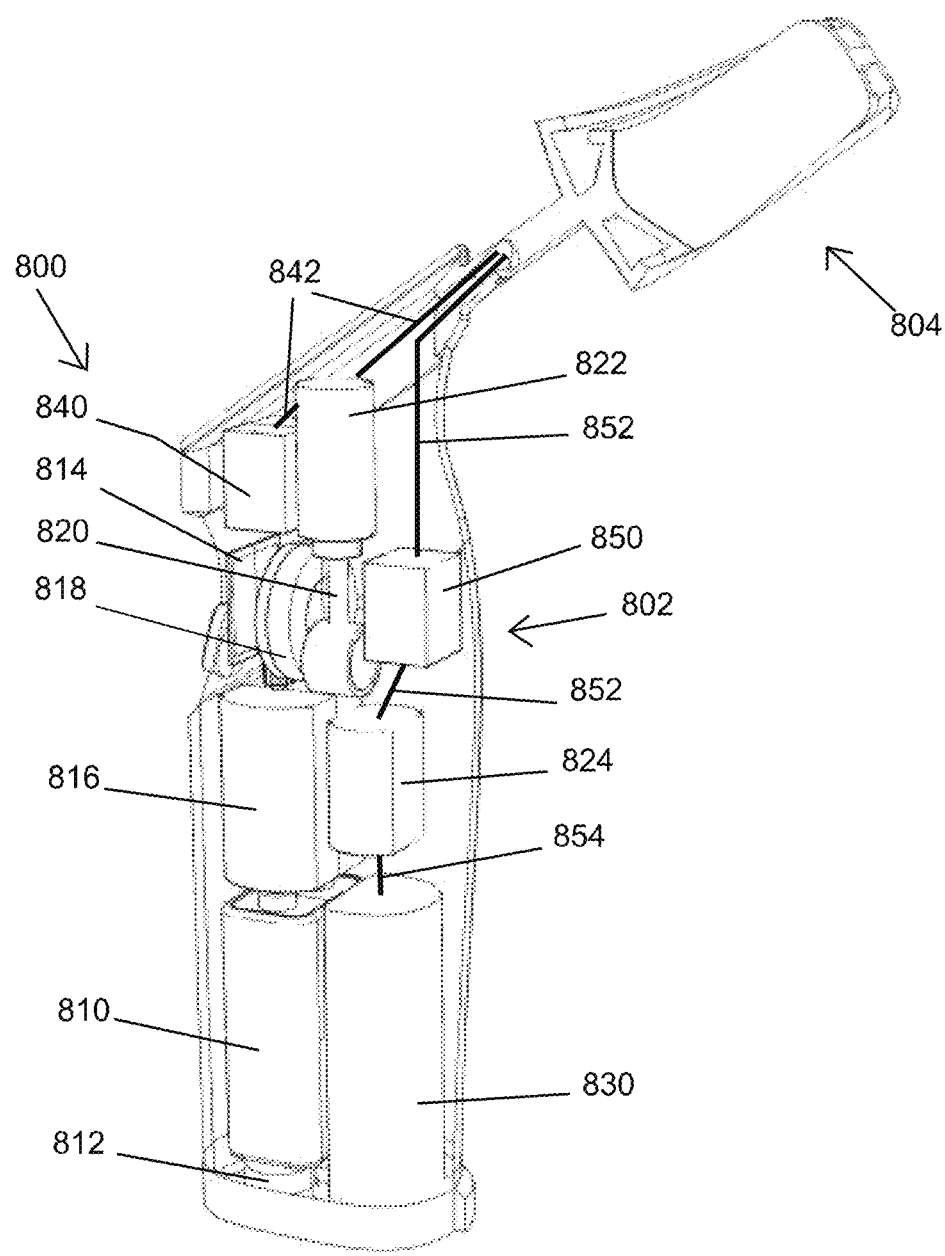

FIG. 45 shows schematically a dental cleaning device according to the invention of Chapter 3 comprising a mouthpiece according to the invention of Chapter 3.

DETAILED DESCRIPTION OF THE FIGURES

Chapter 1

The FIGS. 1-20 shows multiple embodiments of the inventions of Chapter 1. Although the embodiments may be different, the same reference numbers/signs for same or similar items will be used throughout all these FIGS. 1-20.

FIG. 1 shows in perspective view, highly schematically a part of an upper dental arch 1 with dental positions 2-14. Each dental position is indicated with a vertical dashed line.

Each dental position usually comprises a tooth which is named according to a nomenclature known to each dentist. Using this nomenclature:

dental position 2 is the position of the left 'second molar', present in FIG. 1;
dental position 3 is the position of the left 'first molar', missing in FIG. 1;
dental position 4 is the position of the left 'second premolar', present in FIG. 1;
dental position 5 is the position of the left 'first premolar', present in FIG. 1;
dental position 6 is the position of the left 'canine', present in FIG. 1;
dental position 7 is the position of the left 'lateral incisor', missing in FIG. 1;
dental position 8 is the position of the left 'central incisor', present in FIG. 1;
dental position 9 is the position of the right 'central incisor', present in FIG. 1;
dental position 10 is the position of the right 'lateral incisor', present in FIG. 1;
dental position 11 is the position of the right 'canine', present in FIG. 1;
dental position 12 is the position of the right 'first premolar', present in FIG. 1;
dental position 13 is the position of the right 'second premolar', present in FIG. 1;
dental position 14 is the position of the right 'first molar', present in FIG. 1;

In FIG. 1 the dental position of the right 'second molar' is not shown, and also the dental positions of the right and left 'third molar', also called wisdom tooth, are not shown. Similar the lower jaw has a similar number of dental positions, which are in accordance with said nomenclature similarly named.

Reference number 15 indicates the lingual side of the arc of dental positions. The lingual side 15 is the inner side of the arc of dental positions, which inner side faces the tongue. Reference number 16 indicates the facial side of the arc of dental positions. The facial side 16 is the outer side of the arc of dental positions, which outer side faces the face, like the cheeks and lips.

FIG. 1 further shows a system of three mutually orthogonal axes, comprising an x-axis X, an y-axis Y and a z-axis Z. The z-axis Z is a curved axis following the contour of the dental arch 1. The x-axis X and y-axis Y are perpendicular to each other and define an xy-plane which is essentially flat and perpendicular to the dental arch 1, i.e. each xy-plane intersecting a location on the z-axis is, at that location, perpendicular to the curved z-axis Z. The z-axis Z defines a curved length direction. The z-axis Z and y-axis Y define a curved zy-plane, with viewed along the z-axis, an arc-shape similar to shape of the dental arc. Further, the z-axis Z and x-axis X define a zx-plane.

FIG. 2*a* shows schematically a perspective view of an example of a mouthpiece 20 made with the method according to the invention of Chapter 1. FIG. 2*b* shows a cross section of the mouthpiece of FIG. 2*a*, viewed as indicated by arrows IIb in FIG. 2*a*.

The mouthpiece 20 comprises a body 21 provided with a first recess 22. This first recess 22 has, viewed along the z-axis of FIG. 1, a curved length direction and, viewed in the xy-plane of FIG. 1, an U-shaped cross section. The first recess 22 is delimited by a recess wall 23, which is in the xy-plane U-shaped. The recess wall 23 is lined with a plurality of bristles 24, each having one end, called the root 49, attached to the recess wall 23 and extending from the recess wall 23 into the first recess 22.

Reference 26 indicates a nipple configured for connecting the mouthpiece to a pumping and/or suctioning device. The mouthpiece 20 further has a right half 27 and a left half 28, which halves come so to say together at nipple 26.

Reference 25 indicates a curved dividing line, which defines a mirror plane parallel to the xz-plane as defined in FIG. 1. The mouthpiece as shown in FIG. 2 is so to say mirror symmetrical with respect to this mirror plane, meaning that there is a second recess (not visible in FIG. 2*a* but visible in FIG. 2*b*) opposite the first recess 22, which second recess is lined with bristles as well. It is noted that the first recess may have a shape different than the shape of the second recess because the (teeth of the) upper and lower arc of dental positions have different shapes.

The recesses 22 are configured to encompass an entire dental arch from the dental position of the right third or second molar to the dental position of the left third respectively second molar. The recesses 22 may also be configured to encompass a part of an arch of dental positions, this part comprising at least five dental positions, for example from the dental position of a central incisor to the dental position of a second premolar or to the dental position of a first molar or a dental position of a second molar.

FIG. 2*b* shows a cross-section according to arrows IIb in FIG. 2*a* of a right part of the mouth piece 20.

As can best be seen in FIG. 2*b*, the bristles may be provided as tufts 29 of relatively thin bristles 24. Each tuft 29 may have a base 36 which carries the bristles 24 at their roots 19 and is attached to the recess wall.

As can be seen in FIG. 2*b*, the mouthpiece 20 has a body 21 having in its upper side a first recess 22 and in its lower side a second recess 22. Both recesses 22 are delimitated by a flexible recess wall 23. In cross-section parallel to the xy-plane as defined in FIG. 1, the recess walls 23 are U-shaped and have a recess wall bottom 34 and two recess wall legs 33 extending from the recess bottom wall. The recess wall 23 is covered with tufts 29 of bristles on the legs 33 and/or bottom 34 of the recess wall.

Inside the body there is provided a pressure chamber 35, which may, via the nipple 26 (FIG. 2*a*), be filled with a fluid. The fluid may be a gas, like air, or a liquid, like water. In the embodiment as shown in FIG. 2, the mouthpiece has one pressure chamber. It is however noted that the mouthpiece may comprise a plurality of pressure chambers, like 5 pressure chambers, or any other number of pressure chambers. The not pre-published PCT/NL2018/050276 shows examples of other numbers of pressure chambers in FIGS. 4, 5, 7, 9 and 10. In case of multiple pressure chambers, all the pressure chambers or groups of pressure chambers may according to the invention of Chapter 1 be in fluid communication with each other, similar as is described in the not pre-published PCT/NL2018/050276.

As can be seen in FIG. 2b, the mouthpiece may comprise an internal support structure of a material which is rigid relative to the material of the recess wall 23. This support structure may structure comprise a lingual plate 30 and a facial plate 32, both extending along the curved zy-plane defined in FIG. 1 and consequently, viewed along the z-axis, having a U-shape. In order to keep the lingual plate 30 and facial plate 32 at a distance from each other, the support structure may comprise one or more spacers 31. These one or more spacers 31 may for example be a multiple of bars or wires or a single plate which may extend essentially parallel to the zx-plane as defined in FIG. 1. In case of a single plate as spacer, this plate may divide the pressure chamber 35 in two pressure chambers, an upper one and a lower one. These two pressure chambers may be in fluid communication with each other via one or more through holes through the plate. In case of large through holes and/or a large number of through holes the two pressure chambers may effectively be one single pressure chamber.

The mouthpiece as shown in FIG. 2 is configured for simultaneously brushing at a plurality of dental positions. In case a tooth is present, the tooth of the respective dental position will be brushed. The remnants at a dental position, like the gum, may be brushed in case a tooth may be missing and the teeth adjacent the location of the missing tooth may be additionally brushed by bristles intended for the location of the missing tooth.

The single pressure chamber 35 comprises a first flexible recess wall 23 delimiting the first recess 22 (the upper one in FIG. 2b) and a second flexible recess wall 23 delimiting the second recess 22 (the lower one of FIG. 2b). The first and second recess walls are deformable, in particular by increasing or decreasing the pressure in the pressure chamber 23. The flexible recess walls 23 may be made from an elastic material, such as a rubberlike material. The flexible recess walls 23 may also be made from a non-elastic material. The material of the flexible recess walls 23 may keep a predetermined shape when there is substantially no, or a low, pressure difference across an inner side and an outer side of the flexible recess walls 23.

The mouthpiece 20 is configured for the tufts 29 of bristles 24 to engage the tooth surface of teeth of a dental arch or, in case one or more dental positions the tooth might be missing, to engage the gum at the respective dental position(s) at least when the pressure in the pressure chamber 35 is increased. In case a tooth might be missing at a dental position, especially the tufts 29 of bristles at the free ends of the recess wall legs 33 will engage the gum at the empty dental position.

Viewed in length direction Z of the dental arch—as defined in FIG. 1 —, the tufts 29 of bristles 24 may be arranged at about the same density as viewed in the cross-sections shown in FIG. 2b.

When the pressure in the pressure chamber 35 is increased to an increased pressure condition, for example by feeding a fluid to the pressure chamber 35, or increasing an amount of fluid in the pressure chamber 35, the recess walls 23 are so to say compacted to narrow the recess 22, whereby the bristles 24, in particular the free ends thereof, may engage tooth surfaces firmly and/or may be deformed against tooth surfaces. When the pressure in the pressure chamber 35 is decreased subsequently, the recess walls are so to say widened to enlarge the recess 22. This narrowing and widening of the recess walls may be small, but when reciprocatingly repeated with some frequency of for example 1 to 50 Hz, this reciprocatingly deforming of the recess wall by reciprocatingly narrowing and widening it, causes the bristles to move between a firmer and relatively less firm engagement with tooth surfaces and/or the bristles to alternate between a first and second deformed condition, which in turn causes a sweeping and/or rubbing of bristles along the tooth surfaces. It is noted that the recess wall obtained with the method according to the invention of Chapter 1 can also be used in other types of mouthpieces, for example mouthpieces without pressure chamber. The recess wall obtained with the method according to the invention of Chapter 1 may for example be used in a mouthpiece where the mouthpiece as a whole is mechanically vibrated to bring the bristles into brushing motion.

By a suitable cycle of increasing and decreasing pressure in the pressure chamber 35 an effective brushing action of the mouthpiece can be obtained. The bristles 24 attached to the recess wall bottom 34 generally perform an upward and downward motion during such cycling, and the bristles 24 at the recess wall legs 33 generally perform a sideways motion to and fro during such cycling in the direction of the x-axis as defined in FIG. 1. Due to the recess 22 alternatively narrowing and widening when reciprocatingly increasing and decreasing pressure, the bristles 24 at the recess wall legs may also be subjected to a back and forth pivoting around the z-axis as defined in FIG. 1, resulting in a sweeping and/or rubbing movement of the bristles in the direction of the y-axis as defined in FIG. 1.

Referring to FIG. 1, the width of a teeth element in the X direction varies, depending on the dental position between about 2 to 12 mm. Taking into account that it is desired to keep the mouthpiece as small as possible, the internal width of the U-shape of the recess wall in the X direction is to be kept as small as possible and may be about 0 to 2 mm wider than the width of the respective tooth. By way of example to give some indication of dimensions, the internal width of the U-shape of the recess wall may, viewed in the X-direction of FIG. 1, be in the range of 0 to 20 mm, such as in the range of 2-12 mm. The bristles may be up to 6 mm long. In case for example the bristles are 3 to 4 mm long. This means that between the bristles extending from opposing recess wall legs 33 no interspace or a limited amount of interspace of about 2-4 mm is left. In FIG. 2, these interspaces are shown exaggerated. Further by way of example to give some indication of dimensions, the U-shape of the recess wall may have, viewed in the Y-direction of FIG. 1, an internal height in the range of 3 to 20 mm, such as in the range of 5 to 10 mm. These internal width and internal height measures are indicative for an adult human. For a child or for animals these measures might be different. This limited amount of interspace makes it difficult to manufacture a mouthpiece as shown in FIG. 2 in economical manner. Injection moulding for example is difficult due to the bristles extending from the opposing recess wall legs extend essentially in the X direction which is transvers to the direction in which injection moulding moulds may be separated from each other after moulding.

FIG. 3 schematically shows a first method according to the invention of Chapter 1, FIG. 3a showing a sheet 100 with a bristled sheet part 101 lined with bristles 104 at one side 102, FIG. 3b showing mould 110 for plastically deforming the bristled sheet part 101, FIG. 3c showing the bristled sheet part 101 lying on top of the mould 110 before plastically deforming, FIG. 3d showing the bristled sheet part 101 after plastically deforming, FIG. 3e showing enlarged the detail IIIe of FIG. 3d, and FIG. 3c being the half on the left of axis 107 and FIG. 3d being the half on the right of the axis 107.

FIG. 3a shows a sheet 100, which may be made of a thermoplastic elastomer. A bristled sheet part 101 of this sheet 100 is indicated with a dashed inner arc 105 and a dashed outer arc 106. The shape of these arcs 105 and 106 may correspond to the shape of an arc of dental positions as shown in FIG. 1. The sheet 100 and bristled sheet part 101 have a first side 102, the upper side in FIG. 3, and an opposing second side 103, the lower side in FIG. 3. The first side 102 of the bristled sheet part 101 is lined with bristles 104. It is noted that in FIG. 3, which is schematically, the bristles 104 are shown on the left half of the bristled sheet part 101, but that in practice also the right half of the bristled sheet part 101 and the top part of the bristled sheet part 101 will be covered with bristles 104 as well.

FIG. 3a shows the bristled sheet part 101 as obtained in the providing step. In this providing step, the bristled sheet part 101 is in an initial condition. As shown in FIG. 3a, the bristles 104 extend in the initial condition all in the same, upward, direction. The bristles 104 may be essentially parallel to each other in the initial condition. In this initial condition the bristled sheet part 101 has, viewed in the xy-plane as defined in FIG. 1, a cross sectional shape, called 'initial shape' and, viewed along the z-axis as defined in FIG. 1, an arch-shaped length axis. In FIG. 3a the bristled sheet part 101 is shown as part of the sheet 100, but it is to be noted that the rest of the sheet outside the dashed arcs 105 and 106 may be absent, for example may be cut away. In this case there will only be an arc shaped bristled sheet part 101 and not a rectangular sheet 100 comprising the bristled sheet part 101.

In the initial condition as shown in FIG. 3, said 'initial shape' of the cross section of the bristled sheet part 101 is flat. The initial shape of the first side 102 of the bristled sheet part 101 may however also be concave (with the second side 103 being convex) or convex (with the second side 103 being concave).

FIG. 3b shows a mould 110 for transforming the bristled sheet part 101 by thermoforming from the initial condition as shown in FIG. 3a to a final condition. The mould 110 has, in its upper side 118, a cavity 111, which in the xy-plane as defined in FIG. 1 is U-shaped—see also at reference no. 112—and which, in the z-direction as defined in FIG. 1, extends along an arc similar in shape as the arc of dental positions. Several suction openings 113 may open into this cavity 111 (only one suction opening is shown in FIG. 3b, but a multiple distributed over the cavity 111 may be present). The cavity has on its upper side an arc shaped inner edge 115 and an arc shaped outer edge 116.

FIG. 3c, being the half on the left of axis 107, shows the sheet 100 lying on top of the mould 110, with the bristled sheet part 101 overlapping the cavity 111. The inner arc 105 and outer arc 106 may lie above the inner edge 115 respectively outer edge 116 of the cavity. The inner arc 105 and outer arc 106 may however have a larger distance—viewed in the x-direction of FIG. 1, than the inner edge 115 and outer edge 116, resulting in the inner arc 105 and outer arc 106 lying on top of the upper surface 118 of the mould 110.

Starting from the state as shown in FIG. 3c, a suction may be applied to the cavity 111 through the suction openings 113 or otherwise. This suction will transform the bristled sheet part 101, by thermoforming of the bristled sheet part 101, from its initial condition shown in FIGS. 3a and 3c, to its final condition shown in FIGS. 3d and 3e to provide a recess wall 120—see also FIG. 4 —, which may be used as recess wall 29 in the embodiment of FIG. 2. In this final condition, the cross-sectional shape of the bristled sheet part 101 has become a final U-shape, the length axis is (still) arch shaped and the first side has become a concave inner side of the final U-shape. In case in the initial condition, the first side may already have been concave, the first side of the bristled sheet part 101 will in the final condition be more concave than in the initial condition.

When plastically deform the bristled sheet part 101, the bristled sheet part 101 may, viewed in a direction along the contour of the U-shape be stretched. In case, viewed in the final condition and viewed in the direction along the contour of the U-shape, it is desired to have an even distribution of the bristles, this stretching may be taken into account when providing the bristled sheet part in the providing step by providing the bristles in the providing step with a denser density and possibly an uneven distribution configured such that it transforms to an even distribution during the transforming step.

Referring to FIG. 3e and FIG. 2b, the final U-shape is defined by two leg parts 33 and a bottom part 34 connecting these leg parts, wherein a vertical axis 119 is defined as extending between the leg parts 33.

For clarity of the figure, FIG. 3d only shows schematically bristles 104 on three locations. It will however be clear that the entire recess wall will be covered with bristles. This may for example be, viewed along the z-axis defined in FIG. 1, a sequence of consecutive U-shaped bristle bows like shown in the detail of FIG. 3e. As can be seen in FIGS. 3d and 3e, the bristles 104 on the one leg part 33 and the bristles 104 on the other leg part 33 extend from the respective leg part 33 towards each other.

As can be seen in FIG. 3a, the bristled sheet part is a continuous sheet part. It has no cut outs facilitating transforming the bristled sheet part 101 from the initial condition (FIGS. 3a) to the final condition (FIGS. 3d and 3e).

Figure 4:
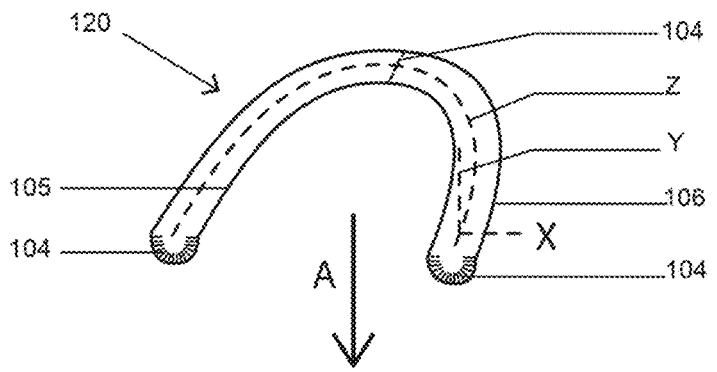
FIG. 4 schematically shows an example of a recess wall formed with a method according to the invention of Chapter 1.

FIG. 4 shows a recess wall manufactured according to the method of the invention of Chapter 1, for example a recess wall 120 as obtained with the method according to FIG. 3. Like in FIG. 3d, the bristles 104 are shown only at the ends of the recess wall and in the middle of the recess wall, but, viewed along the Z-axis as defined in FIG. 1, the inner side of the recess delimited by the recess wall may be fully covered with bristles 104.

Figure 5:
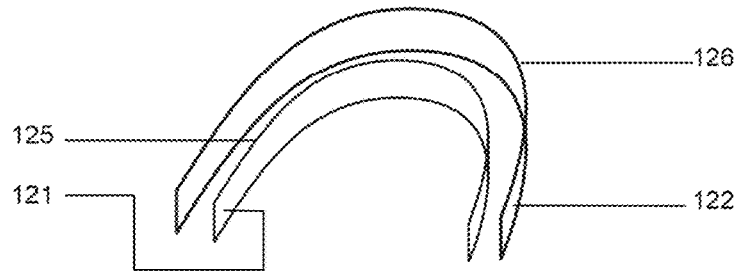
FIG. 5 illustrates schematically a further providing step of a method according to the invention of Chapter 1, providing two frame members.

FIG. 5 shows a 'further providing step' of the method according to the invention of Chapter 1. In this 'further providing step' a lingual frame member 121 and a facial frame member 122 are provided. Both the lingual frame member 121 and the facial frame member 122 are bow shaped and both have an upper edge 125 respectively 126. Referring to FIG. 2b, the lingual frame member 121 may correspond to the lingual plate 30 and the facial frame member 122 may correspond to the facial plate 32.

As indicated with the bold arrow A between FIG. 4 and FIG. 5, the recess wall 120 may, in a mounting step, be fixed to the lingual frame member 121 and facial frame member 122. For this purpose, the inner edge 105 (=dashed inner arc of FIG. 3) of the recess wall 120 is fixed on the upper edge 125 of the lingual frame member 121 and the outer edge 106 (=dashed outer arc of FIG. 3) of the recess wall 120 is fixed on the upper edge 126 of the facial frame member 122. This results in the picture of FIG. 6. After closing the gap between the lower edge 123 of the lingual frame member 121 and the lower edge 124 of the facial frame member 122 with a closure 127, a mouthpiece according to the invention of Chapter 1 is obtained with a pressure chamber delimited by the facial frame member 122, the recess wall 120, the lingual frame member 121 and the closure. When the vertical length, in the direction of the y-axis as indicated in FIGS. 1 and 4, of the lingual 121 and facial 122 frame members is extended, the closure may be a further recess wall, turned around such that its opening faces downwards. One thus obtains a mouthpiece like the one shown in FIG. 2. As shown in FIG. 2b, the outer faces of the lingual and facial frame member may be coated, for example in an injection moulding process, with a material the same as the material of the bristled sheet part.

Figure 6:
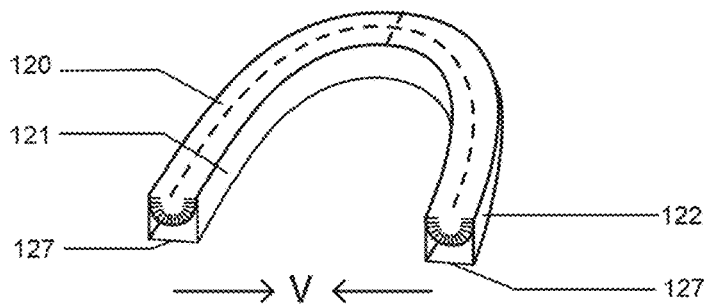
FIG. 6 schematically shows the recess wall of FIG. 5 mounted in the frame members of FIG. 5, and illustrates another manner of doing the transforming step of the method according to the invention of Chapter 1.

As indicated with arrow V in FIG. 6, the curvatures of the lingual 121 and facial 122 frame members may be reduced, for example by squeezing the free ends of the bow-shaped frame members, after mounting the recess wall 120 to these frame members. Doing so will result, viewed in the direction of the Y-axis of FIGS. 1 and 4, in an increase of the depth of the U-shaped cross section, in other words the bottom of the U-shaped cross section will come closer to the closure 127. This can in addition to the transforming by thermoforming of the method of FIG. 3 or as an alternative for the transforming by thermoforming be used in order to transform the bristled sheet part 101 to its final condition. In case it is used as an alternative for thermoforming, the bristled sheet part 101 may still be flat (like in FIG. 3a) or slightly curved when in the state as shown in FIG. 6. The transformation step then comprises reducing the initial curvature of the bristled sheet part 101 to its final curvature simultaneously with transforming the cross sectional shape from its flat or slightly curved initial shape to its final U-shape.

Referring to FIG. 6, the curvatures of the lingual and facial frame members 121, 122 may also be realised by using resilient frame members 121, 122. From a relieved or stress-less condition, in which the frame members have a narrow bow curvature corresponding to their final curvature, the frame members 121, 122 may be pre-biased from the relieved condition to a pre-tensioned condition, in which the frame members have a wider bow curvature than in the relieved condition, which wider bow curvature may correspond to the initial curvature of the bristled sheet part. In this pre-tensioned condition, the frame members 121, 122 have a pre-tension acting in a direction to return the frame members 121, 122 to their relieved condition, which may correspond to the final condition.

Figure 7A:
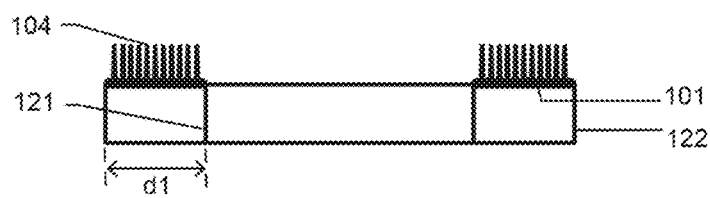
FIG. 7a shows the initial condition and FIG. 7b shows the final condition.
Figure 7B:
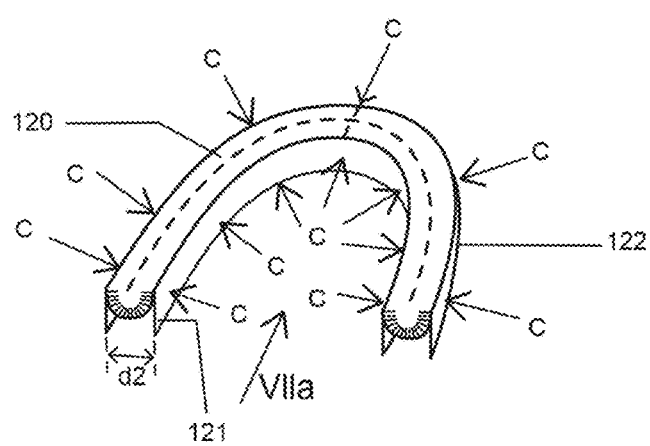

FIG. 7b shows a view similar to FIG. 6. FIG. 7a shows a side view according to arrow VIIa in FIG. 7b. FIG. 7a shows the bristled sheet part 101 shown in its initial condition as it is obtained in the providing step. In this initial position, the bristled sheet part 101 is flat, but the first side lined with the bristles 104 may also be shallow concave or convex. FIG. 7b shows the bristled sheet part 101 in its final condition. The bristled sheet part 101 is transformed from the initial condition shown in FIG. 7a to the final condition shown in FIG. 7b, by reducing, viewed in the direction of the x-axis as defined in FIG. 1 and also shown in FIG. 4, the distance between the inner edge 105 (=dashed inner arc of FIG. 3) and outer edge 106 (=dashed outer arc of FIG. 3) of the bristled sheet part 101 from the wider d2—see FIG. 7a—to the smaller d1—see FIG. 7b—by moving the inner edge 105 and the outer edge 106 towards each other as indicated by the arrow C in FIG. 7b. Doing so will result, viewed in the direction of the Y-axis of FIGS. 1 and 4, in an increase of the depth of the U-shaped cross section. This may be in addition to the transforming by thermoforming or may be used as an alternative for the transforming by thermoforming in order to transform the bristled sheet part 101 to its final condition. In case it is used as an alternative for thermoforming, the bristled sheet part 101 may still be flat (like is shown in FIG. 7a) or slightly curved when in the state as shown in FIG. 7a. In case the bristled sheet part 101 is attached to the upper edges of the frame members 121 and 122, the transformation step may be carried out by reducing the distance between the facial frame member 122 and lingual frame member 121 in the direction of the x-axis—as defined in FIG. 1 and shown in FIG. 4 as well —.

The mechanisms described above in relation to FIGS. 6 and 7, in short indicated as the arrow V mechanism (FIG. 6) and the arrows C mechanism (FIG. 7), both are basically a mechanical transformation. The arrow V mechanism and arrows C mechanism may also be used in combination, the one after the other or simultaneously as shown in FIG. 8. In FIG. 8, FIG. 8a shows the initial condition having an arch shaped length axis L1 and a distance d1 between the inner edge 105 and outer edge 106 of the bristled sheet part 101, and FIG. 8b shows the final condition having an arch shaped length axis L2 and a distance d2 between the inner edge 105 and outer edge 106 of the bristled sheet part 101, wherein d2 is smaller than d1 and L2 has a stronger/narrower curvature than L1.

FIG. 9 shows an example of two sheets parts 101 being provided as a single part 150. FIG. 9a shows the single part in a flat condition. This single part comprises two bristled sheet parts 101 having a first side lined with bristles, the bristles on this first side being shown as a grey bow shaped face. The two bristled sheet parts are connected by transition areas 151. These transition areas 151 are configured to allow the two bristled sheet parts 101 to be folded with respect to each other from a first position in which the two bristled sheet parts 101 are aligned—which first position is shown in FIG. 9a—to a second position in which the two bristled sheet parts are folded over each other—which second position is shown in FIG. 9b. The single part 150 may, in the providing step, be provided in the state as shown in FIG. 9a or in the state as shown in FIG. 9b, or in any intermediate state in between the state of FIG. 9a and FIG. 9b. In case the single part 150 is provided in the state of FIG. 9a or in a said intermediate state, the bristled sheet parts 101 may, in a folding step, be folded from a first position (FIG. 9a or an intermediate state between FIGS. 9a and 9b) to the second position (FIG. 9b).

FIG. 10 shows in cross sectional view a further example of a bristled sheet part 101 in the initial condition (FIG. 10a) and a bristled sheet part 101 in the final condition (FIG. 10b). The first side 102 of bristled sheet part 101 is in the initial condition slightly concave. The bristled sheet part 101 has two leg parts 33 interconnected by a bottom part 34. A vertical axis 160 extends transverse to the bottom part 34. In the initial condition, the bristles 104 extend parallel to the vertical axis 160. The angle α of the leg parts 33 with respect to the vertical axis 160 may, in the initial condition, for example be 55°. When, in the transforming step, the leg parts 33 are rotated towards each other over an angle of x° with respect to the vertical axis 160, the resulting angle of the leg parts 33 with respect to the vertical axis will become α−x° and the angle of each the bristles on the legs 33 with respect to the vertical axis will become x°, see FIG. 10b.

Assuming x may be 45° and a may be 55°, the final angle α-x° of the leg parts 33 with respect to the vertical axis 160 will be 10°.

With respect to FIG. 10, it is noted that the bottom part 34 shows no bristles but that bristles 104 may be present on the bottom part 34 as well. Further it is noted, that the leg parts 33 are, for reasons of simplicity of the FIG. 10 and the explanation of FIG. 10, shown as straight, but these leg parts 33 may, in FIGS. 10a and 10b, be curved as well, or may become curved in FIG. 10b starting from straight in FIG. 10a.

FIG. 11 schematically illustrates the effects of both narrowing the curvature of the length axis of the bristled sheet part, and decreasing the mutual distance d between the boundary edges 105 and 106 of the bristled sheet part 101, i.e. the distance d between the inner edge 105 and outer edge 106 in the transforming step, by essentially mechanical transformation of the bristled sheet part 101. FIG. 11a shows a perspective view on the not bristled side of the bristled sheet part 101 in the initial condition and FIG. 11b shows a perspective view on the not bristled side of the bristled sheet part 101 in the final condition. As one can see from FIGS. 11a and 11b, the initial wide curvature of the length axis of the bristled sheet part 101 (see FIG. 11a) is less curved than the final narrow curvature of the length axis of the bristled sheet part (see FIG. 11b). FIG. 11c shows the cross-sectional shape of the bristled sheet part 101 at location m in the initial state (on the left) and in the final state (on the right). FIG. 11d shows the cross-sectional shape of the bristled sheet part 101 at location n in the initial state (on the left) and in the final state (on the right). FIG. 11e shows the cross-sectional shape of the bristled sheet part 101 at location n in the initial state (on the left) and in the final state (on the right). As one can see from FIGS. 11c, 11d and 11e, the mutual distance between the boundary edges 105 and 106 is reduced from d1 in the initial condition to (the smaller) d2 in the final condition. This transformation may be performed without stretching the sheet part 101. When performing this transformation, one will notice that narrowing the curvature of the length axis and the decrease of the mutual distance may occur simultaneously. As is illustrated in FIG. 11c, the cross sectional shape at position o will transform from a relatively shallow and blunt U-shape to a relatively deep and sharp U-shape, like a V-shape. As is illustrated in FIGS. 11d and 11e, the cross sectional shape at the positions m and n will transform from a relatively shallow U-shape to a relatively deep U-shape. Positions m and n are in the relatively straight part of the arch shaped bristled sheet part and position n is in the relatively most curved part of the arch shaped bristled sheet part. The cross-sectional shape changing, in the final condition (shown in FIG. 11b and right part of FIGS. 11c, 11d and 11e) and viewed from position m in the direction of position o, from blunt U-shaped to sharp U-shaped (V shaped) is in correspondence with the change in cross-sectional shape of a human dental arch. In the human dental arch the central and lateral incisors may have, viewed in the plane perpendicular to the length direction of the human dental arch, an about V-shaped cross-sectional shape, the molars and pre-molars have an about U-shaped cross-sectional shape, whilst the canines have a cross-sectional shape in between the V-shape and U-shape.

FIGS. 12-18 schematically show some further examples of embodiments according to the invention of Chapter 1. All these figures are in cross-sectional view—the xy-plane as defined in FIG. 1—transverse to the arch-shaped length axis—extending in the direction of the z-axis of FIG. 1 —. The cross-sectional views of FIGS. 12-18 are taken at the position m of FIG. 11. Similar as in FIG. 11, the length axis of the bristled sheet parts 101 shown in FIGS. 12-18 is arch shaped, and similar as in FIG. 11, the cross-sectional shape of the bristled sheet parts 101 shown in FIGS. 12-18 may, in the final condition, vary along the arch-shaped length axis.

The embodiment of FIG. 12 schematically shows an example of a relatively thick bristled sheet part 101 processed to a mouthpiece with the method according to the invention of Chapter 1. FIG. 12a shows the bristled sheet part 101 in the initial condition as provided by the providing step. The thickness of the sheet part is defined as the thickness of the sheet part itself without taking into account the bristles on the sheet part and is indicated with g in FIG. 12a. In the example of FIG. 12 the thickness g is about 15 mm, whilst in the examples of other FIGS. 1-10 and 12-18, the thickness g may for example be in the range of 0.5 to 3 mm. FIG. 12b shows the bristled sheet part 101 after transformation to the final condition, i.e. the recess wall as obtained. FIG. 12c shows two said recess walls being brought together with the bottoms of the U-shapes facing each other. The bottoms of the U-shapes are subsequently joined together at 130, for example by thermal welding or by means of an adhesive (or glue), resulting in the mouthpiece as shown in FIG. 12d. The mouthpiece shown in FIG. 12d may for example be used for brushing teeth by mounting the mouthpiece on a rod—which may be attached to the mouthpiece at the location o of FIG. 11b—and subjecting this rod to vibrational movements in the length direction of the rod and/or in one or two mutually perpendicular directions, each being perpendicular to the rod.

The embodiment of FIG. 13 schematically shows, with two variants, an example of a bristled sheet part assembly 201 processed to a recess wall with the method according to the invention of Chapter 1. The sheet part assembly 201 comprises a bristled sheet part 101 delimitated, in the direction of the arch shaped length axis, by the inner arc/(wall-)edge 105 and outer arc/(wall-)edge 106. The sheet part assembly 201 further comprises, on the inner boundary edge 105, an inner attachment member 231 extending along the entire inner boundary edge 105 and, on the outer boundary edge 106, an outer attachment member 232 extending along the entire outer boundary edge 106. Additionally, the sheet part assembly 201 further comprises a lingual frame member 30 and a facial frame member 32. The inner attachment member 230 and outer attachment member 232 may, as shown in FIG. 13, be shaped as a side flap projecting from the inner boundary edge 105 respectively outer boundary edge 106. The lingual frame member 30 and facial frame member 32 may, as shown in FIG. 13, be shaped as a plate.

Figure 13A:
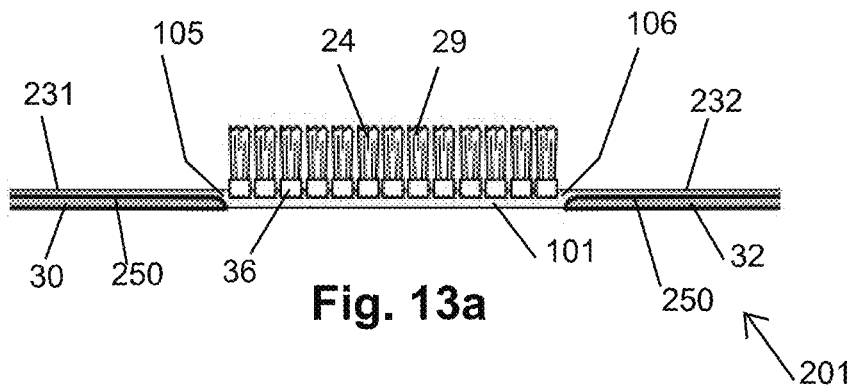
FIG. 13 showing in cross-sectional view a further example of an embodiment according to the invention of Chapter 1, FIG. 13a showing an initial condition, FIG. 13b showing another initial condition, and FIG. 13c showing a final condition.
Figures 13B, 13C:
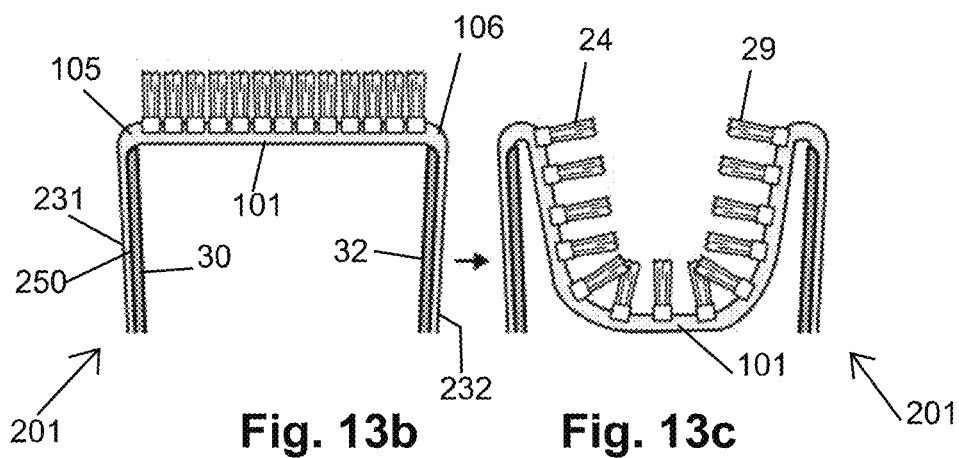

The sheet part assembly 201 of FIG. 13 may, in the providing step, be provided as a pre-fabricated part in the flat initial condition of FIG. 13a, or in the U-shaped initial condition of FIG. 13b, or in an initial condition in which the flaps 231, 232 and plates 30, 32 have any other position relative to the bristled sheet part 101 and/or each other. The pre-fabricated part may for example be made by injection moulding, such as a multi material injection moulding technique. The sheet part assembly of FIG. 13 may also be made during the providing step, for example by injection moulding, such as a multi material injection moulding technique.

Whether the sheet part assembly 201 is a pre-fabricated part which has been made prior to the providing step or is made during the providing step, in both cases it may be made by injection moulding, such as a multi material injection moulding technique. Tufts 29 (optionally already pre-assembled) with bristles 24 are placed as inserts in the injection moulding mould, the roots of the tufts—which may optionally be provided with a base 36 per tuft as shown —, projecting in the mould cavity at the location where the sheet part 101 is to be formed. After closing of the mould, a first and second plastic materials are injected into the mould. The first material forms the lingual 30 and facial 32 frame member and the second material forms the sheet part 101 and inner attachment member 231 and outer attachment member 232. At the interfaces 250 between the frame members 30, 32 and attachment members 231, 232, the frame members 30, 32 and attachment members 231, 232 will adhere to each other due to the fused interface layer formed there. The second material forming the sheet part 101 over-moulds with the bases 36 of the tufts creating a firm bonding of the tufts to the sheet part 101. The bonding of the bases 36 to the sheet part may for example be due to enclosing the bases within the sheet part and/or by fusing at the interface of the second material and the bases 36. Alternatively, it is also possible that the lingual and facial frame members have been pre-fabricated and are, like the tufts, placed as inserts into the injection moulding mould. In this case, there will be injected only the second material for forming the sheet part and attachment members which material will over-mould with the attachment members and adhere to the attachment members by a fused interface layer being formed.

The sheet part assembly 201 obtained in the providing step in the initial condition of for example FIG. 13*a* or 13*b*, is subsequently subjected to the transforming step. In this transforming step, which may for example be by thermoforming and/or mechanical deformation (for example by narrowing the curvature of the length axis of the sheet part and/or reducing the distance between inner boundary edge 105 and outer boundary edge 106), the sheet part assembly 201 is transformed to its final condition as shown in FIG. 13*c*. In the embodiment of FIG. 13, the transforming step has been done by thermoforming. But as said, it may also be done by two manners of mechanical deformation or a combination of these two manners and also thermoforming and mechanical deformation may be combined in the transforming step.

As can be seen in FIG. 13*c*, the tufts/bristles 29/24 are, viewed in the cross-sectional plane, distributed in a regular pattern. Also in FIGS. 13*a* and *b*, the tufts/bristles 29/24 are distributed in a regular pattern. Due to stretching of the wall part 101 during the transforming step, the distance between the tufts/bristles 29/24 is in FIG. 13*c* increased with respect to FIGS. 13*a* and 13*b*. In this example, this stretch is regular over the U-shape, but this may also be irregular. Taking into account the stretch, the tufts/bristles can be arranged in the initial condition of FIGS. 13*a* and 13*b* such that in the final condition of FIG. 13*c*, the tufts/bristles have a predetermined, like regular, distribution.

Figures 14A, 14B:
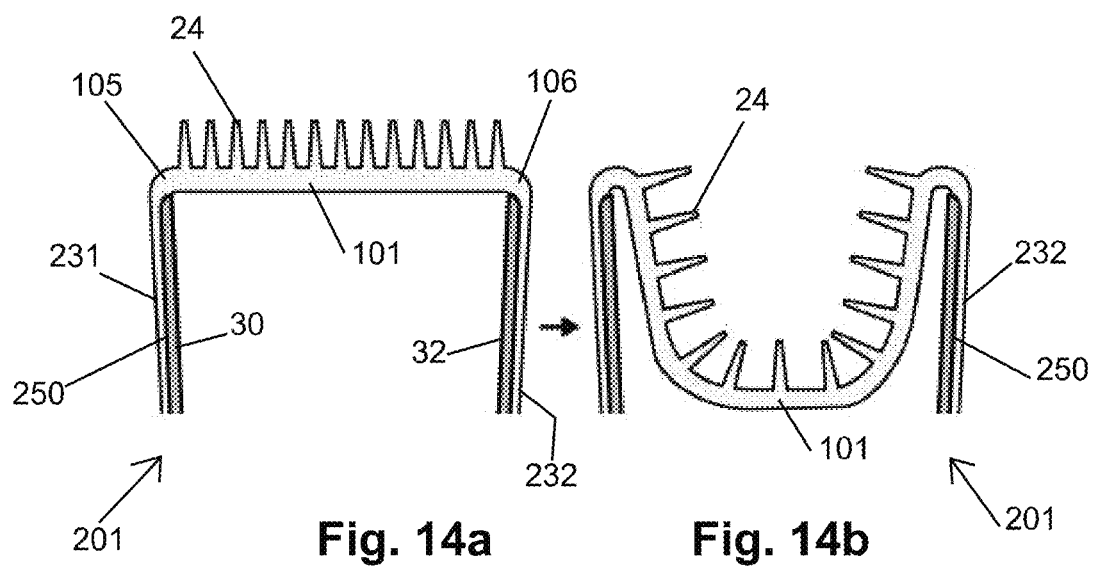
FIG. 14 showing in cross-sectional view a further example of an embodiment according to the invention of Chapter 1, FIG. 14a showing an initial condition, and FIG. 14b showing a final condition.

The embodiment of FIG. 14 schematically shows another example of a bristled sheet part assembly 201 processed to a recess wall with the method according to the invention of Chapter 1. This embodiment is essentially the same as the embodiment of FIG. 13, except that in the embodiment of FIG. 14 the bristles are injection moulded from the same material as the sheet part, instead of tufts inserted into the injection moulding mould prior to injection moulding. For the rest, the elucidation given in relation to FIG. 13 applies mutatis mutandis to FIG. 14 as well.

The embodiment of FIG. 15 schematically shows another example of a bristled sheet part assembly 201 processed to a recess wall with the method according to the invention of Chapter 1. FIG. 15 is shown with tufts like in FIG. 13 but may equally well be with injection moulded bristles 24 like in FIG. 12. The main difference between the embodiment of FIG. and the embodiments of FIGS. 13 and 14, is in the inner attachment member and outer attachment member.

In FIG. 15 the inner and outer attachment member are formed as a double side flap extending along the inner boundary edge 105 respectively the outer boundary edge 106. The inner attachment member comprises a first flap part 231 and a second flap part 233 parallel to the first flap part 231 and at a distance from the first flap part 231 so that a gap 235 is defined between the inner flap part 231 and outer flap part 233. As indicated in FIG. 15*b* by arrows, the lingual frame plate 30 can be inserted into this gap 235. Similarly, the outer attachment member comprises a first flap part 232 and a second flap part 234 parallel to the first flap part 232 and at a distance from the first flap part 232 so that a gap 236 is defined between the inner flap part 232 and outer flap part 234. As indicated in FIG. 15*b* by arrows, the facial frame plate 32 can be inserted into this gap 235.

FIG. 15*a* shows the sheet part assembly 201—not yet with the frame members 30 and 32 included—in the initial condition as obtained in the providing step. FIGS. 15*b* and 15*c* show the sheet part assembly 201 in the final condition. As follows from FIG. 15*b*, first the transformation step is applied to the sheet part assembly of FIG. 15*a*, without the frame members 30, 32, and subsequently the lingual frame member 30 and facial frame member 32 are inserted into the respective gaps 235 and 236. The frame members 30 and 32 may be attached to the outer flaps 231, 232 and inner flaps 233, 234 by means of an adhesive (or glue) and/or by thermal welding.

With respect to the embodiment of FIG. 15 it is noted that this embodiment may also be made by a combination of injection moulding techniques as elucidated in relation to FIG. 13 or in case the bristles are according to FIG. 14 by a multi material injection moulding technique in case the sheet part, flaps and frame members are simultaneously or sequentially injection moulded in one mould or over-moulding in case the frame members have been made prior to moulding the sheet part and flaps (or the other way around in case the sheet part and flaps have been made prior to moulding the frame members).

The embodiment of FIG. 16 schematically shows another example of a bristled sheet part assembly 201 processed, with the method according to the invention of Chapter 1, to a mouthpiece with recess wall according to the invention of Chapter 1. The embodiment of FIG. 16 is basically the same as the embodiment of FIG. 14 so that the elucidation in relation to FIG. 14 (and in relation to FIG. 13) applies mutatis mutandis to FIG. 16 as well. It I further noted that the embodiment of FIG. 16 may also use the double side flaps of FIG. 15, so that the elucidation in relation to FIG. 15 applies mutatis mutandis as well to FIG. 16. The difference of the FIG. 16 embodiment with respect to the embodiments of FIGS. 13-15 is in the lingual frame member 30 and facial frame member 32. These frame members are provided with a snap connection allowing two sheet part assemblies 201 to be connected together.

FIG. 16*a* shows one of these sheet part assemblies in the initial condition. FIG. 16*b* shows both sheet part assemblies 201 in the final condition. The sheet part assembly shown in FIG. 16*a* and in the upper half of FIG. 16*b* carries on the free ends of the lingual frame member 30 and facial frame member 32 a female part 237, 238 of the snap connection. The sheet part assembly shown in the lower half of FIG. 16*b* carries on the free ends of the lingual frame member 30 and facial frame member 32 a male part 239, 240 of the snap connection. As will be clear, also the sheet part assembly shown in the lower half of FIG. 16b will initially be provided in the initial condition similar to the one shown in FIG. 16a for the upper half of FIG. 16b. The male parts 239, 240 of the snap connection and the female parts 237, 238 of the snap connection mate to each other such that a snap connection can be established. As will be clear, the male and or female parts of the snap connection are shown are intended as an example and may also be formed differently.

After assembling the sheet parts assemblies 201 of FIG. 16b together, a mouthpiece according to the invention of Chapter 1 is obtained. The brushing action may be obtained by subjecting the entire mouthpiece to a mechanical vibration, for example by means of a vibrating rod (or handle) as mentioned earlier in relation to FIG. 12. The brushing action may also be obtained by using the space delimited by the lingual frame members 30, facial frame members 32 and sheet parts 101 as a pressure chamber and reciprocatingly increasing and decreasing the pressure in this pressure chamber.

Figures 17A, 17B:
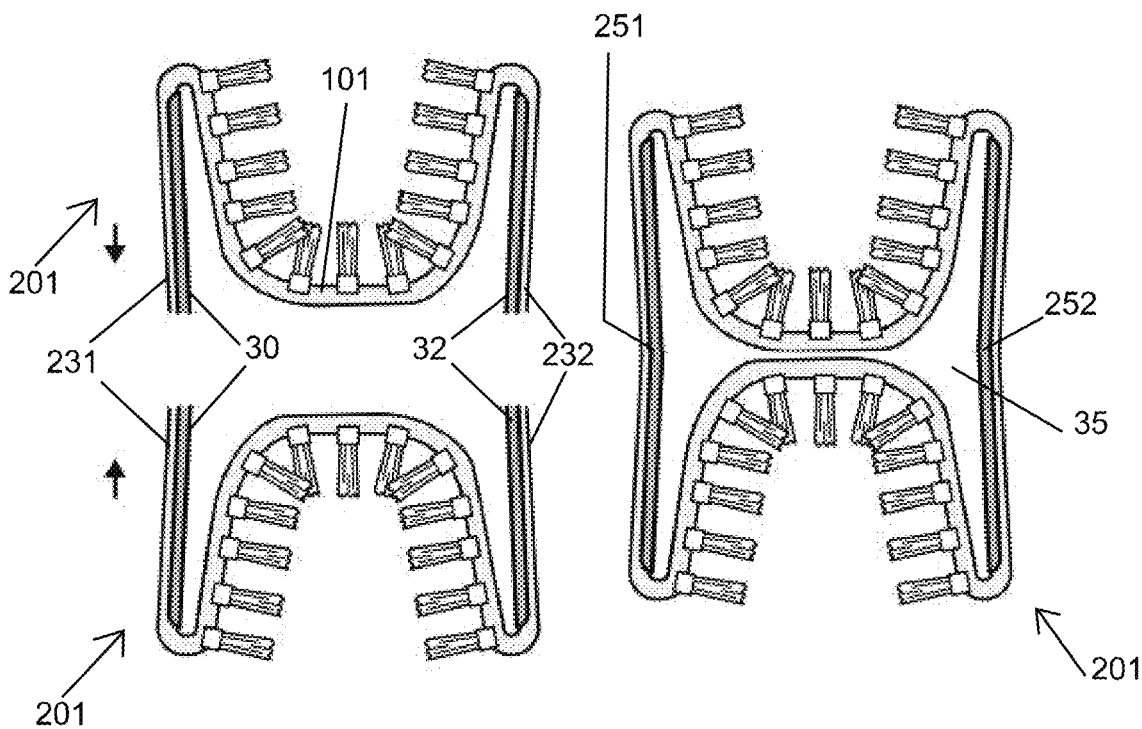
FIG. 17 showing in cross-sectional view a further example of an embodiment according to the invention of Chapter 1 in final condition, FIG. 17a showing two single sheet part assemblies, and FIG. 17b showing how these two single sheet part assemblies may be attached to each other.

The embodiment of FIG. 17 schematically shows another example of a bristled sheet part assembly 201 processed, with the method according to the invention of Chapter 1, to a mouthpiece with recess wall according to the invention of Chapter 1. The embodiment of FIG. 17 is basically the same as the embodiment of FIG. 16 so that the elucidation in relation to FIG. 16 (as well as in relation to FIGS. 13-15) applies mutatis mutandis to FIG. 16 as well. It I further noted that the embodiment of FIG. 17 may also use the double side flaps of FIG. 15, and/or may also have injection moulded bristles 24 such as in FIGS. 14 and 16. The difference of the FIG. 17 embodiment with respect to the embodiment of FIG. 16 is in the lingual frame member 30 and facial frame member 32. These frame members are not provided with a snap connection allowing two sheet part assemblies 201 to be connected together, but this connection is established in different manner. In the embodiment of FIG. 17, this connection is established by adhering, such as by an adhesive (or glue), and/or by thermal welding together the free ends of the lingual and facial frame members 30, 32 and/or the free ends of the flaps 231, 232 and/or the respective frame members with respective flaps to obtain a joint at 251 and 252.

Figures 18A, 18B:
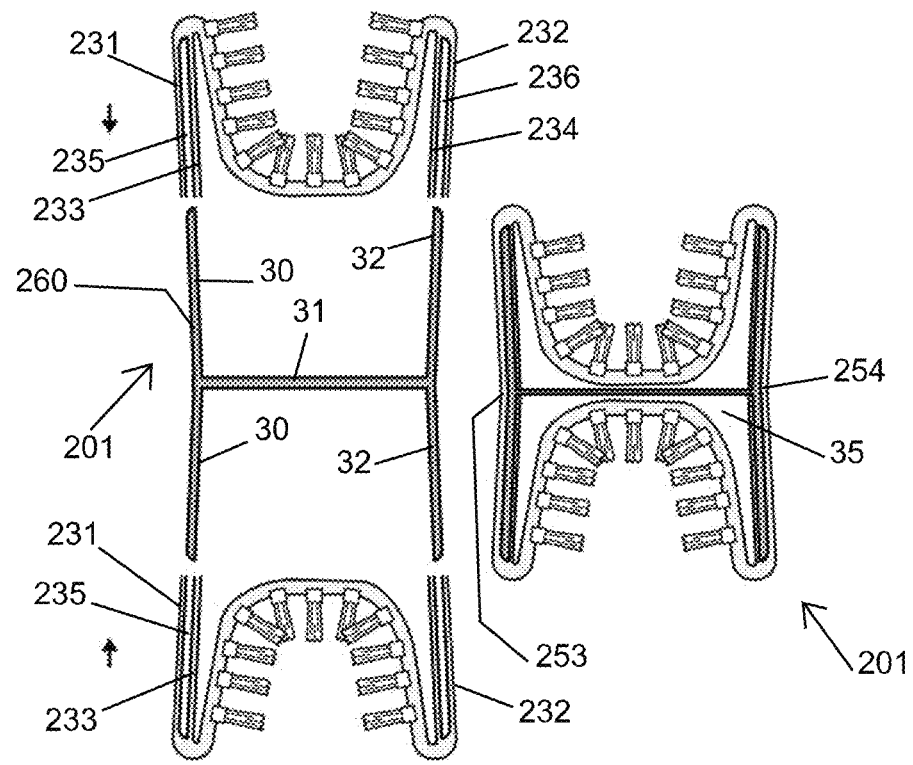
FIG. 18 showing in cross-sectional view a further example of an embodiment according to the invention of Chapter 1 in final condition, FIG. 18a showing two single sheet part assemblies, and FIG. 18b showing how these two single sheet part assemblies may be attached to each other.

The embodiment of FIG. 18 schematically shows another example of a bristled sheet part assembly 201 processed, with the method according to the invention of Chapter 1, to a mouthpiece with recess wall according to the invention of Chapter 1. The embodiment of FIG. 18 is basically the same as the embodiment of FIGS. 16 and 17 so that the elucidation in relation to FIGS. 16 and 17 (as well as in relation to FIGS. 13-15) applies mutatis mutandis to FIG. 16 as well. It I further noted that the embodiment of FIG. 18 may also use the single side flaps of FIGS. 13, 14 and 16, and/or may also have injection moulded bristles 24 such as in FIGS. 14 and 16. The difference of the FIG. 18 embodiment with respect to the embodiment of FIGS. 16 and 17 is in the lingual frame member 30 and facial frame member 32. These frame members are not provided with a snap connection allowing two sheet part assemblies 201 to be connected together and do not require an adhesive or thermal welding together. In the embodiment of FIG. 18, this connection is established an H-shaped frame member 260 comprising a lingual frame plate 30 and facial frame plate 32 interconnected by a spacer member 31. The spacer member 31 may be a plate which is closed or provided with passages providing a fluid connection between the upper half and lower half. Alternatively the spacer member 31 may be formed by a plurality of rods or wires or be fully absent. In case the spacer member 31 is fully absent, only one lingual frame member 30 common for both the bristled sheet parts 201 is left and only one facial frame member 32 common for both bristled sheet parts 201.

Figures 19A, 19B:
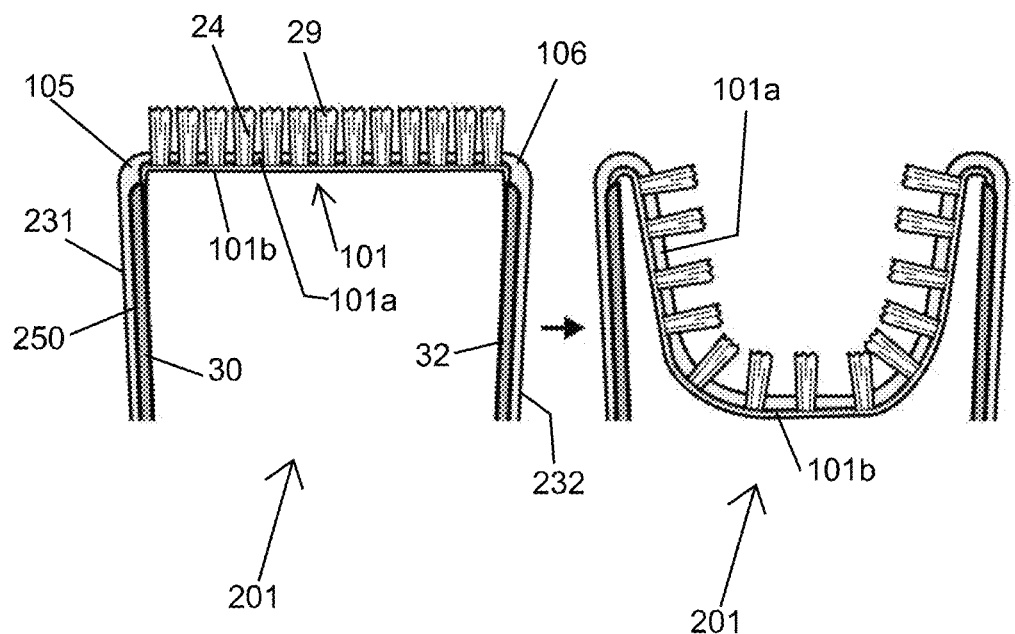
FIG. 19 showing in cross-sectional view a further example of an embodiment according to the invention of Chapter 1, FIG. 19a showing an initial condition, FIG. 19b showing a final condition.

The embodiment of FIG. 19 schematically shows an further example of a bristled sheet part assembly 201 processed to a recess wall with the method according to the invention of Chapter 1. FIG. 19a shows the sheet part in the initial position and FIG. 19b shows the sheet part in the final condition. FIGS. 19a and 19b are identical to FIGS. 13b and 13c, except that the bristles sheet part 101 of FIGS. 19a and 19b comprises two layers, a first layer 101a and a second layer 101b. The bristled layer 101 of FIG. 19 comprises tufts 29 with nylon bristles. The first layer 101a is provided with a passage for each tuft so that the roots of the bristles reach (or project a little from) the backside of the first layer 101a, which backside is in FIGS. 19a and 19b the lower side. After the tufts of bristles have been inserted into the passages, the second layer 101b is provided. This second layer fixes the bristles. Injection moulding the second layer, causes the root ends of the bristles fusing with the second layer which results in a reliable and firm bond. As will be clear, the bristled layer 201 of FIG. 19b may also be provided in the flat condition as shown in FIG. 13a. Further, it will be clear that the elucidation in relation to FIGS. 13a, 13b and 13c applies mutatis mutandis to FIG. 19.

Figures 20A, 20B:
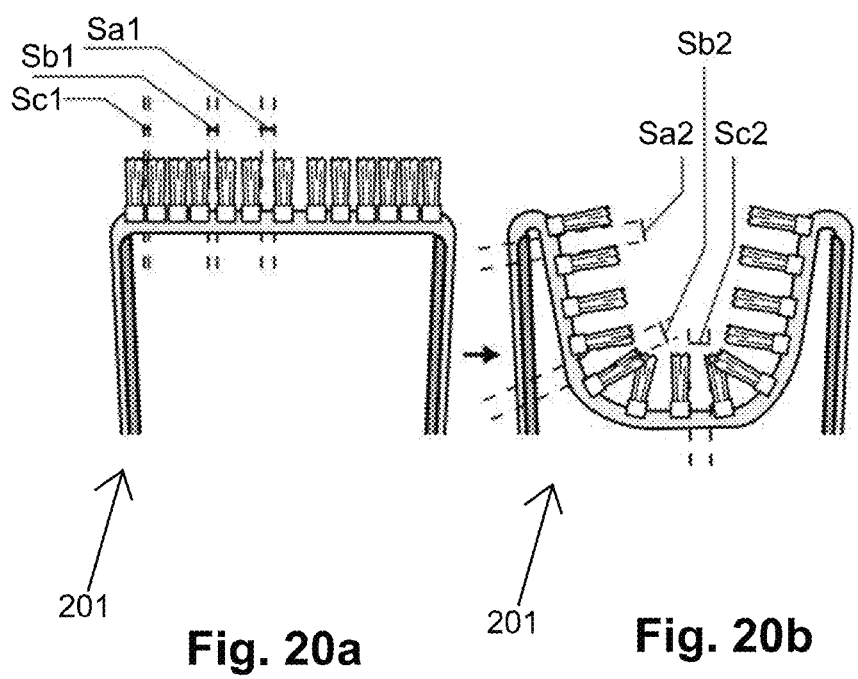
FIG. 20 showing in cross-sectional view a further example of an embodiment according to the invention of Chapter 1, FIG. 20a showing an initial condition, FIG. 20b showing a final condition.

The embodiment of FIG. 20 schematically shows an further example of a bristled sheet part assembly 201 processed to a recess wall with the method according to the invention of Chapter 1. FIG. 20a shows the sheet part in the initial position and FIG. 20b shows the sheet part in the final condition. FIGS. 20a and 20b are identical to FIGS. 13b and 13c, except that in FIG. 20a the tufts are irregularly spaced whilst in FIG. 20b they are regularly spaced. As is indicated in FIG. 20a, there is an interspace Sc1 between the first and second tuft from the left, there is an interspace Sb1 between the fourth and fifth tuft from the left, and there is an interspace Sa1 between the sixth and seventh tuft from the left. As shown in FIG. 20a, Sa1 may be larger than Sb1 and Sb1 may be larger than Sc1. The relation between the interspaces Sa1, Sb1 and Sc1 may however also be different, for example Sb1 may be equal to Sc1 and larger than Sa1. As shown in FIG. 20b, the interspaces Sa1, Sb1 and Sc1 have been increased to Sa2, Sb2 and Sc2, respectively. This increase may be due to stretching of the sheet part 101 during the transformation step. As shown in FIG. 20b, Sa2 may be equal to Sb2 and Sc2. Sa1, Sb1 and Sc1 may have been chosen—taking into account the stretching of the sheet part during the transformation step—such that after the transforming step Sa2 is equal to Sb2 and Sc2.

The next following clauses 1-39 give examples of the above described inventions of Chapter 1 and further aspects and embodiments of these inventions of Chapter 1:

1] Method of manufacturing a continuous recess wall lined with bristles for a mouthpiece for simultaneously brushing at a plurality of dental positions, the continuous recess wall having an arch-shaped length axis and, viewed transverse to the length axis, a U-shaped cross-section configured for encompassing said plurality of dental positions, and the arch-shaped length axis having a length which spans a distance at least equal to the distance from the left second pre-molar to the right second premolar;

wherein the method comprises a providing step, in which an elongate, continuous, bristled sheet part having a first side lined with a plurality of bristles is provided, the elongate, bristled sheet part defining a length axis extending parallel to the bristled sheet part and, viewed transverse to the length axis, a cross-sectional shape, and wherein the elongate, continuous, bristled sheet part obtained in the providing step has an initial condition in which:
the cross-sectional shape has an initial shape, and
the length axis is arch-shaped;
wherein the method further comprises a transforming step, in which the elongate, continuous, bristled sheet part obtained in the providing step is transformed to a said continuous recess wall having a final condition;
wherein in the final condition:
the cross-sectional shape has a final U-shape,
the length axis is arch shaped, and
the first side is a concave inner side of the final U-shape; and
wherein the first side is in the final condition more concave than in the initial condition.

2] Method according to clause 1,
wherein, in the final condition, the bristles from opposing sides of the U-shaped cross section extend towards to each other.

3] Method according to one of the clauses 1-2,
wherein the final U-shape is defined by two legs and a bottom connecting these legs, wherein a vertical axis is defined as extending transverse to the bottom between the legs.

4] Method according to clause 3,
wherein, in the final condition, the bristles on the one leg and the bristles on the other leg extend from the respective leg towards each other.

5] Method according to clause 3 or 4,
wherein, in the final condition, the bristles on the legs are provided at an angle with respect to the vertical axis, the angle being in the range of 0° to 90°, such as in the range of 30° to 90°, with respect to the vertical axis.

6] Method according to one of the clauses 1-5,
wherein, in the initial condition, the first side of the bristled sheet part is concave, flat or convex.

7] Method according to one of the clauses 1-6,
wherein two legs and a bottom connecting these legs are defined by the final U-shape, a vertical axis is defined as extending transverse to the bottom, and the legs define, at each root of a said bristle on that leg, a tangent to the first side of the bristled sheet part, which tangent extends in a plane transverse to the length axis;
wherein, in the initial condition, the bristles extend parallel to the vertical axis;
wherein, in the transforming step, the legs are bended towards each other rotating each respective tangent through an angle of x° with respect to the vertical axis such that the bristle associated to the respective tangent extends at an angle of x° with respect to the vertical axis in a direction pointing away from the bottom.

8] Method according to clause 7,
wherein said x° is in the range of 0°-90°, such as in the range of 30°-60° or in the range of 40°-50°.

9] Method according to clause 7 or 8,
wherein the final angle of the legs with respect to the vertical axis is in the range of 0°-45°, such as in the range of 5°-20°.

10] Method according to one of the clauses 1-9,
wherein the elongate, continuous, bristled sheet part having an arch shaped length axis and a first side lined with bristles is made in the providing step.

11] Method according to one of the clauses 1-10,
wherein the bristles have a root end, a free end and a bristle body extending from the root end to the free end;
wherein the bristled sheet part obtained in the providing step is produced by tufting, the tufting comprising
inserting a plurality of nylon bristles or tufts of nylon bristles through a first sheet part to extend with the bristle body and free end from a front side of the first sheet part, and to project with a root end at a back side of the first sheet part;
optionally providing a second sheet part against the backside of the first sheet part; and
fusing the root ends of the bristles with the first sheet part and/or the optional second sheet part.

12] Method according to one of the clauses 1-11,
wherein the bristled sheet part is, in the transforming step, transformed from the initial condition to the final condition by thermoforming, such as vacuum forming.

13] Method according to clause 12,
wherein, viewed in a direction along the contour of the U-shape, the bristled sheet part is stretched by the thermoforming.

14] Method according to clause 13,
wherein, in the final condition and viewed in the direction along the contour of the U-shape, the bristles are distributed according to a predetermined pattern.

15] Method according to clause 13 or 14,
wherein, in the initial condition, the distribution of the bristles on the bristled sheet part is configured such that, in the final condition and viewed in the direction along the contour of the U-shape, the bristles are distributed according to a predetermined pattern.

16] Method according to one of the clauses 1-15,
wherein the length axis has an initial curvature in the initial condition and a final curvature in the final condition, the initial curvature being wider than the final curvature.

17] Method according to one of the clauses 1-15,
wherein the length axis has a curvature which is in the initial condition the same as in the final condition.

18] Method according to one of the clauses 1-17,
wherein the bristled sheet part has two boundary edges extending along the length axis at, viewed in a direction transverse to the length axis, a mutual distance from each other; and
wherein, in the transforming step, the bristled sheet part is transformed by reducing the mutual distance between the two boundary edges.

19] Method according to one of the clauses 1-18,
wherein the bristled sheet part, obtained in the providing step:
is delimited by an inner boundary edge and an outer boundary edge, extending along the length axis at a distance from the length axis,
is an integral part with a lingual frame member and facial frame member both being bow-shaped along a respective bow curvature, and
comprises, at the inner boundary edge, an inner attachment member extending along the inner boundary edge and attached to the lingual frame member, and, at the outer boundary edge, an outer attachment member extending along the outer boundary edge and attached to the facial frame member.

20] Method according to clause 19,
wherein the providing step comprises the sub-steps:
providing the facial frame member and the lingual frame member, providing, separate from the facial and lingual frame member, the bristled sheet part integral with the inner and outer attachment member, and attaching the inner attachment member and outer attachment member to the lingual frame member respectively facial frame member.

21] Method according to clause 19,
wherein, in the providing step, the bristled sheet part, the facial frame member and the lingual frame member are provided as a prefabricated integral part.

22] Method according to one of the clauses 19-21,
wherein the bristled sheet part, the facial frame member and the lingual frame member are made, in the providing step, by injection moulding, such as multi-material injection moulding.

23] Method according to one of the clause 19-22,
wherein the inner and outer attachment member are configured as a side flap extending along the inner boundary edge respectively the outer boundary edge and to be attached to the lingual respectively facial frame member.

24] Method according to one of the clauses 19-23,
wherein the inner and outer attachment member are configured as a double side flap extending along the inner boundary edge respectively the outer boundary edge,
wherein the lingual and facial frame part are configured with a plate part,
wherein the double side flap comprises a first flap part and a second flap part parallel to the first flap part and at a distance from the first flap part to define, between the first and second flap part, a gap configured to receive the plate part of the lingual respectively facial frame part.

25] Method according to one of the clauses 19-24,
wherein, in the providing step, two bristled sheet parts are obtained, each bristled sheet part:
being delimited by a said inner boundary edge and a said outer boundary edge, extending along the length axis at a distance from the length axis,
being an integral part with a said lingual frame member and facial frame member both being bow-shaped along a respective bow curvature, and
comprising, on the inner boundary edge, an said inner attachment member extending along the inner boundary edge and attached to the lingual frame member, and, on the outer boundary edge, a said outer attachment member extending along the outer boundary edge and attached to the facial frame member,
wherein the facial frame member associated to a first of said two bristled sheet parts is provided with a male or female part of a first snap connection and the facial frame member associated to a second of said two bristled sheet parts is provided with the female respectively male part of said first snap connection, and
wherein the lingual frame member associated to the first of said two bristled sheet parts is provided with a male or female part of a second snap connection and the facial frame member associated to the second of said two bristled sheet parts is provided with a female respectively male part of said second snap connection.

26] Method according to one of the clauses 19-25,
wherein the bow curvatures of the lingual and facial frame members, as obtained with the bristled sheet part in the providing step, are wider than the final curvature; and wherein, in the transforming step, the bow curvatures are narrowed to correspondence with the final curvature.

27] Method according to one of the clauses 19-26,
wherein the lingual and facial frame members are resilient and have a relieved condition in which the frame members are stress-less and have a bow curvature corresponding to the final curvature of the recess wall;
wherein a pre-biasing step takes place before or during the providing step;
wherein, in the pre-biasing step, the frame members are pre-tensioned from the relieved condition to a pre-tensioned condition in which the bow curvatures of the frame members correspond to the initial curvature of the bristled sheet part and in which the frame members have a pre-tension acting in a direction to return the frame members to their relieved condition; and
wherein, in the transforming step, the bow curvatures are narrowed by releasing the pre-tension of the frame members.

28] Method according to one of the clauses 19-27,
wherein, in the providing step, two said bristled sheet parts are obtained and wherein the attachment members of the first and second sheet part are attached to each other, such as by thermally welding.

29] Method according to one of the clauses 1-28,
wherein, in the providing step, two said bristled sheet parts are obtained as a single part having a transition area connecting a first of the two bristled sheet part integrally with a second of the two bristled sheet part;
wherein the transition area is configured to allow the two bristled sheet parts to be folded with respect to each other from a first position in which the two bristled sheet parts are aligned to a second position in which the two sheet bristled parts are folded over each other.

30] Method according to clause 29,
wherein, in a folding step, the bristled sheet parts are folded with respect to each other from the first to the second position.

31] Method according to one of the clauses 1-30,
wherein the length of the length axis spans a distance at least equal to the distance from the left first molar to the right first molar, such as a length spanning a distance at least equal to the distance from the left second molar to the right second molar.

32] Method according to one of the clauses 1-31,
wherein
the final U-shape has an internal width in the range of 0 to 20 mm, such as in the range of 2 to 12 mm;
and/or
the final U-shape has an internal height in the range of 3 to 20 mm, such as in the range of 5 to 10 mm.

33] Method according to one of the clauses 1-32,
wherein the bristled sheet part has a thickness of up to 15 mm, such as a thickness in the range of 0.5 to 3 mm.

34] Method of manufacturing a mouthpiece of the type comprising a body provided with at least one recess delimited by a recess wall lined with a plurality of bristles extending from the recess wall into the recess, the recess wall defining an arch-shaped length axis and, viewed transverse to the length axis, a U-shaped cross-sectional shape and being configured for encompassing a plurality of dental positions along a dental arch; and
wherein the recess wall is manufactured according to one of the clauses 1-33.

35] Method according to clause 34, wherein the body further comprises at least one pressure chamber configured for containing a fluid under pressure and wherein the body is configured to deform the recess wall by reciprocatingly increasing and decreasing a pressure in the at least one pressure chamber.

36] Mouthpiece obtained with the method according to clause 34 or 35.

37] Recess wall for a mouthpiece for simultaneously brushing at a plurality of dental positions, wherein the recess wall is obtained by a method according to one of the clauses 1-33.

38] Mouthpiece for simultaneously brushing at a plurality of dental positions, wherein the mouthpiece is of the type comprising a body provided with at least one recess delimited by a recess wall lined with a plurality of bristles extending from the recess wall into the recess, the recess wall defining an arch-shaped length axis and, viewed transverse to the length axis, a U-shaped cross-sectional shape and being configured for encompassing a plurality of dental positions along a dental arch, wherein the recess wall is manufactured according to one of the clauses 1-33.

39] Mouthpiece according to clause 38, wherein the body further comprises at least one pressure chamber configured for containing a fluid under pressure and wherein the body is configured to deform the recess wall by reciprocatingly increasing and decreasing a pressure in the at least one pressure chamber.

As follows from the above, the term 'pressure chamber' as used throughout this Chapter 1 is a chamber in which the pressure is changed between a decreased pressure condition and an increased pressure condition. The decreased pressure condition and increased pressure condition may both be a pressure below ambient pressure, i.e. a vacuum defined as a pressure between 0 and 1 bar. Alternatively, the decreased pressure condition and increased pressure condition may both be a pressure above ambient pressure, or one of these pressure conditions may be about ambient pressure whilst the other is below or above ambient pressure.

Where in this Chapter 1 the terminology 'pressure in the pressure chamber' or similar terminology is used, it is the 'pressure of the fluid in the pressure chamber'. It is the pressure of the fluid which acts on the recess wall to cause local deformation. The pressure of the fluid may for example be increased by supplying additional fluid into the pressure chamber or decreased by allowing fluid to leave the pressure chamber.

Where in this Chapter 1 'thermal welding' is used, this may be a thermal welding technique:
  where heat is generated by mechanical movement, for example vibration welding and ultrasonic welding,
  a technique using an external heat source, for example hot plate welding, hot bar welding, and hot gas welding
  a technique using electric and/or magnetic fields, for example laser welding, infrared welding, induction welding, and dielectric welding;
  where a weld occurs during the moulding of a plastic or thermoplastic material, for example welds occurring in injection moulding or during compression moulding.

Where in this Chapter 1 the term multi material injection moulding is used, this may be any injection moulding technique in which an item is made from two or more injection moulded materials which form an integral part due to fusing together at an interface. These materials may be injected into the mould simultaneously or sequentially. Additionally or alternatively, a sub-item may have been pre-fabricated by injection moulding a first material in a first mould cavity and later added as an insert in a second mould cavity into which a second material is injected and become integral with the sub-item, wherein the first and second mould cavity may be arranged in one mould or in different moulds. Many of these injection moulding techniques are known to the skilled man and frequently are indicated under a variety of names for same or very similar multi material injection moulding techniques, for example multi shot component injection moulding (with two or more components), multi-component injection moulding, co-injection moulding, and over-moulding. It is noted that the frequently used term 'component' in these names, means the same as 'material'.

Where in this Chapter 1 the terminology 'bristled sheet part' is used, this means a sheet part having a first side lined with a plurality of bristles.

Where in this Chapter 1 the terms 'wide', 'narrow', 'widening' and 'narrowing' are used in relation to a curvature, wide means a wide bend analogous to a wide turn when driving a car and narrow means a narrow bend analogous to a narrow or tight turn when driving a car. Further narrowing means going from wide to narrow whilst widening means going from narrow to wide.

Taking into account the shape of the various dental positions/natural teeth, the shape of the U-shaped cross section may vary along the length direction of the recess/recess wall. In the region of the upper and or lower incisors, the U-shaped cross section may for example be V-shaped.

Chapter 2

FIG. 21 shows in perspective view, highly schematically a part of an upper or maxillary dental arch (jaw) 301 with dental positions 302-314. Each dental position is indicated with a vertical dashed line. Each dental position usually comprises a tooth which is named according to a nomenclature known to each dentist. Using this nomenclature:
  dental position 302 is the position of the left 'second molar', present in FIG. 21;
  dental position 303 is the position of the left 'first molar', missing in FIG. 21;
  dental position 304 is the position of the left 'second premolar', present in FIG. 21;
  dental position 305 is the position of the left 'first premolar', present in FIG. 21;
  dental position 306 is the position of the left 'canine', present in FIG. 21;
  dental position 307 is the position of the left 'lateral incisor', missing in FIG. 21;
  dental position 308 is the position of the left 'central incisor', present in FIG. 21;
  dental position 309 is the position of the right 'central incisor', present in FIG. 21;
  dental position 310 is the position of the right 'lateral incisor', present in FIG. 21;
  dental position 311 is the position of the right 'canine', present in FIG. 21;
  dental position 312 is the position of the right 'first premolar', present in FIG. 21;
  dental position 313 is the position of the right 'second premolar', present in FIG. 21;
  dental position 314 is the position of the right 'first molar', present in FIG. 21.

In FIG. 21 the dental position of the right 'second molar' is not shown, and also the dental positions of the right and left 'third molar', also called wisdom tooth, are not shown. Similar the lower (mandibular) dental arch (jaw) has a similar number of dental positions, which are in accordance with said nomenclature similarly named.

FIG. 21 further shows a system of three mutually orthogonal axes, comprising an x-axis X, an y-axis Y and a z-axis Z. The z-axis Z is a curved axis following the contour of the dental arch 301. The x-axis X and y-axis Y are perpendicular to each other and define an xy-plane which is essentially flat and perpendicular to the dental arch 301, i.e. each xy-plane intersecting a location on the z-axis is, at that location, perpendicular to the curved z-axis Z. The z-axis Z defines a curved length direction. The z-axis Z and y-axis Y define a curved zy-plane, with viewed along the z-axis, an arc-shape similar to shape of the dental arch. Further, the z-axis Z and x-axis X define a zx-plane.

FIG. 22 shows schematically a perspective view of an example of a mouthpiece 320 or a dental cleaning device according to the first and/or second aspect of the invention of Chapter 2. FIGS. 23a and 23b show a cross section of the mouthpiece of FIG. 22, viewed as indicated by arrows XXIII in FIG. 22. In the cross section of FIG. 23a, the pressure chamber is in a relatively decreased pressure condition, while the pressure chamber is in a relatively increased pressure condition in FIG. 23b.

The mouthpiece 320 comprises a first recess 322. This first recess 322 has, viewed along the z-axis of FIG. 21, a curved length direction and, viewed in the xy-plane of FIG. 21, a U-shaped cross section. The first recess 322 is delimited by a flexible and/or deformable recess wall 323, which is in the xy-plane U-shaped. The recess wall 323 is lined with a plurality of bristles 324, each having one end, called the root 319, attached to the flexible recess wall 323 and extending from the recess wall 323 into the first recess 322.

The recess 322 here has an elongate, curved shape and is configured to encompass substantially the entire dental arch of a user. For the dental cleaning device according to the first aspect of the invention of Chapter 2, the recess 322 may be much shorter, e.g. spanning only a single dental position, or at least 5 dental positions, such as in the range from the first molar on the left side of the jaw up to the first molar on the right side of the jaw.

Reference 326 indicates a nipple configured for connecting the mouthpiece to a pumping and/or suctioning device, as will be explained in more detail with reference to FIG. 24 in the below. The mouthpiece 320 further has a right half 327 and a left half 328, which halves come so to say together at nipple 326.

Reference 325 indicates a curved dividing line, which defines a mirror plane parallel to the xz-plane as defined in FIG. 21. The mouthpiece as shown in FIG. 22 is so to say mirror symmetrical with respect to this mirror plane, meaning that there is a second recess (not visible in FIG. 22 but visible in FIGS. 23a and 23b) opposite the first recess 322, which second recess is lined with bristles as well. It is noted that the first recess may have a shape different than the shape of the second recess because the (teeth of the) upper and lower arch of dental positions generally have different shapes.

The recesses 322 are configured to encompass substantially an entire dental arch from the dental position of e.g. the right third or second molar to the dental position of the left third respectively second molar. For the first aspect of the invention of Chapter 2, the recesses 322 may also be configured to encompass a part of an arch of dental positions, this part comprising e.g. only a single dental position.

FIGS. 23a and 23b show a cross-section according to arrows XXIII in FIG. 22 of a right part of the mouth piece 320, wherein the pressure in the pressure chamber is increased in FIG. 23b (with respect to the situation of FIG. 23a) and wherein the pressure in the pressure chamber is decreased in the situation of FIG. 23a (with respect to the situation of FIG. 23b).

As can best be seen in FIGS. 23a and 23b, the bristles may be provided as tufts 329 of relatively thin bristles 324. Each tuft 329 may have a base 336 which carries the bristles 324 at their roots 319 and is attached to the flexible recess wall 323.

As can be seen in FIGS. 23a and 23b, the mouthpiece 320 has in its upper side a first recess 322 and in its lower side a second recess 322, the upper and lower recesses 322 facing in mutual opposite directions with respect to each other. Both recesses 322 are delimited by a flexible recess wall 323. In cross-section parallel to the xy-plane as defined in FIG. 21, the recess walls 323 are U-shaped and have a recess wall bottom 334 and two recess wall legs 333 extending from the recess bottom wall. The recess wall 323 is covered with tufts 329 of bristles on the legs 333 and/or bottom 334 of the recess wall.

Inside the mouthpiece there is provided a pressure chamber 335, which may, via the nipple 326 (FIG. 22), be filled with a fluid. The fluid may be a gas, like air, or a liquid, like water. In the embodiment as shown in FIG. 22, the mouthpiece has one pressure chamber. It is however noted that the mouthpiece may comprise a plurality of pressure chambers, like 5 pressure chambers, or any other number of pressure chambers. The not pre-published PCT/NL2018/050276 shows examples of other numbers of pressure chambers in FIGS. 4, 5, 7, 9 and 10. In case of multiple pressure chambers, all the pressure chambers or groups of pressure chambers may according to the invention of Chapter 2 be in fluid communication with each other, similar as is described in the not pre-published PCT/NL2018/050276.

As can be seen in FIGS. 23a and 23b, the mouthpiece may comprise an internal support structure of a material which is rigid relative to the material of the flexible recess wall 323. This support structure may comprise a lingual plate 330 and a facial plate 332, both extending along the curved zy-plane defined in FIG. 21 and consequently, viewed along the z-axis, having a U-shape. In order to keep the lingual plate 330 and facial plate 332 at a distance from each other, the support structure may comprise one or more spacers 331. These one or more spacers 331 may for example be a multiple of bars or wires or a single plate which may extend essentially parallel to the zx-plane as defined in FIG. 21. In case of a single plate as spacer, this plate may divide the pressure chamber 335 in two pressure chambers, an upper one and a lower one. These two pressure chambers may be in fluid communication with each other via one or more through holes through the plate. In case of large through holes and/or a large number of through holes the two pressure chambers may effectively be one single pressure chamber.

The mouthpiece as shown in FIG. 22 is configured for simultaneously brushing at a plurality of dental positions. In case a tooth is present, the tooth of the respective dental position will be brushed. The remnants at a dental position, like the gum, may be brushed in case a tooth may be missing and the teeth adjacent the location of the missing tooth may be additionally brushed by bristles intended for the location of the missing tooth.

The single pressure chamber 335 comprises a first flexible recess wall 323 delimiting the first recess 322 (the upper one in FIGS. 23a and 23b) and a second flexible recess wall 323 delimiting the second recess 322 (the lower one of FIGS. 23a and 23b). The first and second recess walls 323 are deformable, in particular by increasing or decreasing the pressure in the pressure chamber 323. The flexible recess walls 323 may be made from an elastic material, such as a rubberlike material. The flexible recess walls 323 may also be made from a non-elastic material. The material of the flexible recess walls 323 may keep a predetermined shape when there is substantially no, or a low, pressure difference across an inner side and an outer side of the flexible recess walls 323 (when the pressure in the pressure chamber substantially equals the ambient pressure.

The mouthpiece 400 is configured for the tufts 329 or bristles 324 to engage the tooth surface of teeth of a dental arch or, in case one or more dental positions the tooth might be missing, to engage the gum at the respective dental position(s) at least when the pressure in the pressure chamber 335 is increased. In case a tooth might be missing at a dental position, especially the tufts 329 of bristles at the free ends of the recess wall legs 333 will engage the gum at the empty dental position.

Viewed in length direction Z of the dental arch—as defined in FIG. 21—, the tufts 329 of bristles 324 may be arranged at about the same density as viewed in the cross-sections shown in FIGS. 23a and 23b.

With reference to FIGS. 23a and 23b, when the pressure in the pressure chamber 335 is increased to an increased pressure condition, for example by feeding a fluid to the pressure chamber 335, or increasing an amount of fluid in the pressure chamber 335, the recess walls 323 are so to say compacted to narrow the recess 322, whereby the bristles 324, in particular the free ends thereof, may engage tooth surfaces firmly and/or may be deformed against tooth surfaces; the situation of FIG. 23b (wherein a tooth is not shown). When the pressure in the pressure chamber 335 is decreased subsequently, the recess walls are so to say widened to enlarge the recess 322; the situation of FIG. 23a (wherein, again, a tooth is not shown). This narrowing and widening of the recess walls may be small, but when alternatingly repeated with some frequency of for example 0.5-20 Hz, this alternatingly deforming of the recess wall by alternatingly narrowing and widening it, causes the bristles to move between a firmer and relatively less firm engagement with tooth surfaces and/or the bristles to alternate between a first and second deformed condition, which in turn causes a sweeping and/or rubbing of bristles along the tooth surfaces.

By a suitable cycle of increasing and decreasing pressure in the pressure chamber 335 an effective brushing action of the mouthpiece can be obtained. The bristles 324 attached to the recess wall bottom 334 generally perform an upward and downward motion during such cycling, and the bristles 324 at the recess wall legs 333 generally perform a sideways motion to and fro teeth of the user during such cycling in the direction of the x-axis as defined in FIG. 21.

Figure 23:
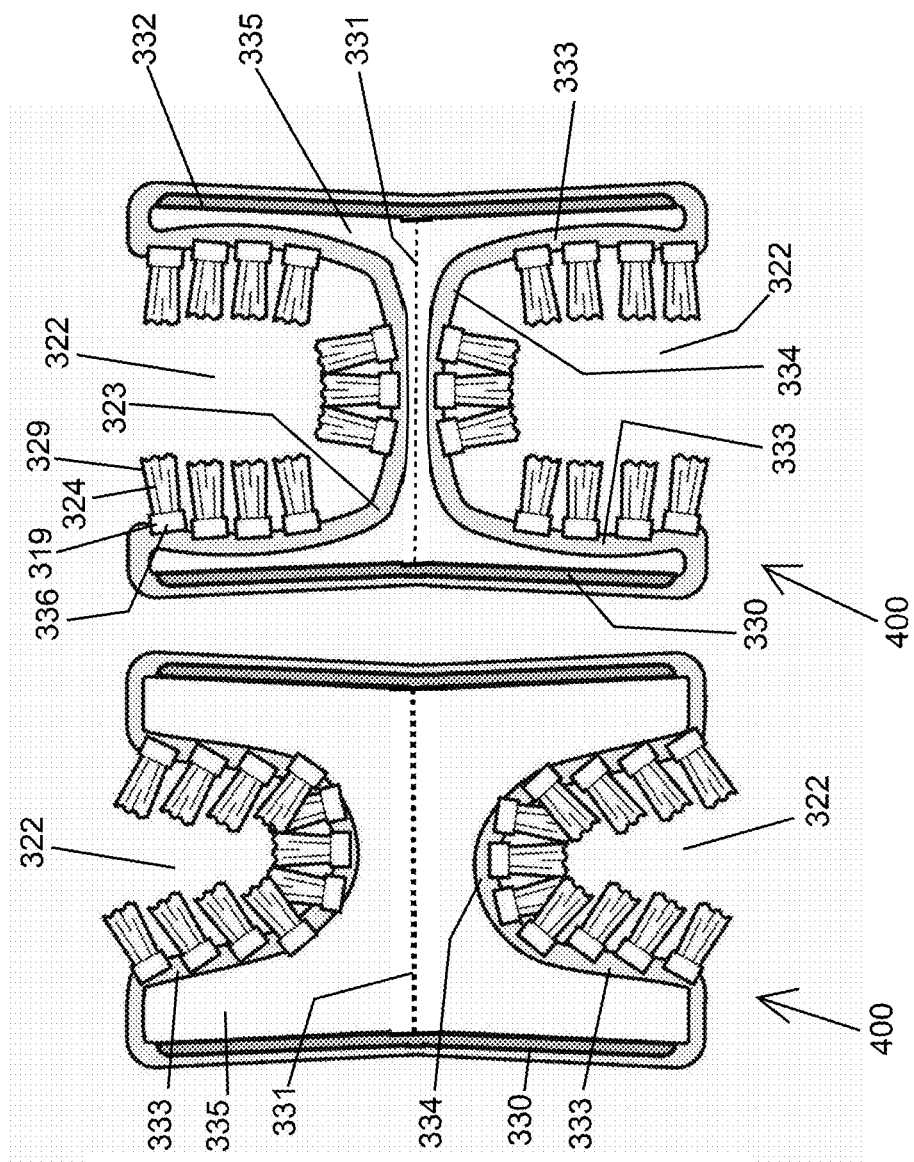

Just by way of example to give some indication of dimensions and referring to FIG. 21, for an adult human the width of a teeth element in the X direction varies, depending on the dental position between about 2 to 12 mm. Taking into account that it is desired to keep the mouthpiece as small as possible, the internal width of the U-shape of the recess wall in the X direction is to be kept as small as possible and may be about 0 to 4 mm wider than the width of the respective tooth. By way of example to give some indication of dimensions, the internal width of the U-shape of the recess wall may, viewed in the X-direction of FIG. 21, be in the range of 0 to 20 mm, such as in the range of 2-12 mm. The bristles may be up to 6 mm long. In case for example the bristles are 3 to 4 mm long, this means that between the bristles extending from opposing recess wall legs 333 no interspace or a limited amount of interspace of about 2-4 mm is left. In FIG. 23, these interspaces are shown exaggerated. Further by way of example to give some indication of dimensions, the U-shape of the recess wall may have, viewed in the Y-direction of FIG. 21, an internal height in the range of 3 to 20 mm, such as in the range of 5 to 10 mm. These internal width and internal height measures are indicative for an adult human. For a child or for animals these measures might be different.

Increasing and decreasing the pressure in the pressure chamber 335 is effected by a pump unit. Different pump unit and valve combinations are possible. One possible embodiment is explained now with reference to FIG. 24. FIG. 24 schematically depicts, in a partially cut-away perspective view, a dental cleaning device 500 comprising a handle member 502 and a mouthpiece 400 coupled thereto, e.g. a mouthpiece as described in the above. The handle member 502 is provided with a handle interface, and the mouthpiece 400 is provided with a mouthpiece interface configured to be detachably coupled to the handle interface. The handle member 500 comprises a battery 510 for storing electrical energy which can be fed to the battery 510 through a battery charging interface 512. The battery 510 provides energy to a printed circuit board, PCB, 514, to a main pump unit 504 comprising a motor 516, a transmission 518, a crank piston 520 and a piston pump 522, and to optionally a mouthwash pump 52 5. A mouthwash capsule 530 containing a mouthwash liquid may be removably accommodated in the handle member 500. The piston pump 522 may be a pneumatic pump. Instead of a piston pump also a diaphragm pump, a plunger pump, a membrane pump, or bellows pump may be used. The mouthwash pump 52 5 may be a hydraulic pump.

The dental cleaning device 400 further comprises a pressure sensor 540, here very schematically illustrated and positioned near duct 542. The pressure sensor 540 is configured to measure a pressure representative of the pressure in the pressure chamber and to produce a pressure signal representative of said pressure. Hence, from the pressure of the fluid at the entrance of the duct 542, the pressure sensor 540 is able to estimate or determine the pressure in the pressure chamber. The pressure sensor 540 is able to communicate with a controller 524, here integrated with PCB 514, such that the controller 524 can receive a pressure signal from the pressure sensor 540.

As already said, the dental cleaning device 400 further comprises a controller 524, here integrated with PCB 514. The controller 524 is configured to generate a control signal, in dependence on the pressure signal it receives from the pressure sensor 540. The controller 524 is able to communicate with pump unit 504, such that the pump unit 504 receives the control signal from the controller 524. In response to the control signal received from the controller 524, the pump unit 504 provides a delivery (in litres per minute) into and/or out of the pressure chamber, which delivery increases and decreases the pressure in the pressure chamber. When the control signal indicates that the pressure in the pressure chamber exceeds a pre-determined upper threshold value, the delivery of the pump unit 504 is reduced, to allow the pressure in the pressure chamber to decrease again, and fall below the threshold value.

The operation of the dental cleaning device 500 is thus controlled by the PCB 214, which includes a controller 524. The PCB 214 controls the operation of the pump unit 504, including motor 516. The PCB 514 controls the dental cleaning device 500 to alternatingly increasing and decreasing the pressure in at least one pressure chamber provided in the mouthpiece 504, by controlling the delivery of the fluid into and out of the pressure chamber by the pump unit 504.

This controlling of the pressure in the pressure chamber, by providing a delivery, is explained more graphically with reference to FIG. 25. Visible in FIG. 25 is a sinusoidal line that may represent the pressure in the pressure chamber fluctuating due to reciprocatingly being increased and decreased. Indicated by horizontal lines are the upper threshold TU and the lower threshold TL. The upper threshold TU may e.g. be at most 2 bar relative to the ambient pressure, such as at most 1 bar, at most 0.3 bar, or at most 0.2 bar above the ambient pressure. The lower threshold TU may e.g. be up to −1 bar relative to the upper threshold TU, such as up to −0.4 bar relative to the upper threshold TU. Relative to the ambient pressure, the lower threshold TL may be in the range of −0.5 bar up to +0.2 bar, e.g. up to 0 bar. When the pressure exceeds the upper threshold TU, according to the invention of Chapter 2, the delivery of the pump is reduced. When the pressure drops below the lower threshold TL, the delivery of the pump may be increased.

Starting on the left of FIG. 25, at timestamp $t_0$, fluid is being pumped in the pressure chamber, increasing the pressure therein. Approximately two normal pressurization cycles are shown, in which the pressure is in between the upper threshold TU and the lower threshold TL. The pump operates at a frequency f, which frequency f can be derived from the time between two consecutive pressure peaks (upon normal operation of the pump). The normal amount of delivery D1 represents the amount of fluid pumped into the pressure chamber between a lower pressure peak and an upper pressure peak (upon normal operation of the pump). Depending on e.g. the fit of the dental cleaning device with respect to a (portion of) a dental arch of a user and the bite pressure exerted by a user, the pressure remains in between the upper threshold TU and the lower threshold TL at all times. Indeed, this scenario is shown for the first two pressurization cycles. The exact pressure with respect to the upper TU and lower TL threshold may however vary per individual user, as is indicated by arrows B.

At timestamp $t_1$, the pressure in the pressure chamber suddenly increases rapidly. This may e.g. be caused by a movement of the dental cleaning device from a position near the incisor teeth (which are typically relatively narrow) towards a position near the molars (which are typically relatively broad). A broader tooth between the recess reduces the size of the pressure chamber, and increases the pressure therein. Alternatively, such a sudden increase in pressure may e.g. be caused due to the increase of the bite pressure of the user, and/or an increase in the force with which the dental cleaning device is pressed onto the teeth by the user.

A little while later, the dental cleaning device responds to this increase in pressure, by reducing the delivery D2 of the pump. In the present example, the reduction in delivery is sufficient to bring the pressure immediately below the upper threshold TU (within one pressurization cycle), but it is conceived that this takes more than one, e.g. two, three, or four pressurization cycles. It is further noted that the response of the pump unit here lags somewhat behind the occurrence of the increased pressure.

After reducing the delivery D2 once, achieving the desired effect of reducing the pressure below the upper threshold TU, normal operation is again continued, with the same delivery D1 as before timestamp $t_1$.

In the example of FIG. 25, at timestamp $t_2$, a sharp drop of the pressure in the pressure chamber is observed. This may e.g. occur when the dental cleaning device is moved from a position near the molars towards a position near the incisor teeth, and/or when the application pressure exerted by the user is reduced, and/or when the bite pressure applied by the user is reduced.

The dental cleaning device responds to this decrease in pressure by increasing the delivery D3 of the pump. In the present example, the increase in delivery is insufficient to immediately bring the pressure sufficiently above the lower threshold TL. Therefore, the increased delivery D3 is maintained, until the pressure in the pressure chamber is at a sufficient level again. In the present example, the response of the pump unit here lags somewhat behind the occurrence of the decreased pressure, responding only when the pressure has significantly dropped below the lower threshold TL. It is conceived that reaction is faster, responding already when a sharp drop in pressure is noticed, maybe even before the lower threshold is reached.

In the embodiment of FIG. 25, the pressure is increased until the lowest pressure experienced in the pressurization cycles is above the lower threshold TL. Possibly, the pressure is increased only to the level wherein the maximum pressure during the pressurization cycle is between the upper TU and lower TL threshold. In that case, only one increased delivery D3 might be needed.

It is noted that, as preferred, the operation frequency of the pump unit does not change when the delivery alters. The operation frequency of the pump unit remains at a predetermined frequency, which may be in the range of 0.5 to 20 Hz and which may be a fixed value or may vary as a function of time.

FIG. 26 highly schematically shows how, after increasing the pressure in the pressure chamber, the wall 533 and bristles of the dental cleaning device are moved in the direction of teeth of the user. The end portions of the bristles are deformed and rub against the teeth, which rubbing action cleans the teeth of tooth plaque.

The next following clauses 40-64 give examples of the above described inventions of Chapter 2 and further aspects and embodiments of these inventions of Chapter 2:

40] A dental cleaning device for simultaneously brushing at a plurality of dental positions, comprising:
- a mouthpiece having a pressure chamber and a recess which is U-shaped in cross section and delimited by a flexible and/or deformable recess wall, the pressure chamber being configured for containing a fluid under pressure,
- optionally, a plurality of bristles, each attached to the recess wall with one end thereof and extending from said recess wall into the recess;
- a pump unit arranged in fluid communication with said pressure chamber, the pump unit being configured to reciprocatingly increase and decrease a pressure in the pressure chamber between an increased pressure condition and a decreased pressure condition by pumping a volume of fluid into, respectively out of, the pressure chamber, thereby deforming the recess wall and moving the recess wall back and forth increasing respectively decreasing the recess, wherein the dental cleaning device further comprises:
- a pressure sensor configured to measure a pressure representative of the pressure in the pressure chamber and to produce a pressure signal representative of said pressure, and
- a controller configured to generate a control signal;

wherein the pressure sensor and the controller are connected such that the controller, in use, receives the pressure signal from the pressure sensor and the controller and pump unit are connected such that the pump unit, in use, receives the control signal from the controller;

wherein the controller is configured to generate the control signal in dependence on the pressure signal and the pump unit is configured to provide a delivery into and/or out of the pressure chamber in response to the control signal; and wherein the controller is configured to reduce the delivery of the pump unit when the pressure in the pressure chamber exceeds a predetermined upper threshold.

41] Dental cleaning device according to clause 40, wherein the pump unit has an operating frequency, and wherein the configuring of the controller, to reduce the delivery of the pump unit when the pressure in the pressure chamber exceeds a predetermined upper threshold, is such that a change of the operating frequency is prevented.

42] Dental cleaning device according to clause 40 or 41, wherein the pump unit has an operating frequency, and wherein:
the controller is configured to operate the pump unit in response to a pressure change at a predetermined operating frequency
or
the pump unit is configured to operate at a predetermined operating frequency.

43] Dental cleaning device according to one of clauses 40-42, wherein the pump unit has an operating frequency which varies according to a predetermined function of the time measured as from switching on the pump unit.

44] Dental cleaning device according to one of the clauses 40-42, wherein the pump unit has an operating frequency which is a fixed predetermined value.

45] Dental cleaning device according to one of the clauses 40-44, wherein said operating frequency is in the range of 0.5 to 20 Hz.

46] Dental cleaning device according to one of the clauses 40-45, wherein said upper threshold is at most 2 bar relative to ambient pressure, such as at most 1 bar relative to ambient pressure.

47] Dental cleaning device according to one of the clauses 40-46, wherein said upper threshold is at most 0.3 bar relative to ambient pressure, such as at most 0.2 bar relative to ambient pressure.

48] Dental cleaning device according to one of the clauses 40-47, wherein the controller is further configured to increase the delivery of the pump unit when the pressure in the pressure chamber falls below a predetermined lower threshold.

49] Dental cleaning device according to clause 48, wherein said lower threshold is in a range up to 1 bar, such as in a range up to 0.4 bar below the upper threshold.

50] Dental cleaning device according to clause 48 or 49, wherein said lower threshold is in the range of −0.5 to +0.2 bar relative to ambient pressure, such as in the range of −0.5 to 0 bar relative to ambient pressure.

51] A dental cleaning device for simultaneously brushing at a plurality of dental positions, comprising:
a mouthpiece having a pressure chamber and a recess delimited by a recess wall, the recess wall having a curved length direction and a U-shaped cross-section transverse to the length direction, the recess wall being configured for encompassing, viewed in the curved length direction, the dental positions in the range from at least the left second pre-molar to at least the right second premolar, and the pressure chamber being configured for containing a fluid under pressure;
optionally, a plurality of bristles, each having one end attached to the recess wall and extending away from the recess wall into the recess; and
a pump unit arranged in fluid communication with said pressure chamber, the pump unit being configured to reciprocatingly increase and decrease a pressure in the pressure chamber between an increased pressure condition and a decreased pressure condition by pumping a volume of fluid into, respectively out of, the pressure chamber, thereby deforming the recess wall and moving the recess wall back and forth, increasing respectively decreasing the recess, said pump unit, in operation, operating at a predetermined operating frequency;
wherein the predetermined operating frequency is in the range of 0.5 to 20 Hz.

52] Dental cleaning device according to clause 51, wherein the predetermined operating frequency is in the range of 1 to 15 Hz, such as in the range of 3 to 10 Hz.

53] Dental cleaning device according to clause 51 or 52, wherein the predetermined operating frequency is a fixed frequency.

54] Dental cleaning device according to clause 51 or 52, wherein the predetermined operating frequency varies according to a predetermined function of the time measured as from switching on the pump unit.

55] Dental cleaning device according to one of the clauses 40-54, wherein, in use, upon increasing the pressure in the pressure chamber, the bristles move towards the dental positions of the user whilst end portions of said bristles are deformed and rubbed against said teeth, which rubbing action of said end portions cleans said teeth.

56] Dental cleaning device according to one of the clauses 40-55, wherein the recess wall of the recess and/or at least some of the bristles is (are) made of a material that has a hardness of 20-100 Shore A, such as 50-80 Shore A.

57] Dental cleaning device according to one of the clauses 40-55, wherein the recess wall of the recess and/or at least some of the bristles is (are) made of a material that has a hardness of 50-100 Shore D, such as 70-90 Shore D.

58] Dental cleaning device according to one of the clauses 40-57, wherein the mouthpiece has two said recesses, which are each U-shaped in cross section and delimited by a said recess wall, the openings of the U-shaped cross sections of the two recesses facing in mutually opposite directions.

59] Dental cleaning device according to one of the clauses 40-58, wherein the recess or the two recesses has, respectively have an elongate, curved shape and is/are configured to encompass at least 5 dental positions of a user, such as the dental positions in the range from the left first molar up to the right first molar.

60] Dental cleaning device according to one of the clauses 40-59, wherein the pump unit comprises a pump chosen from the following group: a piston pump, a diaphragm pump, a plunger pump, a membrane pump, or a bellows pump.

61] Dental cleaning device according to one of the clauses 15-60, wherein the dental cleaning device further comprises:
- a pressure sensor configured to measure a pressure representative of the pressure in the pressure chamber and to produce a pressure signal representative of said pressure, and
- a controller configured to generate a control signal;

wherein the pressure sensor and the controller are connected such that the controller in use receives the pressure signal from the pressure sensor and the controller and pump unit are connected such that the pump unit in use receives the control signal from the controller;

wherein the controller is configured to generate the control signal in dependence on the pressure signal and the pump unit is configured to provide a delivery into and/or out of the pressure chamber in response to the control signal; and wherein the controller is configured to reduce the delivery of the pump unit when the pressure in the pressure chamber exceeds a predetermined upper threshold.

62] Dental cleaning device according to clause 58 in combination with one of the clauses 46-50.

63] Method of operating a dental cleaning device for simultaneously brushing at a plurality of dental positions, wherein the cleaning device comprises:
- a mouthpiece having a pressure chamber and a recess delimited by a recess wall, the recess wall having a curved length direction and a U-shaped cross-section transverse to the length direction, the recess wall being configured for encompassing, viewed in the curved length direction, at least a part of the dental arch of a user, and the pressure chamber being configured for containing a fluid under pressure;
- optionally, a plurality of bristles, each having one end attached to the recess wall and extending away from the recess wall into the recess; and
- a pump unit arranged in fluid communication with said pressure chamber, the pump unit being configured to reciprocatingly increase and decrease a pressure in the pressure chamber between an increased pressure condition and a decreased pressure condition by pumping a volume of fluid into, respectively out of, the pressure chamber, thereby deforming the recess wall and moving the recess wall back and forth, increasing respectively decreasing the recess, wherein
the delivery of the pump unit is reduced when the pressure in the pressure chamber exceeds a predetermined upper threshold;
and/or
the pump unit is operated at an operating frequency in the range of 0.5 to 20 Hz.

64] Method according to clause 63, wherein:
when the pressure in the pressure chamber exceeds a predetermined upper threshold the pump unit is operated such that a change of the operating frequency is prevented;
and/or
the pump unit is operated at a fixed operating frequency;
and/or
the pump unit is operated at an operating frequency in the range of 1 to 15 Hz, such as in the range of 3 to 10 Hz;
and/or
the upper threshold is at most 2 bar, such as at most 1 bar, relative to ambient pressure;
and/or
the upper threshold is at most 0.3 bar, such as at most 0.2 bar, relative to ambient pressure;
and/or
the delivery of the pump unit is increased when the pressure in the pressure chamber falls below a predetermined lower threshold, wherein:
the lower threshold is in a range up to 1 bar, such as in a range up to 0.4 bar, below the upper threshold;
and/or
the lower threshold is in the range of −0.5 to +0.2 bar, such as in the range of −0.5 to 0 bar, relative to ambient pressure;
and/or
the pump unit is operated at an operating frequency which varies according to a predetermined function of the time measured as from switching on the pump unit.

As follows from the above the term 'pressure chamber' as used throughout this Chapter 2 is a chamber in which the pressure is changed between a decreased pressure condition and an increased pressure condition. The decreased pressure condition and increased pressure condition may both be a pressure below ambient pressure, i.e. a vacuum defined as a pressure between 0 and 1 bar. Alternatively, the decreased pressure condition and increased pressure condition may both be a pressure above ambient pressure, or one of these pressure conditions may be about ambient pressure whilst the other is below or above ambient pressure.

Where in this Chapter 2 the terminology 'pressure in the pressure chamber' or similar terminology is used, it is the 'pressure of the fluid in the pressure chamber'. It is the pressure of the fluid which acts on the recess wall to cause the brushing action. The pressure of the fluid may for example be increased by supplying additional fluid into the pressure chamber or decreased by allowing fluid to leave the pressure chamber.

Taking into account the shape of the various dental positions/natural teeth, the shape of the U-shaped cross section may vary along the length direction of the recess/recess wall. In the region of the upper and or lower incisors, the U-shaped cross section may for example be V-shaped.

Chapter 3

FIG. 27 shows in perspective view, highly schematically a part of an upper dental arch 601 with dental positions 602-614. Each dental position is indicated with a vertical dashed line. Each dental position usually comprises a tooth which is named according to a nomenclature known to each dentist. Using this nomenclature:
dental position 602 is the position of the left 'second molar', present in FIG. 27;
dental position 603 is the position of the left 'first molar', missing in FIG. 27;
dental position 604 is the position of the left 'second premolar', present in FIG. 27;
dental position 605 is the position of the left 'first premolar', present in FIG. 27;
dental position 606 is the position of the left 'canine', present in FIG. 27;
dental position 607 is the position of the left 'lateral incisor', missing in FIG. 27;
dental position 608 is the position of the left 'central incisor', present in FIG. 27;

dental position 609 is the position of the right 'central incisor', present in FIG. 27;

dental position 610 is the position of the right 'lateral incisor', present in FIG. 27;

dental position 611 is the position of the right 'canine', present in FIG. 27;

dental position 612 is the position of the right 'first premolar', present in FIG. 27;

dental position 613 is the position of the right 'second premolar', present in FIG. 27;

dental position 614 is the position of the right 'first molar', present in FIG. 27;

In FIG. 27 the dental position of the right 'second molar' is not shown, and also the dental positions of the right and left 'third molar', also called wisdom tooth, are not shown. Similar the lower jaw has a similar number of dental positions, which are in accordance with said nomenclature similarly named.

Reference number 615 indicates the lingual side of the arch of dental position. The lingual side 615 is the inner side of the arch of dental positions, which inner side faces the tongue. Reference number 616 indicates the facial side of the arch of dental positions. The facial side 616 is the outer side of the arch of dental positions, which outer side faces the face, like the cheeks and lips.

The mouthpiece according to the invention of Chapter 3 is configured for simultaneously brushing at a plurality of dental positions. In case a tooth is present, the tooth of the respective dental position will be brushed. Due to the local deformability of the recess wall according to the invention of Chapter 3, the remnants at a dental position, like the gum, will be brushed in case a tooth may be missing and the teeth adjacent the location of the missing tooth will be additionally brushed by bristles intended for the location of the missing tooth.

FIG. 27 further shows a system of three mutually orthogonal axes, comprising an x-axis x, an y-axis y and a z-axis z. The z-axis z is a curved axis following the contour of the dental arch 601. The x-axis x and y-axis y are perpendicular to each other and define an xy-plane which is essentially flat and perpendicular to the dental arch 601, i.e. each xy-plane intersecting a location on the z-axis is, at that location, perpendicular to the curved z-axis z. The z-axis z defines a curved length direction. The z-axis Z and y-axis Y define a curved zy-plane, with viewed along the z-axis, an arch shape similar to the shape of the arch of dental positions. Further, the z-axis Z and X-axis X define a zx-plane.

FIG. 28 shows schematically a perspective view of a mouthpiece 620 according to the invention of Chapter 3. The mouthpiece 620 comprises a body 621 provided with a first recess 622. This first recess 622 has, viewed along the z-axis of FIG. 27, a curved length direction and, viewed in the xy-plane of FIG. 27, an U-shaped cross section. The first recess 622 is delimited by a recess wall 623, which is in the xy-plane U-shaped. The recess wall 623 is lined with a plurality of bristles 624, each having one end, called the root 649, attached to the recess wall 623 and extending from the recess wall 623 into the first recess 622.

Reference 626 indicates a nipple configured for connecting the mouthpiece to a pumping and/or suctioning device. The mouthpiece 620 further has a right half 627 and a left half 628, which halves come so to say together at nipple 626.

Reference 625 indicates a curved dividing line, which defines a mirror plane parallel to the xz-plane as defined in FIG. 27. The mouthpiece as shown in FIG. 28 is so to say mirror symmetrical with respect to this mirror plane, meaning that there is a second recess (not visible in FIG. 28) opposite the first recess 622, which second recess is lined with bristles as well. This second recess is however visible in amongst others FIG. 29, where it has been indicated with reference number 622 as well. It is noted that the first recess may have a shape different than the shape of the second recess because the (teeth of the) upper and lower arch of dental positions have different shapes.

The recesses 622 are configured to encompass an entire dental arch from the dental position of the right third or second molar to the dental position of the left third respectively second molar. The recesses 622 may also be configured to encompass a part of an arch of dental positions, this part comprising at least five dental positions, for example from the dental position of a central incisor to the dental position of a second premolar or to the dental position of a first molar or a dental position of a second molar.

Figure 29:
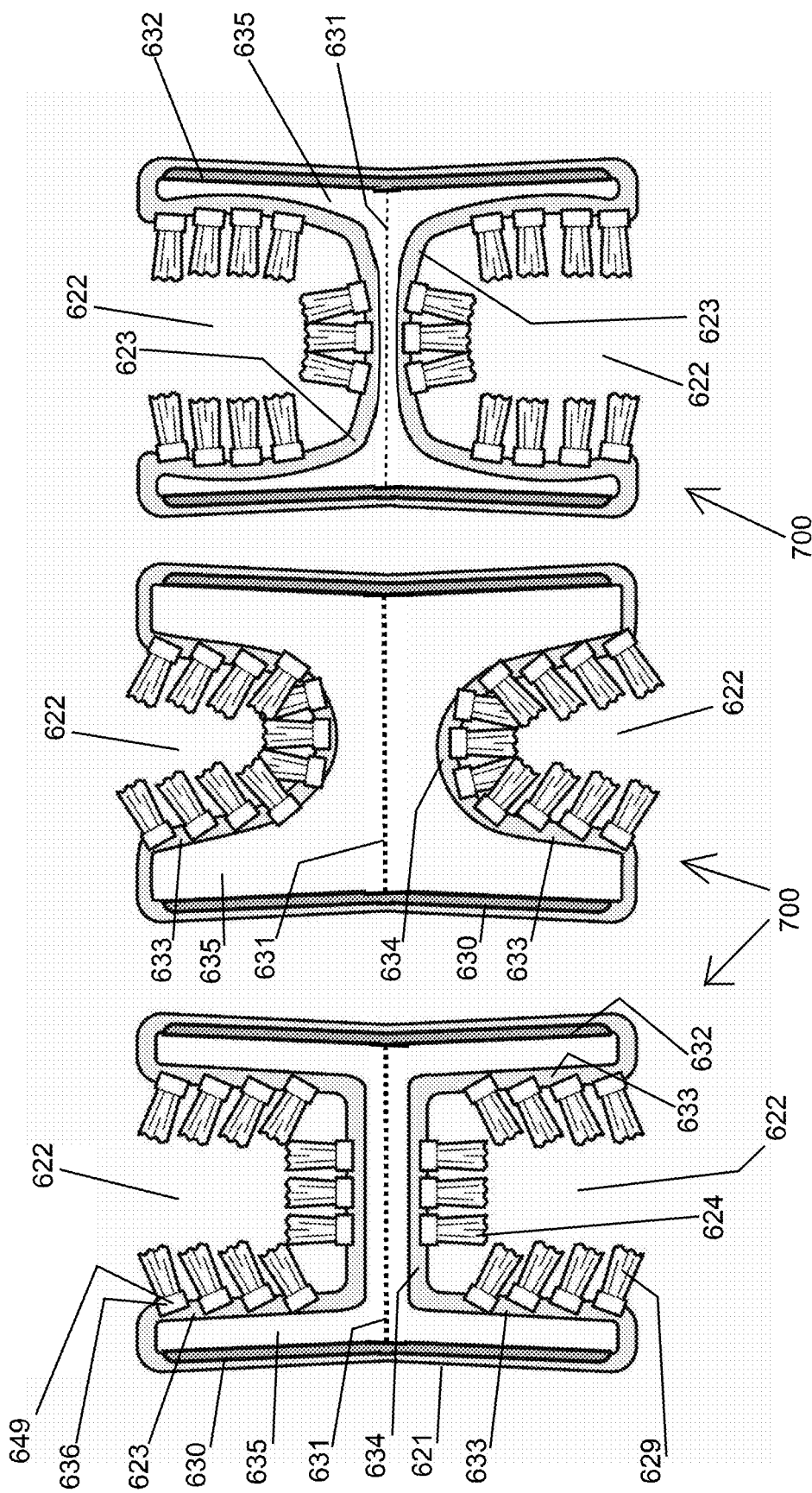

FIG. 29 shows cross-sections according to arrows XXVIII in FIG. 28 of a right part of a second embodiment of the mouthpiece 700 according to the invention of Chapter 3 in different pressure conditions. In FIG. 29 same reference numbers have been used as in FIG. 28 for similar parts.

The mouthpiece of FIG. 28 and the mouthpiece of FIG. 29 may be essentially the same, FIG. 28 showing a perspective view and FIG. 29 showing a cross section XXVIII-XXVIII of part of the mouthpiece of FIG. 28. The main difference then is in the bristles. In FIG. 28 the bristles 624 are relatively thick and may be made as one integral part with the recess wall 623, whilst in FIG. 29 the bristles are provided as tufts 629 of relatively thin bristles 624. Each tuft 629 may have a base 636 which carries the bristles 624 at their roots 649 and is attached to the recess wall.

As shown in FIG. 29, the mouthpiece 700 has a body 621 having in its upper side a first recess 622 and in its lower side a second recess 622. Both recesses 622 are delimited by a flexible recess wall 623. In cross-section parallel to the xy-plane as defined in FIG. 27, the recess walls 623 are U-shaped and have a recess wall bottom 634 and two recess wall legs 633 extending from the recess bottom wall. The recess wall 623 is covered with tufts 629 of bristles.

Inside the body there is provided a pressure chamber 635, which may, via the nipple 626 (FIG. 28), be filled with a fluid. The fluid may be a gas, like air, or a liquid, like water. In the embodiment as shown in FIG. 29, the mouthpiece has one pressure chamber. It is however noted that the mouthpiece may comprise a plurality of pressure chambers, like 5 pressure chambers as shown in FIGS. 30 and 31, or any other number of pressure chambers. The not pre-published PCT/NL2018/050276 shows examples of other numbers of pressure chambers in FIGS. 4, 5, 7, 9 and 10, which are all within the scope of the present invention of Chapter 3. In case of multiple pressure chambers, all the pressure chambers or groups of pressure chambers may according to the invention of Chapter 3 be in fluid communication with each other, similar as is described in the not pre-published PCT/NL2018/050276.

As shown in FIG. 29, the mouthpiece may comprise an internal support structure of a material which is rigid relative to the material of the recess wall 623. This support structure may structure comprise a lingual plate 630 and a facial plate 632, both extending along, for example parallel to, the curved zy-plane defined in FIG. 27 and consequently, viewed along the z-axis, having a U-shape. In order to keep the lingual plate 630 and facial plate 632 at a distance from each other, the support structure may comprise one or more spacers 631. These one or more spacers 631 may for example be a multiple of bars or wires or a single plate which may extend essentially parallel to the zx-plane as defined in FIG. 27. In case of a single plate as spacer, this plate may divide the pressure chamber 635 in two pressure chambers, an upper one and a lower one. These two pressure chambers may be in fluid communication with each other via one or more through holes through the plate. In case of large through holes and/or a large number of through holes the two pressure chambers may effectively be one single pressure chamber.

FIGS. 29a, 29b and 29c schematically depict cross-sectional views of the mouthpiece 700, in different respective operational states thereof. This cross-sectional view might be about the same all over the length axis Z—as defined in FIG. 27—of the dental arch.

The single pressure chamber 635 comprises a first flexible recess wall 623 delimiting the first recess 622 (the upper one in FIG. 29) and a second flexible recess wall 623 delimiting the second recess 622 (the lower one of FIG. 29). The first and second recess walls are deformable, in particular by increasing or decreasing the pressure in the pressure chamber 623. The flexible recess walls 623 may be made from an elastic material, such as a rubberlike material. The flexible recess walls 623 may also be made from a non-elastic material. The material of the flexible recess walls 623 may keep a predetermined shape when there is substantially no, or a low, pressure difference across an inner side and an outer side of the flexible recess walls 623.

The mouthpiece 700 is configured for the tufts 629 of bristles 624 to engage the tooth surface of teeth of a dental arch or, in case one or more dental positions the tooth might be missing, to engage the gum at the respective dental position(s) at least when the pressure in the pressure chamber 635 is increased. In case a tooth might be missing at a dental position, especially the tufts 629 of bristles at the free ends of the recess wall legs 633 will engage the gum at the empty dental position.

Viewed in length direction Z of the dental arch—as defined in FIG. 27 —, the tufts 629 of bristles 624 may be arranged at about the same density as viewed in the cross-sections shown in FIGS. 29a, 29b, 29c.

FIG. 29a illustrates a first operational state, also called intermediate state, of the mouthpiece 700. The pressure in the pressure chamber 635 may in the intermediate state be equal to ambient air pressure, lower than ambient air pressure or higher than ambient air pressure.

FIG. 29b illustrates a second operational state of the mouthpiece 700 when the pressure chamber 635 is in increased pressure condition, for example by feeding a fluid to the pressure chamber 635, or increasing an amount of fluid in the pressure chamber 635. As can be seen in FIG. 29b, as a result of increasing pressure, the recess walls 623 are so to say compacted to narrow the recess 622 (with respect to FIG. 29a), whereby the bristles 624, in particular the free ends thereof, may engage tooth surfaces firmly and/or may be deformed against tooth surfaces.

FIG. 29c illustrates a third operational state of the mouthpiece 700 when the pressure in the pressure chamber 635 is decreased, for example by discharging a fluid from the pressure chamber 635, or decreasing an amount of fluid in the pressure chamber 635. As can be seen in FIG. 29c, as a result of decreasing pressure, the flexible recess walls 623 are, compared with FIG. 29a, so to say dilated to enlarge the recess 622, whereby the bristles 624, in particular the free ends thereof, less firmly engage tooth surfaces (or do not engage tooth surface at all) and/or become less deformed against the tooth surfaces.

By a suitable cycle of increasing and decreasing pressure in the pressure chamber 635 to go from the first operational state to the second operational state, then from the second operational state to the first operational state, then from the first operational state to the third operational state, followed by a return to the first operational state, and subsequently repeating such cycle, a most effective brushing action of the mouthpiece can be obtained. The bristles 624 attached to the recess wall bottom 634 generally perform an upward and downward motion during such cycling, and the bristles 624 at the recess wall legs 633 generally perform a sideways motion to and fro during such cycling in the direction of the x-axis as defined in FIG. 27. Due to the recess 622 alternatively narrowing and widening when reciprocatingly increasing and decreasing pressure, the bristles 624 at the recess wall legs will also be subjected to a back and forth pivoting around the z-axis as defined in FIG. 27, resulting in a sweeping movement of the bristles in the direction of the y-axis as defined in FIG. 27.

It is noted that, in the operational state of FIG. 29c (decreased pressure condition), the pressure in the pressure chamber 635 may be a vacuum, i.e. a pressure lower than ambient air pressure. When in the operational state of FIG. 29c (increased pressure condition) the pressure in the vacuum chamber is a vacuum, for example 0.7 bar, the pressure in the pressure chamber 635 may, in the operational state of FIG. 29b, be either a vacuum, ambient air pressure or a pressure higher than ambient air pressure. Additionally, it is noted that it is also possible that in the operational states of FIGS. 29b as well as 29c the pressure in the pressure chamber may be both higher than ambient air pressure or that in the operational state of FIG. 29b the pressure in the pressure chamber is about ambient air pressure whilst in the operational state of FIG. 29c the pressure in the pressure chamber is higher than ambient air pressure.

Just by way of example to give some indication of dimensions and referring to FIG. 27, for an adult human the width of a teeth element in the X direction varies, depending on the dental position, between about 2 to 12 mm. Taking into account that it is desired to keep the mouthpiece as small as possible, the internal width of the U-shape of the recess wall in the X direction is to be kept as small as possible and may be about 0 to 4 mm wider than the width of the respective tooth. By way of example to give some indication of dimensions, the internal width of the U-shape of the recess wall, viewed in the X-direction of FIG. 27, may be in the range of 0 to 20 mm, such as in the range of 2-12 mm. The bristles may be up to 6 mm long. In case for example the bristles are 3 to 4 mm long, this means that between the bristles extending from opposing recess wall legs 633 no interspace or a limited amount of interspace of about 2-4 mm is left. In FIG. 29, these interspaces are shown exaggerated. Further by way of example to give some indication of dimensions, the U-shape of the recess wall may have, viewed in the Y-direction of FIG. 27, an internal height in the range of 3 to 20 mm, such as in the range of 5 to 10 mm. These internal width and internal height measures are indicative for an adult human. For a child or for animals these measures might be different.

FIG. 30 schematically depicts a top view of a third embodiment 710 of a mouthpiece according to the invention of Chapter 3. FIGS. 31a, 31b and 31c schematically depict cross-sectional views, according to the arrows XXX-XXX in FIG. 30, of the mouthpiece 710, in different respective operational states thereof. This cross-sectional view might be about the same all over the length axis Z—as defined in FIG. 27—of the dental arch.

Taking into account that the mouthpiece 710 of FIGS. 30-31, is very similar to the mouth piece 700 of FIG. 29, the same reference numbers have been used for same or similar parts of the mouthpiece 710 as have been used in relation to FIGS. 28-29.

There are essentially two differences between the mouthpiece 700 of FIG. 29 and the mouthpiece 710 of FIGS. 30-31. Each one of these differences may be applied separately to the mouthpiece of FIG. 28 and/or FIG. 29 without applying the other difference.

The first difference is that the mouthpiece of FIGS. 30-31 has five pressure chambers 635a, 635b, 635c, 635d and 635e. In FIG. 30 the pressure chambers 635a, 635c and 635e have been made visible by means of shaded grey areas. As can also be seen in FIG. 30, the nipple 626 has a channel 637a for providing a fluid communication with an external pressure source. This channel 637a debouches in pressure chambers 635c and 635a (not shown in FIG. 30). The channel 637b connects the pressure chambers 635c and 635a with the pressure chamber 635e and provides a fluid communication between these chambers. The channel 637c connects the pressure chamber 635e with the pressure chambers 635a and 635b and provides a fluid communication between these chambers. Overall, all pressure chambers 635a, 635b, 635c, 635d and 635e are in fluid communication with each other so that they may act as one single pressure chamber, like the pressure chamber 635 of mouthpiece 700. Similar like described in relation to FIGS. 29a, 29b, and 29c also the mouthpiece 710 may have 3 operational states or two operational states in case one might be left out. For description of the operational states shown in FIGS. 31a, 31b and 31c reference is made to the description of FIGS. 29a, 29b and 29c.

The second difference is that the mouthpiece of FIGS. 30-31 has a slightly different support structure. The lingual plate 630 and facial plate 632 of the mouthpiece 710 are arranged on the outside of the body 621 instead of embedded inside the body as is the case in the mouthpiece 700. Also the lingual plate 630 and a facial plate 632 of mouthpiece 710 both extend along the curved zy-plane defined in FIG. 27 and consequently, viewed along the z-axis, have a U-shape. In the embodiment of FIGS. 30 and 31, the lingual plate 630 and facial plate 632 may be kept at a distance from each other by additional spacers, not shown, but also the recess wall bottoms 634 may serve as such a spacer.

Referring to FIGS. 32-35, the local deformability of the recess wall according to the first aspect of the invention of Chapter 3 will now be explained and also the second aspect of the invention of Chapter 3 will be explained.

Up to here, with reference to FIGS. 27-31, a global deformability of the recess wall 623 has been described, which global deformability occurs upon the actuation of the at least one pressure chamber 635 with bristles 624 or tufts 629 with bristles 624 attached on the recess wall 623. However, according to the first aspect of the invention of Chapter 3, the recess wall 623 is further configured to have a local deformability. This local deformability of the recess wall 623 will now be elucidated with reference to FIGS. 32a, 32b, 32c and 32d.

Figure 32A:
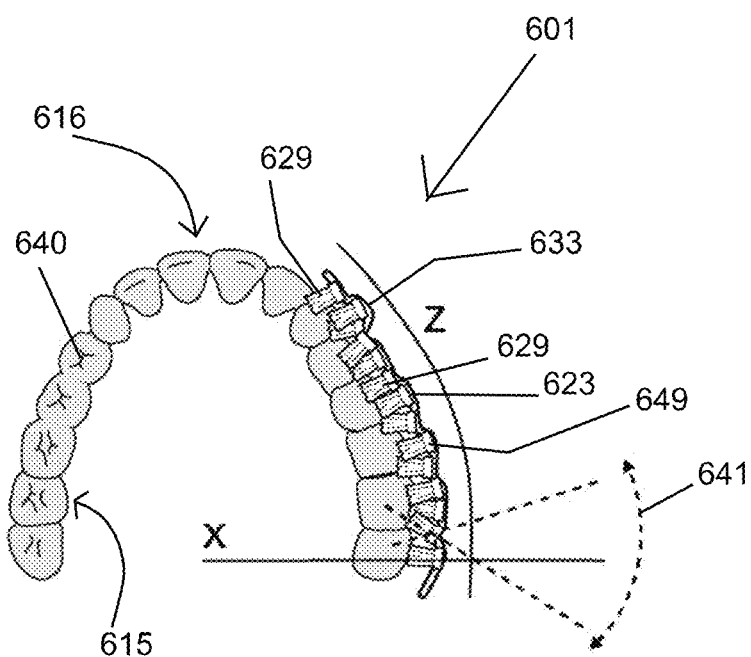
Figure 32B:
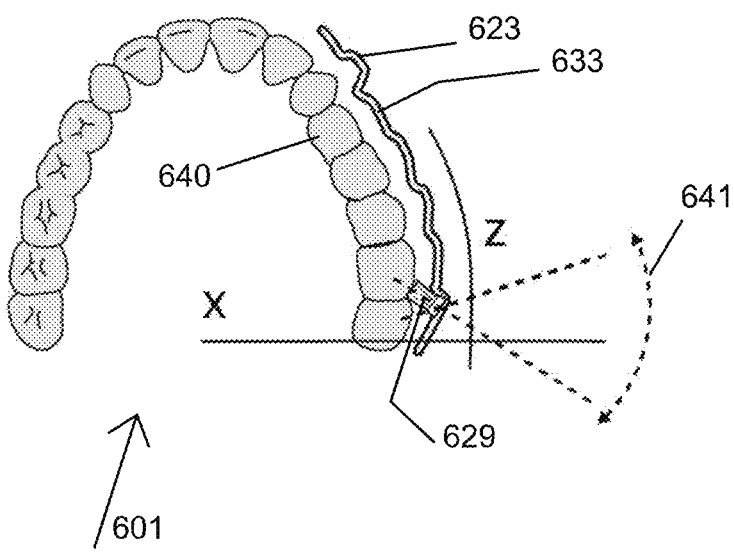

FIGS. 32a and 32b are basically identical. The difference is that in FIG. 32b only one tuft 629 is shown for illustrative purpose, whilst in FIG. 32a a plurality of tufts 629 is shown.

FIGS. 32a and 32b show schematically a dental arch 601 and a flexible recess wall leg 633 of the flexible recess wall 623 on the facial side of the dental arch 601. This flexible recess wall leg 633 is locally deformable.

As these FIGS. 32a and 32b are for purpose of elucidation, the rest of the recess wall leg 633 extending along the facial side of the dental arch 601, the recess wall leg 633 extending along the lingual side of the dental arch 601 and the recess wall bottom 634 extending along the occlusal surface and optionally the incisal edge are not shown. These not shown parts of the recess wall 623 may all also be configured to have a local deformability.

FIGS. 32a and 32b show the local deformability of the flexible recess wall 623, especially the local deformability of a recess wall leg 633, due to increasing and decreasing the pressure in the pressure chamber. As one can see, the recess wall leg 633 has, viewed along the z-axis an irregular shape, which follows the irregularities of the dental positions of the dental arch 601. For illustrative purpose, the irregular shape of the recess wall leg 633 almost precisely mates with the irregular shape of the dental arch 601 adjacent the recess wall leg 633. As will be clear, the irregular shape of the recess wall leg 633 may be less pronounced than the irregular shape of the dental arch 601.

FIGS. 32a and 32b show the recess wall leg 633 in increased pressure condition. The main direction of the pressure on recess wall leg 633, as shown in FIGS. 32a and 32b, is in the direction of the x-axis. When decreasing pressure, the recess wall leg 633 moves away from the dental arch 601, decreasing the pressure exerted by the tufts 629 on the tooth 640. When increasing pressure on the recess wall leg 633 again, the recess wall leg 633 moves towards the dental arch 601. This alternating movement in the direction of the x-axis is the first dimension of the brushing movement realized with the mouth piece according to the invention of Chapter 3.

When decreasing the pressure on the flexible recess wall leg 633, the flexible recess wall leg 633 will not only move away from the dental arch 601, but, due to the local deformability, the flexible recess wall leg 633 will also tend to return to a less pronounced irregular shape in the decreased pressure condition. This less pronounced irregular shape which may be a continuously curved shape parallel to the z-axis in case the flexible wall part moves sufficiently far away from the dental arch or may be or a shape still with relief, but with less relief then in the increased pressure condition. This local change of the shape of the recess wall 623/recess wall leg 633 causes the tufts 629 attached at or near that location to rotate around the y-axis resulting in a sweeping along the facial surface of the teeth in the z-direction. When increasing the pressure on the flexible recess wall leg 633, the tufts 629 will tend to return to the position as shown in FIGS. 32a and 32b, resulting in sweeping along the facial surface of the teeth in the opposite z-direction. This alternating sweeping movement in the direction of the z-axis—which sweep is indicated by the double arrow 641 in FIGS. 32a and 32b—is due to the local deformability of the flexible wall part and is the second dimension of the brushing movement realized with the mouth piece according to the invention of Chapter 3.

The sweeping movement 641 in the direction of the z-axis, around the y-axis, is caused by local irregularities of the dental arch 601 in the direction of the z-axis and the local deformation of the flexible wall part—at the location of the local irregularities, upon increasing and decreasing pressure.

Figure 32C:
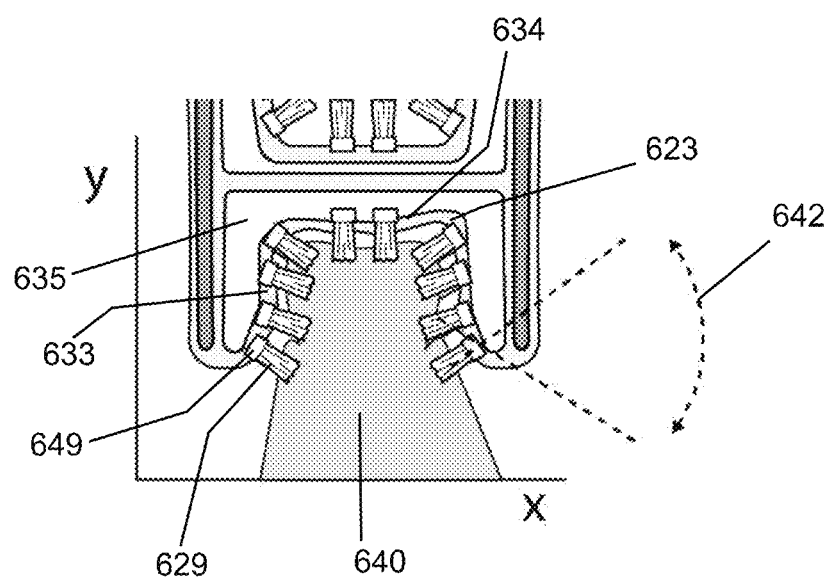

As shown schematically in FIG. 32c, irregularities of the dental arch 601 in the direction of the y-axis y and the local deformability of the flexible recess wall leg 633 of the flexible recess wall 623 will, similarly, cause the tufts 629 to sweep in the y-direction around the z-axis, when increasing and decreasing the pressure in the pressure chamber 635. This alternating sweeping movement in the direction of the y-axis and around the z-axis—which sweep is indicated by the double arrow 642 in FIG. 32c—is due to the local deformability of the flexible wall part and is the third dimension of the brushing movement realized with the mouth piece according to the invention of Chapter 3.

Figure 32D:
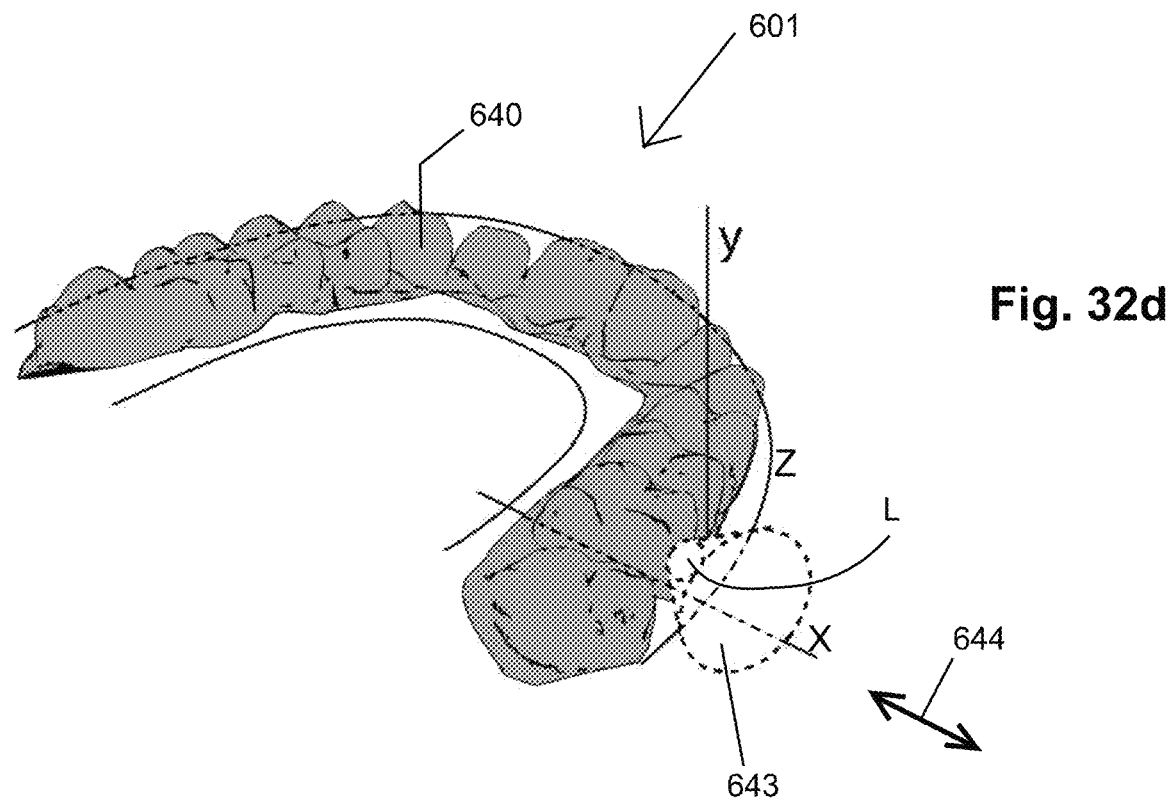

Referring to FIG. 32*d*, the local deformability of the recess wall all together results in, at least, an additional 2-dimensional brushing action which is indicated in FIG. 32*d* by the cone 643. This additional 2-dimensional brushing action is on top of the brushing action(s) already caused by the pulsating pressure. The main brushing action caused by the pulsating pressure is indicated in FIG. 32*d* by the double arrow 644 and has been described above in relation to FIGS. 28-31. The arrow 644 representing a third dimension, the overall brushing action at the location L in FIG. 32*d* thus is a 3-dimensional brushing action: back and forth pivoting of bristles around the y-axis, back and forth pivoting of bristles around the z-axis and back and forth translating of bristles along the x-axis. As will be clear, local deformability of the recess wall leg 633 at the lingual side and local deformability of the recess wall bottom 634 will result in similar manner in an additional 2-dimensional brushing action.

More in general and viewed at the location of the root 649 of a random bristle, the additional 2-dimensional brushing action comprises a first back and forth pivoting movement of the bristles and a second back and forth pivoting movement of the bristles, which two back and forth pivoting movements are on top of a third back and forth translation movement caused by the pulsation of the pressure in the pressure chamber. Referring to the system of orthogonal axes as shown in FIG. 27 and viewed at the location of a root of a bristle, the root of each random bristle will lie in an xy-plane which is perpendicular to the curved z-axis. Naming the xy-plane at the location of a root of a bristle a local xy-plane, the back and forth translation movement at the location of the root of this bristle is in this local xy-plane and thus perpendicular to the z-axis. Taking into account that the recess wall has, in this local xy-plane, essentially an U-shape in correspondence with the U-shaped cross section of the recess, this back and forth translation movement is also about perpendicular to the U-shape of the recess wall in this local xy-plane. The first back and forth pivoting movement is around the z-axis at the location L of the root of the respective bristle, i.e. around a first pivot axis perpendicular to the local xy-plane. The second back and forth pivoting movements is around a second pivot axis which is perpendicular to the first pivot axis (or z-axis) as well as perpendicular to the third back and forth translation movement. Further generalizing by leaving out the bristles, the local deformability of the recess wall is such that, when reciprocatingly increasing and decreasing the pressure in a said at least one pressure chamber and encompassing said plurality of dental positions in the recess, each location of the recess wall is subjected to a first back and forth pivot movement around a first pivot axis, a second back and forth pivot movement around a second pivot axis and a back and forth translation movement along a translation axis, the first pivot axis, the second pivot axis and the translation axis being mutually perpendicular.

In addition to the above discussed first, second and third back and forth movement, it is noted that the recess wall also may allow a fourth, fifth and sixth back and forth movement which may further contribute to the brushing action. The fourth back and forth movement is a back and forth translation movement in the direction of the z-axis at the location of a root of a bristle, which may result from for example elasticity of the recess wall in the direction of the z-axis and adds a fourth dimension to the brushing movement of the bristles. The fifth back and forth movement is a back and forth translation movement in the direction of the y-axis at the location of a root of a bristle, which may result from, for example, elasticity of the recess wall in the direction of the y-axis or translation of the recess wall in the y-direction (see for example FIGS. 36*b* and 37*b*) and adds a fifth dimension to the brushing movement of the bristles. The sixth back and forth movement is a back and forth rotation movement around the x-axis at the location of a root of a bristle, which may result from, for example, local rotation of the recess wall around the x-axis and adds a sixth dimension to the brushing movement of the bristles.

Referring to FIGS. 33 and 34, it will become clear that the local deformability of the recess wall also results in improved interdental brushing and a more regular brushing pressure exerted on the dental positions. Both FIGS. 33 and 34 show for illustrative purpose, part of a recess wall leg 633 acting on a side of three teeth 640 in between which interdental spaces 638 are present. FIG. 33 shows the situation with a recess wall leg 633 which is configured with no local deformability, FIG. 33*a* showing a decreased pressure condition and FIG. 33*b* showing an increased pressure condition, whilst FIG. 34 shows the situation which a recess wall leg 633 which is, according to the first aspect of the invention of Chapter 3, configured to have a local deformability, FIG. 34*a* showing a decreased pressure condition and FIG. 34*b* showing an increased pressure condition.

When comparing the decreased pressure condition of FIG. 33*a* with the increased pressure condition of FIGS. 33*b*, it can be seen that the extent to which the interdental spaces 638 are reached by the bristles 624 is determined by the length of the bristles and the distance d from the recess wall leg 633 to the sides of the teeth 633. The minimal value for the distance d might be smaller than shown in FIG. 33*b*. But due to the recess wall leg 633 in FIG. 33 not being locally deformable, the recess wall leg 633 will maintain to be flat as shown in FIG. 33*b* resulting in that the distance e of the recess wall leg 633 to the deepest point of the interdental recess is large compared with the situation of FIGS. 34*a* and 34*b*. The minimal value for the distance d as well as the distance e will be reached when the bent or straight bristles 24 in the areas 645*a*, 645*b*, 645*c*, which are opposite the teeth 640 and not opposite the interdental spaces 638, prevent the recess wall leg 633 from moving further in the direction of the teeth 640. Now, referring to FIG. 34, it will be seen that, due to the recess wall leg 633 locally deforming at locations 639 opposite the interdental spaces 638, the bristles attached at or near the locations 639 of the recess wall leg will reach much deeper into the interdental spaces, resulting in a better cleaning of the interdental spaces 638.

Further referring to the increased pressure condition of FIG. 33*b*, it will be clear that the pressure exerted by the bristles 624 in the x-axis direction varies considerable along the z-axis. At the area around an interdental position, this pressure is low and might be about zero. Referring to the increased pressure condition of FIG. 34*b*, it will be clear that the pressure exerted by the bristles 624 in the x-axis direction is much more constant along the z-axis. The higher pressure exerted by the bristles in the areas of the interdental spaces 638 according to FIGS. 34*a* and 34*b*, results in improved cleaning of these interdental spaces 638. Further, the pressure exerted by the bristles being much more constant along the z-axis means that there the pressure inside the pressure chamber is much more representative for the pressure exerted by the bristles along the dental arch. Exceeding the maximum allowable bristle pressure exerted by the bristles on especially the vulnerable gum, can thus be prevented much more reliable.

Referring to FIG. 35, an example of further location 646 with local deformation of a recess wall leg 633 is shown in increased pressure condition. Such a local deformation at location 646 may be caused by the bristles 624 pushed—so to say—flat towards the recess wall leg 633 due to the local deformability of the recess wall leg 633. When decreasing pressure, this local deformation 646 may disappear or become less pronounced, allowing the bristles to—so to say—rise again. This results in further additional brushing action.

Although, the second aspect of the invention of Chapter 3 may—as elucidated above—may be achieved with the locally deformable recess wall according to the first aspect of the invention of Chapter 3, it will be clear that the second aspect of the invention of Chapter 3 may also be realized in a different manner, for example by mounting the fixed ends of the bristles individually or grouped in tufts on an individual drive per bristle or tuft of bristles, wherein the individual drive provides the back and forth translation movement and wherein the mounting allows for the first and second back and forth pivot movement.

FIGS. 36 and 37 show two embodiments of the third aspect of the invention of Chapter 3, the 'roller bellow functionality'. FIG. 36 shows a mouthpiece 720 and FIG. 37 shows a mouthpiece 730. FIGS. 36 and 37 are mutually identical, except FIGS. 36*b* and 37*b*, where the difference between the mouthpiece 720 and mouthpiece 730 can be seen. Further the mouthpieces shown in FIGS. 36 and 37 on the one hand and FIG. 29 on the other hand are identical, except for the 'roller bellow functionality' which is absent in the mouthpiece 710 of FIG. 29 and for the spacer 631 in FIGS. 36 and 37 being a plate dividing the single pressure chamber 635 of FIG. 29 into two pressure chambers 635*a* and 635*b* in FIGS. 36 and 37. The pressure chambers 635*a* and 635*b* are in fluid communication with each other, for example by means of one or more passages through the plate 631, so that the fluid in both pressure chambers 635*a* and 635*b* will have the same pressure. The spacer 631 being a plate in the mouthpieces 720 and 730 has nothing to do with the 'roller bellow functionality'. Like in FIG. 29*a*, FIGS. 36*a* and 37*a* show a first operational state. Like in FIG. 29*b*, FIGS. 36*b* and 37*b* show a second operational state, the increased pressure condition. And like in FIG. 29*c*, FIGS. 36*c* and 37*c* show a third operational state, the decreased pressure condition. Taking into account the similarities between FIG. 29 on the one hand and FIGS. 37 and 38 on the other hand, FIGS. 37 and 38 use the same reference numbers for similar parts and for more details of FIGS. 37 and 38 reference is made to the description of FIG. 29. Not with standing all these similarities between FIG. 29 on the one hand and FIGS. 36 and 37 on the other hand, it is noted that the 'roller bellow functionality' according to the third aspect can be applied without (or in combination with) the 'local deformability functionality of the recess wall' according to the first aspect of the invention of Chapter 3.

According to the third aspect of the invention of Chapter 3, the body is configured to shift the upper ends 647 of the recess wall legs 633 from inside the recess 622 to outside the recess 622 when increasing the pressure in the pressure chambers 635*a* and 635*b*. When shifting outwards the bristles 648 at the upper ends 647 of the recess wall legs 633, which bristles are called end bristles 648, are subjected to a rotational movement which topples the end bristles towards a more upright position. This is shown in the increased pressure condition of FIGS. 36*b* and 37*b*. Further, according to the third aspect of the invention of Chapter 3, the body is configured to shift the upper ends 647 of the recess wall legs 633 from outside the recess 622 (back) into the inside of the recess 622 when decreasing the pressure in the pressure chambers 635*a* and 635*b*. When shifting inwards the end bristles 648, the end bristles 648 are subjected to a rotational movement which topples the end bristles 648 back towards a less upright position. This is shown in the decreased pressure condition of FIGS. 36*c* and 37*c* as well as in the pressureless condition shown in FIGS. 36*a* and 37*a*. By reciprocatingly increasing and decreasing the pressure in the at least one pressure chamber 635*a*, 635*b*, the end bristles 648 are subjected to a back and forth swiveling movement around an axis parallel to the z-axis as defined in FIG. 27.

The difference between the mouthpiece 720 of FIG. 36 and the mouthpiece 730 of FIG. 37, is that in the embodiment of FIG. 37, the body is further configured to elongate the recess wall legs 633 when increasing pressure in the at least one pressure chamber 635*a*, 635*b* and to shorten the recess wall legs 633 when decreasing pressure in the at least one pressure chamber 635*a*, 635*b*. The effect of this is that, viewed in the y-axis direction as defined in FIG. 27, the depth of the recesses 622 increases when increasing pressure and decreases when decreasing pressure. This results in additional brushing action especially at the gum around the roots of the teeth. Elongating and shortening of the legs of the recess wall may for example be realized by fastening the center of the recess wall bottom 634 with respect to the spacer 631, as has been made visible, for illustrative purpose, only in FIGS. 37*b* and 37*c*.

FIG. 38 schematically depicts a top view of an embodiment of a bristle support 650, having a net-shaped configuration, also called a meshwork. The meshwork has nodes 651 each having bristles 624 implanted therein. The meshwork further has mesh members 652, 653. Each mesh member 652, 653 extends from one node 651 to another node 651. Each said node 651 connects in this embodiment six mesh members 652, 653, but it is noted that each node may also connect another number of mesh members, like three, four or five mesh members. The nodes and a mesh members define mesh openings 655. Except the nodes provided at the side edges of the mesh work, each node will connect at least three mesh members. The bristle support 650 can lie against, or be adhered to, or be fixed to a flexible recess wall 623.

In order to allow a meshwork to follow the deformation of the flexible recess wall 623, which may be a 2 dimensional deformation as indicated in FIG. 44, all or part of the mesh members may be:
elastically or non-elastically stretchable in their length; and/or
may be configured to break when a predetermined stretching force acting on the respective mesh member is exceeded.

In the latter case, the nodes may be attached to the flexible wall part whilst the mesh members are free from the flexible wall part.

In the meshwork of FIG. 38 all mesh-members may be elastically or non-elastically stretchable in their length in order to allow the meshwork to follow a deformation of the flexible recess wall to which the meshwork will be attached (not shown).

FIG. 39 shows schematically a meshwork 660 with nodes 651 provided with bristles (not shown) and mesh members 661, 662. The mesh members 662 have a zig-zag configuration, allowing expansion and contraction of the meshwork 660 in one direction from the state as shown in FIG. 39*a* to the state as shown in FIG. 39b and vice versa, whilst the dimensions in the other direction do not change when the mesh members 661 have an unchangeable length. In case the mesh members 661 are for example elastically stretchable, also expansion and contraction of the meshwork 660 in a direction perpendicular to the arrows of FIG. 39b will be possible. Another way of allowing expansion and contraction of meshwork 660 in two perpendicular directions, is to provide the mesh members 661 with a zig-zag-structure as well, which results in a mesh work 670 like shown in FIG. 40a in contracted state and in FIG. 40b in expanded state. This meshwork 670 has nodes provided with bristles (not shown) and zig-zag mesh members 671 and 672.

FIG. 41 shows a meshwork 680 having an auxetic structure. This auxetic meshwork has nodes 651 provided with bristles (not shown) and mesh members 681, 682 and can follow deformations in two perpendicular directions from the state shown in FIG. 41a to the state shown in FIG. 41b, and vice versa.

FIG. 42 shows a meshwork 690 having nodes 651 with bristles (not shown) and breakable mesh members 691 and 692. The nodes of this meshwork will be attached to the recess wall 623 with the mesh members 691 and 692 not yet broken, as shown in FIG. 42a. Then the recess wall 623 will be deformed and the mesh members 691 and 692 will break, resulting in the state as shown in FIG. 42b. As the nodes are attached to the recess wall 623, the nodes will follow all subsequent deformations of the recess wall once the mesh members 691 and 692 have been broken. FIG. 43 shows a variant 695 of the meshwork 690 of FIG. 42. As indicated the mesh members 691 and 692 can be broken by exerting a pulling force along the diagonal direction.

FIG. 45 schematically depicts, in a partially cut-away perspective view, a dental cleaning device 800 comprising a handle member 802 and a mouthpiece 804 coupled thereto. The mouthpiece 804 may be any mouthpiece described in this application. The handle member 802 is provided with a handle interface, and the mouthpiece 804 is provided with a mouthpiece interface configured to be detachably coupled to the handle interface. The handle member 800 comprises a battery 810 for storing electrical energy which can be fed to the battery 810 through a battery charging interface 812. The battery 810 provides energy to a printed circuit board, PCB, 814, to a main pumping unit comprising a motor 816, a transmission 818, a crank piston 820 and a piston pump 822, and to optionally a mouthwash pump 824. A mouthwash capsule 830 containing a mouthwash liquid may be removably accommodated in the handle member 800. The piston pump 822 may be a pneumatic pump. The mouthwash pump 824 may be a hydraulic pump.

A brushing valve unit 840 is included in one or more ducts 842 leading from the piston pump 822 to the mouthpiece 804, and in possible other ducts. A cleaning valve unit 850 is included in a duct 852 leading from the mouthwash pump 824 to the mouthpiece 804. The brushing valve unit 840 and the cleaning valve unit 850 comprise electronic valves which also receive energy from the battery 810. The mouthwash pump 824 is in fluid communication with the mouthwash capsule 830 through a duct 854.

The operation of the dental cleaning device 800 is controlled by the PCB 814. The PCB 814 may control the operation of the motor 816, the operation of the mouthwash pump 824, and the operation of valves comprised in the brushing valve unit 840 and in the cleaning valve unit 850. In particular, when the dental cleaning device is used for brushing at dental positions, wherein a plurality of at least five dental positions teeth of a dental arch is encompassed by the mouthpiece 804, the PCB 814 may control the dental cleaning device 800 to reciprocatingly increasing and decreasing the pressure in at least one pressure chamber provided in the body of the mouthpiece 804.

The next following clauses 65-102 give examples of the above described inventions of Chapter 3 and further aspects and embodiments of these inventions of Chapter 3:

65] A mouthpiece for simultaneously brushing at a plurality of dental positions;

wherein the mouthpiece comprises a body provided with at least one recess;

wherein the at least one recess has a curved length direction and a U-shaped cross-section transverse to the length direction and is configured for encompassing, viewed in the curved length direction, a plurality of at least 5 dental positions;

wherein the body comprises, per said recess, a flexible recess wall delimiting the respective recess, wherein the recess wall is optionally lined with a plurality of bristles, each having one end attached to the recess wall and extending from the recess wall into the recess;

wherein the body is provided with at least one pressure chamber configured for containing a fluid under pressure;

wherein the body is configured to deform the recess wall by reciprocatingly increasing and decreasing a pressure in the at least one pressure chamber between a decreased pressure condition and an increased pressure condition; and characterized, in that the recess wall is configured to have such a local deformability that, when reciprocatingly increasing and decreasing the pressure in a said at least one pressure chamber, the shape of the recess wall locally changes, wherein, in the increased pressure condition, the shape of the recess wall is locally adjusted to the local shape of the dental positions encompassed by the recess wall whilst, in the decreased pressure condition, the shape of the recess wall is locally less adjusted to the local shape of the dental positions encompassed by the recess wall than in the increased pressure condition.

66] The mouthpiece according to clause 65, wherein, viewed in the length direction along a lingual and facial side of the dental positions encompassed by the recess wall, the recess wall has in the decreased pressure condition less relief than in the increased pressure condition.

67] The mouthpiece according to one of the clauses 65-66, wherein the local deformability of the recess wall is configured such that the local changes in the shape of the recess wall, between the increased pressure condition and decreased pressure condition, occur at a pressure difference in a range up to 2 bar, such as in a range up to 0.4 bar, the pressure difference being defined as the pressure in the pressure chamber in the increased pressure condition minus the pressure in the pressure chamber in the decreased pressure condition.

68] The mouthpiece according to one of the clauses 65-67, wherein, in the decreased pressure condition, the pressure in a said at least one pressure chamber is higher than ambient air pressure.

69] The mouthpiece according to one of the clauses 65-68, wherein, in the increased pressure condition, the pressure in a said at least one pressure chamber is at most 2 bar relative to ambient air pressure, such as at most 1 bar relative to ambient air pressure.

70] The mouthpiece according to one of the clauses 65-69, wherein, in the increased pressure condition, the pressure in a said at least one pressure chamber is at most 0.3 bar relative to ambient air pressure, such as at most 0.2 bar relative to ambient air pressure.

71] The mouthpiece according to one of the clauses 65-70, wherein, in the decreased pressure condition, the pressure in a said at least one pressure chamber is lower than ambient air pressure.

72] The mouthpiece according to one of the clauses 65-71, wherein, in the decreased pressure condition, the pressure in a said at least one pressure chamber is in the range of −0.5 to +0.2 bar relative to ambient air pressure, such as in the range of −0.5 to 0 bar relative to ambient air pressure.

73] A mouthpiece for simultaneously brushing at a plurality of dental positions;

wherein a system of three mutually orthogonal axes is defined, comprising an x-axis, an y-axis, and a z-axis, the z-axis being a curved axis following the contour of a dental arch, the x-axis and y-axis being perpendicular to each other and defining an xy-plane which is flat and perpendicular to the curved z-axis;

wherein the mouthpiece comprises a body provided with at least one recess;

wherein the at least one recess has a curved length direction extending parallel to the z-axis, a U-shaped cross-section transverse to the length direction, and is configured for encompassing, viewed in the curved length direction, a plurality of at least 5 dental positions;

wherein the body comprises, per said recess, a recess wall delimiting the respective recess and provided with a plurality bristles;

wherein each bristle has a fixed end which is, at the recess wall, attached to the body;

wherein each bristle extends from the fixed end, into the recess, towards its free end, which is arranged in the recess;

wherein the body is configured to subject, when a said plurality of dental positions is encompassed in the recess, a plurality of said fixed ends of said bristles reciprocatingly to a first back and forth pivot movement around a first pivot axis, a second back and forth pivot movement around a second pivot axis and a back and forth translation movement along a translation axis, the first pivot axis, the second pivot axis and the translation axis being mutually perpendicular, the first pivot axis being parallel to the z-axis, and the second pivot axis and translation axis extending in the xy-plane.

74] The mouthpiece according to one of the clauses 65-73, wherein the local deformability of the recess wall is such that, when reciprocatingly increasing and decreasing the pressure in a said at least one pressure chamber and encompassing said plurality of dental positions in the recess, each location of the recess wall is subjected to a first back and forth pivot movement around a first pivot axis, a second back and forth pivot movement around a second pivot axis and a back and forth translation movement along a translation axis, the first pivot axis, the second pivot axis and the translation axis being mutually perpendicular.

75] The mouthpiece according to one of the clauses 65-74, wherein each bristle is at a root of the respective bristle attached to the recess wall, and wherein the local deformability of the recess wall is such that, when reciprocatingly increasing and decreasing the pressure in a said at least one pressure chamber and encompassing said plurality of dental positions in the recess, the root of each bristle is subjected to a first back and forth pivot movement around a first pivot axis, a second back and forth pivot movement around a second pivot axis and a back and forth translation movement along a translation axis, the first pivot axis, the second pivot axis and the translation axis being mutually perpendicular.

76] The mouthpiece according to one of the clauses 65-75, wherein each respective bristle is attached to the recess wall in an attachment point;

wherein, at each attachment point, a local set of three mutually orthogonal axes is defined, which local set comprises an x-axis, an y-axis and a z-axis, the z-axis being a curved axis defined by the curved length direction of the recess, the x-axis and y-axis defining an xy-plane perpendicular to the z-axis; and wherein the local deformability of the recess wall is such that, when reciprocatingly increasing and decreasing the pressure in a said at least one pressure chamber and encompassing a said plurality of dental positions in the recess, the attachment points are subjected to one or more movements from the group of: a first back and forth pivoting movement around a first pivot axis, a second back and forth pivoting movement around a second pivot axis, and a back and forth translating movement along a translation axis; and wherein the first pivot axis is parallel to the z-axis and the second pivot axis and translation axis are in the xy-plane and mutually perpendicular.

77] The mouthpiece according to one of the clauses 65-76, wherein the body is provided with two said recesses, the openings of the U-shaped cross-sections of the two recesses facing in mutually opposite directions.

78] The mouthpiece according to one of the clauses 65-77, wherein the recess wall is, transverse to the length direction, U-shaped in conformity with the U-shaped cross-section of the recess;

wherein the U-shape of each recess wall defines two recess wall legs extending from a recess wall bottom, each leg having a free end;

wherein the free ends of the legs are provided with end bristles; and wherein the body is configured
   to shift the free ends of the legs from inside the recess to outside the recess when increasing the pressure in said at least one pressure chamber, and
   to shift the upper ends of the legs from outside the recess to inside the recess when decreasing the pressure in said at least one pressure chamber such that the end bristles are subjected to a back and forth swivelling movement around an axis parallel to the length direction when reciprocatingly increasing and decreasing the pressure in a said at least one pressure chamber.

79] A mouthpiece for simultaneously brushing at a plurality of dental positions;

wherein the mouthpiece comprises a body provided with at least one recess;

wherein said the at least one recess has a curved length direction and a U-shaped cross-section transverse to the length direction and is configured for encompassing, viewed in the curved length direction, a plurality of at least 5 dental positions;

wherein the body comprises, per recess, a flexible recess wall delimiting the respective recess, wherein the recess wall is lined with a plurality of bristles, each having one end attached to the recess wall and extending from the recess wall into the recess;

wherein the body is provided with at least one pressure chamber configured for containing a fluid under pressure;

wherein the body is configured to deform the recess wall by reciprocatingly increasing and decreasing a pressure in the at least one pressure chamber between a decreased pressure condition and an increased pressure condition;

wherein the recess wall is, transverse to the length direction, U-shaped in conformity with the U-shaped cross-section of the recess; and wherein the U-shape of each recess wall defines two recess wall legs extending from a recess wall bottom, each leg having a free end;

characterized, in that the free ends of the legs are provided with end bristles; and in that the body is configured:
to shift the upper ends of the legs from inside the recess to outside the recess when increasing a pressure in said at least one pressure chamber, and
to shift the upper ends of the legs from outside the recess to inside the recess when decreasing the pressure in said at least one pressure chamber such that the end bristles are subjected to a back and forth swivelling movement around an axis parallel to the length direction when reciprocatingly increasing and decreasing the pressure in a said at least one pressure chamber.

80] The mouthpiece according to clause 78 or 79 or one of the clauses 65-77,
wherein the body is configured to elongate the legs when increasing the pressure in said at least one pressure chamber and to shorten the legs when decreasing the pressure in said at least one pressure chamber.

81] The mouthpiece according to one of the clauses 78-80,
wherein the body defines a reference plane parallel to the curved length direction, the free ends of the legs pointing away from the reference plane and an outer side of the bottom facing the reference plane;
wherein a vertical distance is defined as a distance, measured in a direction transverse to the reference plane, from the reference plane to the free ends of the legs; and
wherein the body is further configured:
to increase the vertical distance when increasing a pressure in said at least one pressure chamber, and
to decrease the vertical distance when decreasing the pressure in said at least one pressure chamber.

82] The mouthpiece according to one of the clauses 65-81,
wherein the mouthpiece further comprises a meshwork fixed to the recess wall; and
wherein the meshwork is formed by nodes and mesh members, each said mesh member extending from one said node to another said node, each said node connecting at least three said mesh members to each other, and wherein each node carries one or more of said bristles or a tuft of said bristles.

83] A mouthpiece for simultaneously brushing at a plurality of dental positions;
wherein the mouthpiece comprises a body provided with at least one recess;
wherein the at least one recess has a curved length direction and a U-shaped cross-section transverse to the length direction and is configured for encompassing, viewed in the curved length direction, a plurality of at least 5 dental positions; and wherein the body comprises, per said recess, a recess wall delimiting the respective recess,
wherein the recess wall is lined with a plurality of bristles extending from the recess wall into the recess;
characterized, in that the mouthpiece further comprises a meshwork lying against the recess wall or fixed to the recess wall, and in that the meshwork is formed by nodes and mesh members, each said mesh member extending from one said node to another said node, each said node connecting at least three said mesh members to each other, and wherein each node carries one or more of said bristles or a tuft of said bristles.

84] The mouthpiece according to clause 82 or 83, wherein the meshwork lies in a cut away of the recess wall, or is embedded in material of the recess wall, or is adhered or glued to the recess wall, or is positioned in the pressure chamber and overlapping holes in the recess wall through which the tuft of bristles extend externally from the recess wall.

85] The mouthpiece according to one of clauses 82-84,
wherein each respective mesh member has a length direction defined by an imaginary straight line extending between two said nodes, between which nodes the respective mesh member extends; and wherein the mesh members are stretchable in their length direction or at least a part of the mesh members is stretchable in their length direction.

86] The mouthpiece according to clause 85,
wherein the stretchable mesh members are elastically stretchable.

87] The mouthpiece according to clause 85 or 86,
wherein the stretchable mesh members have, viewed in the length direction of the respective mesh member, a zig-zag structure configured for providing said stretchability.

88] The mouthpiece according to one of the clauses 82-87,
wherein the mesh members or at least part of the mesh members is configured to break when a predetermined force, acting on the respective mesh members, is exceeded.

89] The mouthpiece according to one of the clauses 65-88,
wherein the at least one recess is configured for encompassing, viewed in its curved length direction, the dental positions in the range from a central incisor up to a first molar.

90] The mouthpiece according to one of the clauses 65-89,
wherein the at least one recess is configured for encompassing, viewed in its curved length direction, the dental positions in the range from a central incisor up to a second molar.

91] The mouthpiece according to one of the clauses 65-90, wherein the at least one recess is configured for encompassing, viewed in its curved length direction, the dental positions in the range from a right second premolar up to a left second premolar.

92] The mouthpiece according to one of the clauses 65-91,
wherein the at least one recess is configured for encompassing, viewed in its curved length direction, the dental positions in the range from a right first molar up to a left first molar.

93] The mouthpiece according to one of the clauses 65-92,
wherein the at least one recess is configured for encompassing, viewed in its curved length direction, the dental positions in the range from a right second molar up to a left second molar.

94] The mouthpiece according to one of the clauses 65-93,
wherein the bristles are, at their ends attached to the recess wall, fixed relative to the recess wall.

95] The mouthpiece according to one of the clauses 65-94,
wherein the recess wall is lined with at least 5 bristles per $cm^2$, such as at least 10 bristles per $cm^2$.

96] The mouthpiece according to one of the clauses 65-95,
wherein the recess wall is, transverse to the length direction, U-shaped in conformity with the U-shaped cross-section of the respective recess;
wherein a central axis is defined as the mirror axis of the U-shape and the U-shape of the recess defines two legs extending in the direction of the central axis; and
wherein the legs are provided with bristles extending at an angle in the range of 0° to 90°, with respect to the central axis.

97] The mouthpiece according to clause 96,
wherein the free ends of the legs are provided with bristles extending at an angle in the range of 30° to 90° with respect to the central axis.

98] The mouthpiece according to one of the clauses 65-97, wherein the recess wall is elastically deformable.

99] The mouthpiece according to one of the clauses 65-98, wherein the recess wall is configured to be deformable with a frequency of at least 1 Hz, such as in the range of 1-20 Hz or in the range of 20-50 Hz or more.

100] Dental cleaning device comprising a mouthpiece according to one of the clauses 65-99, and a pressure and/or suction device configured to be in fluid communication with the at least one pressure chamber and for reciprocatingly increasing and decreasing the pressure in the pressure chamber.

101] Dental cleaning device according to clause 100, wherein the pressure and/or suction device is furthermore configured to:
reciprocatingly increasing and decreasing the pressure in a said at least one pressure chamber with a pressure difference in a range up to 2 bar, such as in a range up to 0.4 bar, the pressure difference being defined as the pressure in the pressure chamber in the increased pressure condition minus the pressure in the pressure chamber in the decreased pressure condition;
and/or
decrease the pressure in a said at least one pressure chamber to decreased pressure condition with a pressure higher than ambient air pressure;
and/or
increase the pressure in a said at least one pressure chamber to an increased pressure condition of at most 2 bar relative to ambient air pressure, such as at most 1 bar relative to ambient air pressure;
and/or
to increase the pressure in a said at least one pressure chamber to a increased pressure condition of at most 0.3 bar relative to ambient air pressure, such as at most 0.2 bar relative to ambient air pressure;
and/or
to decrease the pressure in a said at least one pressure chamber to a decreased pressure condition with a pressure lower than ambient air pressure;
and/or
to decrease the pressure in a said at least one pressure chamber to a decreased pressure condition in the range of −0.5 to +0.2 bar relative to ambient air pressure, such as in the range of −0.5 to 0 bar relative to ambient air pressure.

102] Method of operating a mouthpiece according to one of the clauses 65-99, wherein:
the pressure in a said at least one pressure chamber is reciprocatingly increased and decreased with a pressure difference in a range up to 2 bar, such as up to 0.4 bar, the pressure difference being defined as the pressure in the pressure chamber in the increased pressure condition minus the pressure in the pressure chamber in the decreased pressure condition;
and/or
the pressure in a said at least one pressure chamber is reciprocatingly decreased to decreased pressure condition with a pressure higher than ambient air pressure and increased to a pressure higher than the pressure in the decreased pressure condition;
and/or
the pressure in a said at least one pressure chamber is reciprocatingly increased to an increased pressure condition of at most 2 bar, such as at most 1 bar, relative to ambient air pressure and decreased to a pressure lower than the pressure in the increased pressure condition;
and/or
the pressure in a said at least one pressure chamber reciprocatingly increased to an increased pressure condition of at most 0.3 bar relative to ambient air pressure, such as at most 0.2 bar relative to ambient air pressure, and decreased to a pressure lower than the pressure in the increased pressure condition;
and/or
the pressure in a said at least one pressure chamber is reciprocatingly decreased to a decreased pressure condition with a pressure lower than ambient air pressure and increased to a pressure higher than the pressure in the decreased pressure condition;
and/or
the pressure in a said at least one pressure chamber is reciprocatingly decreased to a decreased pressure condition in the range of −0.5 to +0.2 bar relative to ambient air pressure, such as in the range of −0.5 to 0 bar relative to ambient air pressure, and increased to a pressure higher than the pressure in the decreased pressure condition.

As follows from the above, the term 'pressure chamber' as used throughout this Chapter 3 is a chamber in which the pressure is changed between a decreased pressure condition and an increased pressure condition. The decreased pressure condition and increased pressure condition may both be a pressure below ambient air pressure, i.e. a vacuum defined as a pressure between 0 and 1 bar. Alternatively, the decreased pressure condition and increased pressure condition may both be a pressure above ambient air pressure, or one of these pressure conditions may be about ambient air pressure whilst the other is below or above ambient air pressure.

Where in this Chapter 3 the terminology 'pressure in the pressure chamber' or similar terminology is used, it is the 'pressure of the fluid in the pressure chamber'. It is the pressure of the fluid which acts on the recess wall to cause local deformation. The pressure of the fluid may for example be increased by supplying additional fluid into the pressure chamber or decreased by allowing fluid to leave the pressure chamber.

Taking into account the shape of the various dental positions/natural teeth, the shape of the U-shaped cross section may vary along the length direction of the recess/recess wall. In the region of the upper and or lower incisors, the U-shaped cross section may for example be V-shaped.

Where in this Chapter 3 the phrase 'in a said at least one pressure chamber' is used, this means 'in the pressure chambers or in one or more of said at least one pressure chamber'.

What is claimed is:

1. A dental cleaning device for simultaneously brushing at a plurality of dental positions, the dental cleaning device comprising:
   a mouthpiece having a pressure chamber and a recess which is U-shaped in cross section and delimited by a flexible or deformable recess wall, the pressure chamber being configured for containing a fluid under pressure,
   a pump unit arranged in fluid communication with said pressure chamber, the pump unit being configured to reciprocatingly increase and decrease a pressure in the pressure chamber between an increased pressure condition and a decreased pressure condition by pumping a volume of fluid into and out of the pressure chamber, thereby deforming the recess wall and moving the recess wall back and forth;
   a pressure sensor configured to measure a pressure representative of the pressure in the pressure chamber and to produce a pressure signal representative of said pressure;
   a controller integrated with a printed circuit board configured to generate a control signal;
   wherein the pressure sensor and the controller are connected such that the controller, in use, receives the pressure signal from the pressure sensor;
   wherein the controller and the pump unit are connected such that the pump unit, in use, receives the control signal from the controller;
   wherein the controller is configured to generate the control signal in dependence on the pressure signal and the pump unit is configured to provide a delivery into and/or out of the pressure chamber in response to the control signal; and
   wherein the controller is configured to reduce the delivery of the pump unit when the pressure in the pressure chamber exceeds a predetermined upper threshold.

2. The dental cleaning device according to claim 1 further comprising a plurality of bristles attached to the recess wall with one end thereof and extending from said recess wall into the recess.

3. The dental cleaning device according to claim 1 wherein the pump unit has an operating frequency, and wherein the configuring of the controller to reduce the delivery of the pump unit when the pressure in the pressure chamber exceeds a predetermined upper threshold is such that a change of the operating frequency is prevented.

4. The dental cleaning device according to claim 1 wherein the pump unit has an operating frequency, and wherein:
   the controller is configured to operate the pump unit in response to a pressure change at a predetermined operating frequency; or
   the pump unit is configured to operate at a predetermined operating frequency.

5. The dental cleaning device according to claim 1 wherein the pump unit has an operating frequency which varies according to a predetermined function of a time elapsed since switching on the pump unit.

6. The dental cleaning device according to claim 1 wherein the pump unit has an operating frequency which is a fixed predetermined value.

7. The dental cleaning device according to claim 1 wherein said upper threshold is at most 2 bar relative to ambient pressure.

8. The dental cleaning device according to claim 1 wherein the controller is further configured to increase the delivery of the pump unit when the pressure in the pressure chamber falls below a predetermined lower threshold.

9. The dental cleaning device according to claim 8 wherein said lower threshold is in a range of −0.5 to +0.2 bar relative to ambient pressure.

10. A dental cleaning device for simultaneously brushing at a plurality of dental positions, the dental cleaning device comprising:
    a mouthpiece having a pressure chamber and a recess delimited by a recess wall, the recess wall having a curved length direction and a U-shaped cross-section transverse to the length direction, the recess wall being configured for encompassing, viewed in the curved length direction, the recess wall extending from a first end to a second end opposite the first end, and the pressure chamber being configured for containing a fluid under pressure;
    a pump unit arranged in fluid communication with said pressure chamber, the pump unit being configured to reciprocatingly increase and decrease a pressure in the pressure chamber between an increased pressure condition and a decreased pressure condition by pumping a volume of fluid into and out of the pressure chamber, thereby deforming the recess wall and moving the recess wall back and forth, said pump unit, in operation, operating at a predetermined operating frequency; and
    wherein the predetermined operating frequency is in the range of 0.5 to 20 Hz.

11. The dental cleaning device according to claim 10 wherein the predetermined operating frequency is in the range of 1 to 15 Hz.

12. The dental cleaning device according to claim 10 wherein the predetermined operating frequency is a fixed frequency.

13. The dental cleaning device according to claim 10 wherein the predetermined operating frequency varies according to a predetermined function of the time elapsed since switching on the pump unit.

14. The dental cleaning device according to claim 10 further comprising a plurality of bristles attached to the recess wall and extending into the recess, wherein, in use, upon increasing the pressure in the pressure chamber, the bristles move towards the dental positions of the user whilst end portions of said bristles are deformed and rubbed against said teeth, which rubbing action of said end portions cleans said teeth.

15. The dental cleaning device according claim 10 wherein the mouthpiece has two said recesses, which are each U-shaped in cross section and delimited by a said recess wall, the openings of the U-shaped cross sections of the two recesses facing in mutually opposite directions.

16. The dental cleaning device according to claim 10, wherein the dental cleaning device further comprises:
- a pressure sensor configured to measure a pressure representative of the pressure in the pressure chamber and to produce a pressure signal representative of said pressure, and
- a controller integrated with a printed circuit board configured to generate a control signal;
- wherein the pressure sensor and the controller are connected such that the controller in use receives the pressure signal from the pressure sensor;
- wherein the controller and pump unit are connected such that the pump unit in use receives the control signal from the controller;
- wherein the controller is configured to generate the control signal in dependence on the pressure signal and the pump unit is configured to provide a delivery into and/or out of the pressure chamber in response to the control signal; and
- wherein the controller is configured to reduce the delivery of the pump unit when the pressure in the pressure chamber exceeds a predetermined upper threshold.

17. The dental cleaning device according to claim 10 wherein the pump unit comprises a pump selected from the group consisting of: a piston pump, a diaphragm pump, a plunger pump, a membrane pump, and a bellows pump.

18. A method of operating a dental cleaning device for simultaneously brushing at a plurality of dental positions, comprising:
providing a cleaning device that comprises:
- a mouthpiece having a pressure chamber and a recess delimited by a recess wall, the recess wall having a curved length direction and a U-shaped cross-section transverse to the length direction, the recess wall being configured for encompassing, viewed in the curved length direction, at least a part of a dental arch of a user, and the pressure chamber being configured for containing a fluid under pressure;
- a pump unit arranged in fluid communication with said pressure chamber, the pump unit being configured to reciprocatingly increase and decrease a pressure in the pressure chamber between an increased pressure condition and a decreased pressure condition by pumping a volume of fluid into and out of the pressure chamber, thereby deforming the recess wall and moving the recess wall back and forth; and
reducing a delivery of the pump unit is reduced when the pressure in the pressure chamber exceeds a predetermined upper threshold; and
wherein the pump unit is configured to operate at an operating frequency in the range of 0.5 to 20 Hz.

19. The method according to claim 17 wherein at least one of:
- when the pressure in the pressure chamber exceeds a predetermined upper threshold the pump unit is operated such that a change of the operating frequency is prevented;
- the pump unit is operated at a fixed operating frequency;
- the pump unit is operated at an operating frequency in the range of 1 to 15 Hz, such as in the range of 3 to 10 Hz;
- the upper threshold is one of:
  - at most 2 bar relative to ambient pressure; and
  - at most 0.3 bar, such as at most 0.2 bar, relative to ambient pressure;
- the delivery of the pump unit is increased when the pressure in the pressure chamber falls below a predetermined lower threshold, wherein at least one of:
  - the lower threshold is in a range up to 1 bar, such as in a range up to 0.4 bar, below the upper threshold; and
  - the lower threshold is in the range of −0.5 to +0.2 bar, such as in the range of −0.5 to 0 bar, relative to ambient pressure; and
- the pump unit is operated at an operating frequency which varies according to a predetermined function of the time measured as from switching on the pump unit.

* * * * *